US008297028B2

(12) United States Patent
Jung et al.

(10) Patent No.: US 8,297,028 B2
(45) Date of Patent: Oct. 30, 2012

(54) INDIVIDUALIZED PHARMACEUTICAL SELECTION AND PACKAGING

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US); Lowell L. Wood, Livermore, CA (US)

(73) Assignee: The Invention Science Fund I, LLC, Bellevue, WA (US)

(*) Notice: Subject to any disclaimer, the term of this patent is extended or adjusted under 35 U.S.C. 154(b) by 955 days.

(21) Appl. No.: 11/518,540

(22) Filed: Sep. 8, 2006

(65) Prior Publication Data
US 2008/0047230 A1    Feb. 28, 2008

Related U.S. Application Data

(63) Continuation-in-part of application No. 11/453,571, filed on Jun. 14, 2006.

(51) Int. Cl.
*B65B 57/00* (2006.01)
*B65B 35/06* (2006.01)
(52) U.S. Cl. ............................................. 53/52; 53/443
(58) Field of Classification Search ............... 53/52, 443, 53/147, 266.1; 700/231
See application file for complete search history.

(56) References Cited

U.S. PATENT DOCUMENTS

| | | | |
|---|---|---|---|
| 4,009,078 A | 2/1977 | Wilkins et al. | |
| 4,257,041 A | 3/1981 | Masucci | |
| 4,436,378 A | 3/1984 | Kirkman | |
| 4,567,185 A | 1/1986 | Sackner | |
| H201 H | 1/1987 | Yager | |
| 4,729,636 A | 3/1988 | Te Velde et al. | |
| 4,807,967 A | 2/1989 | Veenvliet et al. | |
| 4,838,275 A | 6/1989 | Lee | |
| 4,847,764 A | 7/1989 | Halvorson | |
| 4,857,716 A | 8/1989 | Gombrich et al. | |
| 5,006,343 A | 4/1991 | Benson et al. | |
| 5,054,493 A | 10/1991 | Cohn et al. | |
| 5,093,268 A | 3/1992 | Leventis et al. | |
| 5,284,656 A | 2/1994 | Platz et al. | |
| 5,300,302 A | 4/1994 | Tachon et al. | |
| 5,307,263 A | 4/1994 | Brown | |
| 5,354,934 A | 10/1994 | Pitt et al. | |
| 5,412,560 A | 5/1995 | Dennision | |
| 5,490,962 A | 2/1996 | Cima et al. | |
| 5,654,011 A | 8/1997 | Jackson et al. | |
| 5,672,154 A | 9/1997 | Sillén et al. | |
| 5,686,429 A | 11/1997 | Lin et al. | |
| 5,692,502 A | 12/1997 | Alpert | |

(Continued)

FOREIGN PATENT DOCUMENTS

JP        61002060 A        1/1986
(Continued)

OTHER PUBLICATIONS

U.S. Appl. No. 11/637,638, Jung et al.
(Continued)

*Primary Examiner* — Rinaldi I. Rada
*Assistant Examiner* — John Paradiso

(57) ABSTRACT

The present disclosure relates to methods and systems that may be used for individualized selection of one or more pharmaceutical agents and packaging of the one or more pharmaceutical agents.

25 Claims, 18 Drawing Sheets

U.S. PATENT DOCUMENTS

| | | |
|---|---|---|
| 5,700,998 A | 12/1997 | Palti |
| 5,704,350 A | 1/1998 | Williams, III |
| 5,719,123 A | 2/1998 | Morley et al. |
| 5,737,539 A | 4/1998 | Edelson et al. |
| 5,747,349 A | 5/1998 | van den Engh et al. |
| 5,758,095 A | 5/1998 | Albaum et al. |
| 5,758,096 A | 5/1998 | Barsky et al. |
| 5,765,606 A * | 6/1998 | Takemasa et al. ............ 141/104 |
| 5,780,014 A | 7/1998 | Eljamal et al. |
| 5,807,579 A | 9/1998 | Vilkov et al. |
| 5,820,876 A | 10/1998 | Hoffmann |
| 5,824,494 A | 10/1998 | Feldberg |
| 5,837,196 A | 11/1998 | Pinkel et al. |
| 5,839,438 A | 11/1998 | Graettinger et al. |
| 5,873,369 A | 2/1999 | Laniado et al. |
| 5,882,931 A | 3/1999 | Petersen |
| 5,907,291 A | 5/1999 | Chen et al. |
| 5,940,801 A | 8/1999 | Brown |
| 5,945,115 A | 8/1999 | Dunn et al. |
| 5,954,640 A | 9/1999 | Szabo |
| 5,955,269 A | 9/1999 | Ghai et al. |
| 5,958,458 A | 9/1999 | Norling et al. |
| 5,972,710 A | 10/1999 | Weigl et al. |
| 5,993,783 A | 11/1999 | Eljamal et al. |
| 5,995,938 A | 11/1999 | Whaley |
| 6,021,202 A | 2/2000 | Anderson et al. |
| 6,023,916 A * | 2/2000 | Bouthiette ....................... 53/471 |
| 6,024,699 A | 2/2000 | Surwit et al. |
| 6,035,230 A | 3/2000 | Kang et al. |
| 6,087,090 A | 7/2000 | Mascarenhas |
| 6,090,545 A | 7/2000 | Wohlstadter et al. |
| 6,117,073 A | 9/2000 | Jones et al. |
| 6,128,534 A | 10/2000 | Park et al. |
| 6,139,494 A | 10/2000 | Cairnes |
| 6,161,095 A | 12/2000 | Brown |
| 6,169,068 B1 | 1/2001 | Levin et al. |
| 6,188,988 B1 | 2/2001 | Barry et al. |
| 6,194,900 B1 | 2/2001 | Freeman et al. |
| 6,221,677 B1 | 4/2001 | Wu et al. |
| 6,227,371 B1 | 5/2001 | Song |
| 6,280,771 B1 | 8/2001 | Monkhouse et al. |
| 6,287,595 B1 | 9/2001 | Loewy et al. |
| 6,295,506 B1 | 9/2001 | Heinonen et al. |
| 6,317,719 B1 | 11/2001 | Schrier et al. |
| 6,335,021 B1 | 1/2002 | Cavazza |
| 6,379,929 B1 | 4/2002 | Burns et al. |
| 6,383,136 B1 | 5/2002 | Jordan |
| 6,397,190 B1 | 5/2002 | Goetz |
| 6,421,650 B1 | 7/2002 | Goetz et al. |
| 6,451,286 B1 | 9/2002 | Modi |
| 6,454,945 B1 | 9/2002 | Weigl et al. |
| 6,468,805 B1 | 10/2002 | Smith |
| 6,482,306 B1 | 11/2002 | Yager et al. |
| 6,510,430 B1 | 1/2003 | Oberwager et al. |
| 6,529,446 B1 | 3/2003 | de la Huerga |
| 6,541,213 B1 | 4/2003 | Weigl et al. |
| 6,541,478 B1 | 4/2003 | O'Malley et al. |
| 6,565,841 B1 | 5/2003 | Niven et al. |
| 6,565,874 B1 | 5/2003 | Dunn et al. |
| 6,576,267 B2 | 6/2003 | Gelber et al. |
| 6,582,987 B2 | 6/2003 | Jun et al. |
| 6,589,169 B1 | 7/2003 | Surwit et al. |
| 6,605,454 B2 | 8/2003 | Barenburg et al. |
| 6,616,606 B1 | 9/2003 | Petersen et al. |
| 6,630,155 B1 | 10/2003 | Chandrashekar et al. |
| 6,656,507 B2 | 12/2003 | Petereit et al. |
| 6,671,818 B1 | 12/2003 | Mikurak |
| 6,695,147 B1 | 2/2004 | Yager et al. |
| 6,699,193 B2 | 3/2004 | Crutchfield et al. |
| 6,709,676 B2 | 3/2004 | Cho |
| 6,709,869 B2 | 3/2004 | Mian et al. |
| 6,759,062 B2 | 7/2004 | Gelber et al. |
| 6,764,831 B2 | 7/2004 | Cameron, Sr. et al. |
| 6,773,714 B2 | 8/2004 | Dunn et al. |
| 6,773,721 B1 | 8/2004 | Wong et al. |
| 6,787,164 B2 | 9/2004 | Gelber et al. |
| 6,790,198 B1 | 9/2004 | White et al. |
| 6,793,942 B2 | 9/2004 | Gelber et al. |
| 6,794,196 B2 | 9/2004 | Fonash et al. |
| 6,812,458 B2 | 11/2004 | Gregori et al. |
| 6,818,435 B2 | 11/2004 | Carvalho et al. |
| 6,838,076 B2 | 1/2005 | Patton et al. |
| 6,841,544 B2 | 1/2005 | Gelber et al. |
| 6,849,396 B2 | 2/2005 | Schneider |
| 6,852,206 B2 | 2/2005 | Pawliszyn et al. |
| 6,878,755 B2 | 4/2005 | Singh et al. |
| 6,881,425 B2 | 4/2005 | Pushpangadan et al. |
| 6,888,095 B2 | 5/2005 | Khan |
| 6,921,527 B2 | 7/2005 | Platz et al. |
| 6,946,144 B1 | 9/2005 | Jordan |
| 6,951,545 B2 | 10/2005 | Smith et al. |
| 6,955,873 B1 | 10/2005 | Blum |
| 6,958,216 B2 | 10/2005 | Kelley et al. |
| 6,962,720 B2 | 11/2005 | Haridas et al. |
| 6,979,463 B2 | 12/2005 | Kou |
| 6,979,471 B1 | 12/2005 | Khanuja et al. |
| 6,979,679 B2 | 12/2005 | Marcum |
| 6,980,958 B1 | 12/2005 | Surwit et al. |
| 7,016,752 B1 | 3/2006 | Ruben et al. |
| 7,022,288 B1 | 4/2006 | Boss |
| 7,029,441 B2 | 4/2006 | Dodds |
| 7,030,989 B2 | 4/2006 | Yager et al. |
| 7,041,317 B2 | 5/2006 | Sekiya et al. |
| 7,041,670 B2 | 5/2006 | Boojamra et al. |
| 7,041,840 B2 | 5/2006 | Gandhi |
| 7,045,145 B1 | 5/2006 | Chien |
| 7,045,159 B1 | 5/2006 | Ilic et al. |
| 7,046,357 B2 | 5/2006 | Weinberger et al. |
| 7,048,945 B2 | 5/2006 | Percel et al. |
| 7,049,312 B1 | 5/2006 | Rafferty et al. |
| 7,049,433 B2 | 5/2006 | Fan et al. |
| 7,053,107 B2 | 5/2006 | Borchardt et al. |
| 7,056,951 B2 | 6/2006 | Spireas |
| 7,074,311 B1 | 7/2006 | Cunningham |
| 7,074,583 B2 | 7/2006 | Yoshizato et al. |
| 7,112,444 B2 | 9/2006 | Beebe et al. |
| 7,135,616 B2 | 11/2006 | Heard et al. |
| 7,136,820 B1 | 11/2006 | Petrus |
| 7,151,982 B2 | 12/2006 | Liff et al. |
| 7,169,432 B2 | 1/2007 | Tanaka et al. |
| 7,172,897 B2 | 2/2007 | Blackburn et al. |
| 7,193,128 B2 | 3/2007 | Copenhaver et al. |
| 7,197,492 B2 | 3/2007 | Sullivan |
| 7,206,605 B2 | 4/2007 | Hattori |
| 7,215,887 B2 | 5/2007 | Ternullo et al. |
| 7,216,343 B2 | 5/2007 | Das et al. |
| 7,218,900 B2 | 5/2007 | Suzuki |
| 7,227,956 B1 | 6/2007 | Onishi |
| 7,236,595 B1 | 6/2007 | Bean et al. |
| 7,245,894 B2 | 7/2007 | Sekiguchi et al. |
| RE39,785 E | 8/2007 | Fuse |
| 7,254,160 B2 | 8/2007 | Kawamoto et al. |
| 7,257,327 B2 | 8/2007 | Small |
| 7,260,155 B2 | 8/2007 | Stonick et al. |
| 7,260,402 B1 | 8/2007 | Ahmed |
| 7,260,764 B2 | 8/2007 | Chen |
| 7,260,768 B1 | 8/2007 | Matsumoto et al. |
| 7,280,975 B1 | 10/2007 | Donner |
| 7,351,739 B2 | 4/2008 | Ho et al. |
| 7,376,585 B2 | 5/2008 | Haller |
| 7,379,167 B2 | 5/2008 | Mawhirt et al. |
| 7,483,839 B2 | 1/2009 | Mayaud |
| 7,490,085 B2 | 2/2009 | Walker et al. |
| 7,502,666 B2 | 3/2009 | Siegel et al. |
| 7,635,594 B2 | 12/2009 | Holmes et al. |
| 2001/0003177 A1 | 6/2001 | Schena et al. |
| 2001/0022758 A1 | 9/2001 | Howard |
| 2001/0037220 A1 | 11/2001 | Merry et al. |
| 2002/0004749 A1 | 1/2002 | Froseth et al. |
| 2002/0016719 A1 | 2/2002 | Nemeth et al. |
| 2002/0019784 A1 | 2/2002 | Ritz |
| 2002/0027164 A1 | 3/2002 | Mault et al. |
| 2002/0032580 A1 | 3/2002 | Hopkins |
| 2002/0032582 A1 | 3/2002 | Feeney, Jr. et al. |
| 2002/0032620 A1 | 3/2002 | Benz et al. |
| 2002/0046948 A1 | 4/2002 | Chow et al. |
| 2002/0052763 A1 | 5/2002 | Jung Richardson |

| | | |
|---|---|---|
| 2002/0055856 A1 | 5/2002 | Adams |
| 2002/0059030 A1 | 5/2002 | Otworth et al. |
| 2002/0065682 A1 | 5/2002 | Goldenberg |
| 2002/0070226 A1 | 6/2002 | Liff et al. |
| 2002/0077850 A1 | 6/2002 | McMenimen et al. |
| 2002/0091991 A1 | 7/2002 | Castro |
| 2002/0095238 A1 | 7/2002 | Ahlin et al. |
| 2002/0100762 A1 | 8/2002 | Liff et al. |
| 2002/0106429 A1 | 8/2002 | Mudar et al. |
| 2002/0128259 A1 | 9/2002 | Ghazzi et al. |
| 2002/0143434 A1 | 10/2002 | Greeven et al. |
| 2002/0147317 A1 | 10/2002 | Bentsen et al. |
| 2002/0156651 A1 | 10/2002 | Florio et al. |
| 2002/0156683 A1 | 10/2002 | Stoutenburg et al. |
| 2002/0173875 A1 | 11/2002 | Wallace et al. |
| 2002/0177763 A1 | 11/2002 | Burns et al. |
| 2002/0194226 A1 | 12/2002 | Sheth et al. |
| 2002/0194502 A1 | 12/2002 | Sheth et al. |
| 2003/0005445 A1 | 1/2003 | Schein et al. |
| 2003/0019165 A1 | 1/2003 | Gallant et al. |
| 2003/0028399 A1 | 2/2003 | Davis et al. |
| 2003/0032868 A1 | 2/2003 | Graskov et al. |
| 2003/0036683 A1 | 2/2003 | Kehr et al. |
| 2003/0055531 A1 | 3/2003 | Liff et al. |
| 2003/0061123 A1 | 3/2003 | McMenimen et al. |
| 2003/0065537 A1 | 4/2003 | Evans |
| 2003/0069757 A1 | 4/2003 | Greenberg |
| 2003/0073931 A1 | 4/2003 | Boecker et al. |
| 2003/0074218 A1 | 4/2003 | Liff et al. |
| 2003/0083685 A1 | 5/2003 | Freeman et al. |
| 2003/0088333 A1 | 5/2003 | Liff et al. |
| 2003/0092039 A1 | 5/2003 | Olson-Munoz et al. |
| 2003/0105552 A1 | 6/2003 | Lunak et al. |
| 2003/0121929 A1 | 7/2003 | Liff et al. |
| 2003/0125837 A1 | 7/2003 | Walace et al. |
| 2003/0135388 A1 | 7/2003 | Martucci et al. |
| 2003/0139655 A1 | 7/2003 | Dodds |
| 2003/0156724 A1 | 8/2003 | Mariano et al. |
| 2003/0158756 A1 | 8/2003 | Abramson |
| 2003/0171950 A1 | 9/2003 | Kilgannon et al. |
| 2003/0189058 A1 | 10/2003 | Liff et al. |
| 2003/0191670 A1 | 10/2003 | Hatcher et al. |
| 2003/0193185 A1 | 10/2003 | Valley et al. |
| 2003/0204412 A1 | 10/2003 | Brier |
| 2003/0207270 A1 | 11/2003 | Kung et al. |
| 2003/0214129 A1 | 11/2003 | Adler |
| 2003/0216831 A1 | 11/2003 | Hart et al. |
| 2003/0219812 A1 | 11/2003 | Quay et al. |
| 2003/0220848 A1 | 11/2003 | Behrendt |
| 2003/0229455 A1 | 12/2003 | Bevilacqua et al. |
| 2003/0233250 A1 | 12/2003 | Joffe et al. |
| 2004/0032330 A1 | 2/2004 | Hoffman |
| 2004/0033553 A1 | 2/2004 | Littarru et al. |
| 2004/0053290 A1 | 3/2004 | Terbrueggen et al. |
| 2004/0064342 A1 | 4/2004 | Browne et al. |
| 2004/0075272 A1 | 4/2004 | Kaufman |
| 2004/0078236 A1 | 4/2004 | Stoodley et al. |
| 2004/0081023 A1 | 4/2004 | Ho |
| 2004/0086872 A1 | 5/2004 | Childers et al. |
| 2004/0107022 A1 | 6/2004 | Gomez |
| 2004/0111298 A1 | 6/2004 | Schoenberg |
| 2004/0121767 A1 | 6/2004 | Simpson et al. |
| 2004/0122707 A1 | 6/2004 | Sabol et al. |
| 2004/0122790 A1 | 6/2004 | Walker et al. |
| 2004/0133705 A1 | 7/2004 | Broussard et al. |
| 2004/0138921 A1 | 7/2004 | Broussard et al. |
| 2004/0138926 A1 | 7/2004 | Ishikawa et al. |
| 2004/0143403 A1 | 7/2004 | Brandon et al. |
| 2004/0151629 A1 | 8/2004 | Pease et al. |
| 2004/0154688 A1 | 8/2004 | Geltser et al. |
| 2004/0158507 A1 | 8/2004 | Meek, Jr. et al. |
| 2004/0176984 A1 | 9/2004 | White et al. |
| 2004/0188523 A1 | 9/2004 | Lunak et al. |
| 2004/0188524 A1 | 9/2004 | Lunak et al. |
| 2004/0193316 A1 | 9/2004 | Lunak et al. |
| 2004/0210341 A1 | 10/2004 | Wallace et al. |
| 2004/0215486 A1 | 10/2004 | Braverman |
| 2004/0220498 A1 | 11/2004 | Li et al. |
| 2004/0224916 A1 | 11/2004 | Dahl et al. |
| 2004/0225203 A1 | 11/2004 | Jemison et al. |
| 2004/0243437 A1 | 12/2004 | Grace et al. |
| 2004/0243441 A1 | 12/2004 | Bocionek et al. |
| 2005/0010416 A1 | 1/2005 | Anderson et al. |
| 2005/0013863 A1 | 1/2005 | Lim et al. |
| 2005/0021413 A1 | 1/2005 | Berry et al. |
| 2005/0033606 A1* | 2/2005 | Miller .............................. 705/2 |
| 2005/0038558 A1 | 2/2005 | Keene |
| 2005/0053650 A1 | 3/2005 | Chalmers |
| 2005/0060188 A1 | 3/2005 | Valley |
| 2005/0062238 A1 | 3/2005 | Broadfield et al. |
| 2005/0065645 A1 | 3/2005 | Liff et al. |
| 2005/0101841 A9 | 5/2005 | Kaylor et al. |
| 2005/0102159 A1 | 5/2005 | Mondshine |
| 2005/0110268 A1 | 5/2005 | Schone |
| 2005/0118202 A1 | 6/2005 | Yamashita et al. |
| 2005/0147667 A1 | 7/2005 | Rines |
| 2005/0158401 A1 | 7/2005 | Morris |
| 2005/0192487 A1 | 9/2005 | Cosentino et al. |
| 2005/0216313 A1 | 9/2005 | Claud et al. |
| 2005/0218152 A1 | 10/2005 | Simon |
| 2005/0240305 A1 | 10/2005 | Bogash et al. |
| 2005/0260679 A1 | 11/2005 | Kellerman et al. |
| 2005/0261255 A1 | 11/2005 | Serhan et al. |
| 2005/0267356 A1 | 12/2005 | Ramasubramanian et al. |
| 2005/0271596 A1 | 12/2005 | Friedman et al. |
| 2005/0285746 A1 | 12/2005 | Sengupta et al. |
| 2006/0015016 A1 | 1/2006 | Thornton |
| 2006/0028727 A1 | 2/2006 | Moon et al. |
| 2006/0047538 A1 | 3/2006 | Condurso et al. |
| 2006/0064250 A1 | 3/2006 | Goldstein |
| 2006/0073484 A1 | 4/2006 | Mathies et al. |
| 2006/0097516 A1 | 5/2006 | Kozlowski et al. |
| 2006/0099310 A1 | 5/2006 | Koekkoek |
| 2006/0111944 A1 | 5/2006 | Sirmans, Jr. et al. |
| 2006/0129324 A1 | 6/2006 | Rabinoff et al. |
| 2006/0177637 A1 | 8/2006 | Kimura |
| 2006/0240150 A1 | 10/2006 | Delaney et al. |
| 2006/0254580 A1 | 11/2006 | Chalmers et al. |
| 2006/0260679 A1 | 11/2006 | Aratani et al. |
| 2006/0264780 A1 | 11/2006 | Holmes et al. |
| 2006/0280307 A1 | 12/2006 | Ikushima et al. |
| 2007/0087048 A1 | 4/2007 | Abrams et al. |
| 2007/0136092 A1 | 6/2007 | Jung et al. |
| 2007/0161076 A1 | 7/2007 | Halden |
| 2008/0097784 A1 | 4/2008 | Miller et al. |
| 2008/0299013 A1 | 12/2008 | Trieu et al. |

FOREIGN PATENT DOCUMENTS

| | | |
|---|---|---|
| WO | WO 99/45354 | 9/1999 |
| WO | WO 99/45354 A2 | 9/1999 |
| WO | WO 99/45354 A3 | 9/1999 |
| WO | WO 00/60362 | 10/2000 |
| WO | WO 00/60362 A1 | 10/2000 |
| WO | WO 01/79529 A1 | 10/2001 |
| WO | WO 03/084395 A1 | 10/2003 |
| WO | WO 2004/061085 A3 | 7/2004 |
| WO | WO 2005/041105 A1 | 5/2005 |
| WO | WO 2005/062849 A2 | 7/2005 |
| WO | WO 2006/032044 A3 | 3/2006 |
| WO | WO 2007/061838 A2 | 5/2007 |

OTHER PUBLICATIONS

U.S. Appl. No. 11/637,616, Jung et al.
U.S. Appl. No. 11/523,809, Jung et al.
U.S. Appl. No. 11/523,766, Jung et al.
U.S. Appl. No. 11/515,357, Jung et al.
U.S. Appl. No. 11/486,973, Jung et al.
U.S. Appl. No. 11/486,998, Jung et al.
U.S. Appl. No. 11/478,341, Jung et al.
U.S. Appl. No. 11/478,296, Jung et al.
U.S. Appl. No. 11/474,109, Jung et al.
U.S. Appl. No. 11/314,945, Jung et al.
U.S. Appl. No. 11/291,482, Jung et al.
Chen, Haibin; Sholl, David S.; "Predictions of Selectivity and Flux for $CH_4/H_2$ Separations Using Single Walled Carbon Nanotubes as Membranes"; Journal of Membrane Science; Bearing dates of 2005 and 2006; pp. 152-160; vol. 269; Elsevier B.V.; located at: www.sciencedirect.com and www.elsevier.com/locate/memsci.

Demello, Andrew J.; "Microfluidics: DNA Amplification Moves on"; Nature; Bearing dates of Mar. 6, 2003 and 2003; pp. 28-29; vol. 422; Nature Publishing Group; located at: www.nature.com/nature.

Fan, Chunhai; Plaxco, Kevin W.; Heeger, Alan J.; "Electrochemical interrogation of conformational changes as a reagentless method for the sequence-specific detection of DNA"; PNAS; Bearing a date of Aug. 5, 2003; pp. 9134-9137; vol. 100, No. 16; located at: www.pnas.org/cgi/doi/10.1073/pnas.1633515100.

Gao, Huajian; Kong, Yong; "Simulation of DNA-Nanotube Interactions"; Annual Review of Materials Research.; Bearing a date of 2004; pp. 123-150 (33 total pages); vol. 34; Annual Reviews.

Gruenewald, Tara L.; Seeman, Teresa E.; Ryff, Carol D.; Karlamangla, Arun S.; Singer, Burton H.; "Combinations of biomarkers predictive of later life mortality"; PNAS; Bearing dates of Sep. 19, 2006 and 2006; pp. 14158-14163; vol. 103, No. 38; The National Academy of Sciences of the USA; located at http://www.pnas.org/cgi/doi/10.1073/pnas.0606215103.

Heller, Daniel A.; Jeng, Esther S.; Yeung, Tsun-Kwan; Martinez, Brittany M.; Moll, Anthonie E.; Gastala, Joseph B.; Strano, Michael S.; "Optical Detection of DNA Conformational Polymorphism on Single-Walled Carbon Nanotubes"; Science; Bearing a date of Jan. 27, 2006; pp. 508-511; vol. 311; located at: www.sciencemag.org.

Holt, Jason K.; Park, Hyung Gyu; Wang, Yinmin; Stadermann, Michael; Artyukhin, Alexander B.; Grigoropoulos, Costas P.; Noy, Aleksandr; Bakajin, Olgica; "Fast Mass Transport Through Sub-2-Nanometer Carbon Nanotubes"; Science; Bearing a date of May 19, 2006; pp. 1034-1037; vol. 312; located at: www.sciencemag.org.

Jain, KK; "Conference Scene: Lab-on-a-Chip and Microarrays: Discovery and Development"; Pharmacogenomics; Bearing a date of 2003; pp. 123-125; vol. 4, No. 2; Ashley Publications Ltd; located at: www.pharmaco-genomics.com.

Jarvius, Jonas; DNA Tools and Microfluidic Systems for Molecular Analysis; Digital Comprehensive Summaries of Uppsala Dissertations from the Faculty of Medicine 161; Bearing a date of 2006; pp. 1-66; ISBN 91-554-6616-8; Acta Universitatis Upsaliensis Uppsala.

"Nano World: Fast Flow Through Nanotube Membranes (Update)"; Physorg.com; Bearing a date of 2006; pp. 1-2; United Press International; located at: www.physorg.com/news67262683.html.

Sambrook, Joseph; Russell, David W.; "Molecular Cloning: A Laboratory Manual"; Bearing a date of Jan. 15, 2001; 2,344 pages; 3 Edition; ISBN 0-87969-577-3; Cold Spring Harbor Laboratory Press (not provided).

Sholl, David S.; Johnson, J. Karl; "Materials Science: Making High-Flux Membranes with Carbon Nanotubes"; Science; Bearing a date of May 19, 2006; pp. 1003-1004; vol. 312; AAAS; located at: www.sciencemag.org.

Singh-Zocchi, Mukta; Dixit, Sanhita; Ivanov, Vassili; Zocchi, Giovanni; "Single-Molecule Detection of DNA Hybridization"; Bearing a date of Jun. 24, 2003; pp. 7605-7610; vol. 100, No. 13; located at: www.pnas.org/cgi/doi/10.1073/pnas.1337215100.

Wang, J.; Li, J.; Baca, AJ.; Hu, J.; Zhou, F.; Yan, W.; Pang, DW.; "Amplified Voltammetric Detection of DNA Hybridization via Oxidation of Ferrocene Caps on Gold Nanoparticle/Streptavidin Conjugates"; Anal. Chem.; Bearing a date of Aug. 1, 2003; pp. 3941-3945 (p. 1); vol. 75, No. 15; PubMED; located at: http://www.ncbi.nlm.nih.gov/entrez/query.fcgi?cmd=Retrieve&db=PubMed&list_uids=14572067&dopt=Abstract; printed on Nov. 29, 2006.

Xiao, YI; Lubin, Arica A.; Baker, Brian R.; Plaxco, Kevin W.; Heeger, Alan J.; "Single-Step Electronic Detection of Femtomolar DNA by Target-Induced Strand Displacement in an Electrode-Bound Duplex"; PNAS; Bearing a date of Nov. 7, 2006; pp. 16677-16680; vol. 103, No. 45; located at: www.pnas.org/cgi/doi/10.1073/pnas.0607693103.

Aihara, K; Kajimoto, O; Hirata, H; Takahashi, R; Nakamura, Y; "Effect of powdered fermented milk with *Lactobacillus helveticus* on subjects with high-normal blood pressure or mild hypertension"; J. Am. Coll. Nutr.; Bearing a date of Aug. 2005; pp. 257-265 (pp. 1-2); vol. 24, No. 4; PubMed; located at: http://www.ncbi.nlm.nih.gov/sites/entrez?db=pubmed&list_uids=16093403&cmd=Retrieve&indexed=goggle; printed on Jun. 25, 2007.

Bassaganya-Riera, J.; Hontecillas, R.; Wannemuehler, M.; "Nutrition impact of conjugated linoleic acid: A model functional food ingredient"; In Vitro Cellular and Development Biology-Plant; May 2002; pp. 241-246 (pp. 1-2); vol. 38, No. 3; Online ISSN 1475-2689; Springer; located at: http://www.ingentaconnect.com/content/klu/ivp/2002/00000038/00000003/02002295?crawler=true; printed on Jun. 25, 2007.

U.S. Appl. No. 11/824,604, Jung et al.

U.S. Appl. No. 11/824,529, Jung et al.

Blum, K; Meshkin, B; Downs, BW; "DNA based customized Nutraceutical 'gene therapy' utilizing a genoscore: a hypothesized paradigm shift of a novel approach to the diagnosis, stratification, prognosis and treatment of inflammatory processes in the human"; Med. Hypotheses; Bearing dates of 2006 and Jan. 5, 2006; pp. 1008-1018 (pp. 1-2); vol. 66, No. 5; PubMed; located at: http://www.ncbi.nlm.nih.gov/sites/entrez?db=pubmed; printed on Jun. 11, 2007.

Chen, ZP; Schell, JB; Ho, CT; Chen, KY; "Green tea epigallocatechin gallate shows a pronounced growth inhibitory effect on cancerous cells but not on their normal counterparts"; Cancer Lett.; Jul. 17, 1998; pp. 173-179 (pp. 1-2); vol. 129, No. 2; PubMed; located at: http://www.ncbi.nlm.nih.gov/sites/entrez?db=pubmed; printed on Jun. 22, 2007.

Dumont, Yannick; D'Amours, Martin; Lebel, Marcel; Larivière, Richard; "Original Article: Supplementation with a low dose of L-arginine reduces blood pressure and endothelin-1 production in hypertensive uraemic rats"; Nephrol Dial Transplant; Bearing a date of 2001; pp. 746-754; vol. 16; European Renal Association-European Dialysis and Transplant Association.

Gosslau, A; Chen, M; Ho, CI-T; Chen, KY; "Translational Therapeutics: A methoxy derivative of resveratrol analogue selectively induced activation of the mitochondrial apoptotic pathway in transformed fibroblasts"; British Journal of Cancer; Bearing dates of 2005 and Jan. 25, 2005; pp. 513-521 (pp. 1-2); vol. 92; Online ISSN: 1532-1827; Cancer Research UK; located at: http://www.nature.com/bjc/journal/v92/n3/abs/6602300a.html; printed on Jun. 22, 2007.

Hobbs, Charlotte, A.; Sherman, Stephanie, L.; Yi, Ping; Hopkins, Sarah E.; Torfs, Claudine P.; Hine, R. Jean; Pogribna, Marta; Rozen, Rima; James, S. Jill; "Polymorphisms in Genes Involved in Folate Metabolism as Maternal Risk Factors for Down Syndrome"; Am. J. Hum. Genet.; Bearing a date of 2000; pp. 623-630; vol. 67; The American Society of Human Genetics.

Hodgson, JM; Watts, GF; Playford, DA; Burke, V; Croft, KD; "Original Communication-Coenzyme $Q_{10}$ improves blood pressure and glycaemic control: a controlled trial in subjects with type 2 diabetes"; European Journal of Clinical Nutrition; Bearing a date of 2002; pp. 1137-1142; vol. 56; Nature Publishing Group; located at: www.nature.com/ejen.

James, S. Jill; Pogribna, Marta; Pogribny, Igor P.; Melnyk, Stepan; Hine, R. Jean; Gibson, James B.; Yi, Ping; Tafoya, Dixie L.; Swenson, David H.; Wilson, Vincent L.; Gaylor, David W.; "Abnormal folate metabolism and mutation in the methylenetetrahydrofolate reductase gene may be maternal risk factors for Down syndrome"; The American Journal of Clinical Nutrition; Bearing a date of 1999; pp. 495-501; vol. 70; American Society for Clinical Nutrition; located at: www.ajcn.org; printed on Jun. 11, 2007.

Kanauchi, O; Igarashi, K; Ogata, R; Mitsuyama, K; Andoh, A; "A yeast extract high in bioactive peptides has a blood-pressure lowering effect in hypertensive model"; Curr. Med. Chem.; Bearing a date of 2005; pp. 3085-3090 (p. 1); vol. 12, No. 26; PubMed; located at: http://www.ncbi.nlm.nih.gov/sites/entrez?db=pubmed; printed on May 17, 2007.

Katan, Martijn B.; "Editorial: Health claims for functional foods"; BMJ; Bearing a date of Jan. 24, 2004; pp. 180-181 (pp. 1-3); vol. 328; BMJ Publishing Group Ltd.; located at: http://www.bmj.com/cgi/content/full/328/7433/180; printed on Jun. 11, 2007.

Khosh, Farhang; Khosh, Mehdi; "Natural Approach to Hypertension"; Alternative-Medicine Review; Bearing a date of 2001; pp. 590-600; vol. 6, No. 6; Thorne Research, Inc.

Kitajka, Klára; Sinclair, Andrew J.; Weisinger, Richard S.; Weisinger, Harrison S.; Mathai, Michael; Jayasooriya, Anura P.; Halver, John E.; Puskás, László G.; "Biochemistry: Effects of dietary omega-3 polyunsaturated fatty acids on brain gene expression"; PNAS; Bearing a date of Jul. 27, 2004; pp. 10931-10936; vol. 101, No. 30; The National Academy of Sciences of the USA; located at: www.pnas.org/cgi/doi/10.1073/pnas.0402342101.

Lu, Jiebo; Ho, Chi-Tang; Ghai, Geetha; Chen, Kuang Yu; "Differential Effects of Theaflavin Monogallates on Cell Growth, Apoptosis, and Cox-2 Gene Expression in Cancerous versus Normal Cells"; Cancer Research; Bearing a date of Nov. 15, 2000; pp. 6465-6471; vol. 60.

Lu, Jiebo; Ho, Chi-Tang; Ghai, Geetha; Chen, Kuang Yu; "Resveratrol analog, 3,4,5,4,'-tetrahydroxystilbene, differentially induces pro-apoptotic p53/Bax gene expression and inhibits the growth of transformed cells but not their normal counterparts"; Carcinogenesis; Bearing a date of 2001; pp. 321-328; vol. 22, No, 2; Oxford University Press.

Lucock, Mark; "Clinical Review: Science, Medicine, and the future—Is folic acid the ultimate functional food component for disease prevention?" BMJ; Bearing a date of Jan. 24, 2004; pp. 211-214 (pp. 1-9); vol. 328; BMJ Publishing Group Ltd.; located at: http://www.bmj.com/cgi/content/full/328/7433/211; printed on Jun. 22, 2007.

Ma, Jing; Stampfer, Meir J.; Giovannucci, Edward; Artigas, Carmen; Hunter, David J.; Fuchs, Charles; Willett, Walter C.; Selhub, Jacob; Hennekens, Charles H.; Rozen, Rima; "Methylenetetrahydrofolate Reductase Polymorphism, Dietary Interactions, and Risk of Colorectal Cancer"; Cancer Research; Bearing a date of Mar. 15, 1997; pp. 1098-1102; vol. 57.

Malnick, Stephen; Goland, Sorel; "Folic acid as ultimate in disease prevention Beware of vitamin B12 deficiency"; BMJ; Bearing a date of Mar. 27, 2004; pp. 1-2; vol. 328, No. 769; BMJ Publishing Group Ltd.; located at: http://www.bmj.com/cgi/content/full/328/7442/769; printed on Jun. 25, 2007.

Mills, JL; Kirke, PN; Molloy AM; Burke, H; Conley, Mr; Lee, YJ; Mayne, PD; Weir, DG; Scott, JM; "Methylenetetrahydrofolate reductase thermolabile variant and oral clefts"; Am. J. Med. Genet.; Bearing a date of Sep. 3, 1999; pp. 71-74 (p. 1); vol. 86, No. 1; PubMed; located at: http://www.ncbi.nlm.nih.gov/sites/entrez; printed on Jun. 25, 2007.

Mullan, Brian A.; Young, Ian S.; Fee, Howard; McCance, David R.; "Ascorbic Acid Reduces Blood Pressure and Arterial Stiffness in Type 2 Diabetes"; Hypertension—Journal of the American Heart Association; Bearing dates of Oct. 21, 2002 and 2002; pp. 804-809 (pp. 1-7); vol. 40; Online ISSN 1524-4563; American Heart Association, Inc.; located at: http://hyper.ahajournals.org/cgi/content/full/40/6/804; printed on May 17, 2007.

Park, YK; Kim, JS; Kang, MH; "Concord grape juice supplementation reduces blood pressure in Korean hypertensive men: double-blind, placebo controlled intervention trial"; Biofactors; Bearing a date of 2004; pp. 145-147 (p. 1); vol. 22, Nos. 1-4; PubMed; located at: http://www.ncbi.nlm.nih.gov/sites/entrez?cmd=Retrieve&db=PubMed&dopt=Citation&list_uids=15630270; printed on May 17, 2007.

Shizuka, F; Kido, Y; Nakazawa, T; Kitajima, H; Aizawa, C; Kayamura, H; Ichijo, N; "Antihypertensive effect of gamma-amino butyric acid enriched soy products in spontaneously hypertensive rats"; Biofactors; Bearing a date of 2004; pp. 165-167 (p. 1); vol. 22, Nos. 1-4; PubMed; located at: http://www.ncbi.nlm.nih.gov/sites/entrez?cmd=Retrieve&db=PubMed&list_uids=156 30275&dopt=Abstract; printed on May 17, 2007.

Steenge, Gery R.; Verhoef, Petra; Katan, Martijn B.; "Human Nutrition and Metabolism—Betaine Supplementation Lowers Plasma Homocysteine in Healthy Men and Women"; The Journal of Nutrition; Bearing a date of 2003; pp. 1291-1295; vol. 133; American Society for Nutritional Sciences; located at: jn.nutrition.org; printed on May 17, 2007.

Subbiah, MT; "Nutrigenetics and Nutraceuticals: the next wave riding on personalized medicine"; Transl Res.; Bearing a date of Feb. 2007; pp. 55-61 (pp. 1-2); vol. 49, No. 2; PubMed; located at: http://www.ncbi.nlm.nih.gov/sites/entrez; printed on Jun. 25, 2007.

Vieira Da Costa, VA; Vianna, LM; "Effect of alpha-tocopherol supplementation on blood pressure and lipidic profile in streptozotocin-induced diabetes mellitus in spontaneously hypertensive rats"; Clin. Chim. Acta.; Bearing a date of Jan. 2005; pp. 101-104 (p. 1); vol. 351, Nos. 1-2; PubMed; located at: http://www.ncbi.nlm.nih.gov/sites/entrez; printed on May 17, 2007.

Wan, Ruiqian; Camandola, Simonetta; Mattson, Mark P.; "Dietary supplementation with 2-deoxy-d-glucose improves cardiovascular and neuroendocrine stress adaptation in rats"; Am. J. Physiol Heart Circ. Physiol; Bearing dates of Oct. 10, 2003 and Apr. 26, 2004; pp. 1-13; vol. 287; American Physiological Society; located at: http://aipbeart.physiology.org/cgi/content/full/287/3/H1186; printed on May 17, 2007.

West, SG; Likos-Krick, A; Brown, P; Mariotti, F; "Oral L-arginine improves hemodynamic responses to stress and reduces plasma homocysteine in hypercholesterolemic men"; J. Nutr.; Bearing a date of Feb. 2005; pp. 212-217 (p. 1-2); vol. 135, No. 2; PubMed; located at: http://www.ncbi.nlm.nih.gov/sites/entrez?cmd=Retrieve&db=pubmed&dopt=Abstract&list_uids=15671215; printed on Jun. 25, 2007.

Wilson, A; Platt, R; Wu, Q; Leclerc, D; Christensen, B; Yang, H; Gravel, RA; Rozen, R; "A common variant in methionine synthase reductase combined with low cobalamin (vitamin B12) increases risk for spina bifida"; Mol. Genet. Metab.; Bearing a date of Aug. 1999; pp. 317-323 (p. 1); vol. 67, No. 4; PubMed; located at: http://www.ncbi.nlm.nih.gov/sites/entrez; printed on Jun. 25, 2007.

"A1C At-Home Test Kit-Introductory Offer (1 per customer, first time buyers Only)"; Amazon.com; bearing dates of 1996-2006; pp. 1-4; Amazon.com, Inc.; located at: http://www.amazon.com/gp/product/B0006JMPRG/ref=sr_11_1/103-2429377-9250203?ie=UTF8; printed on Jul. 10, 2006.

Abrams, Bernard; "Standing Rx packaging on its head"; Packagingdigest.com; bearing a date of Jun. 2005; pp. 1-3; located at http://www.packagingdigest.com/articles/200506/38.php; printed on Jun. 21, 2006.

Actis-Goretta, Lucas; Ottaviani, Javier I.; Fraga, Cesar G.; "Inhibition of Angiotensin Converting Enzyme Activity by Flavanol-Rich Foods"; Journal of Agricultural and Food Chemistry; bearing a date of 2006; pp. 229-234; vol. 54; American Chemical Society.

"Anemia Tests"; Home Health Testing; bearing dates of Dec. 1, 2005 and 2000; pp. 1-3; AbDiagnostics, Inc.; located at: http://www.homehealthtesting.com/anemia-tests.htm; printed on Jul. 24, 2006.

"Antioxidant Tests"; Home Health Testing; bearing dates of Dec. 1, 2005 and 2000; pp. 1-2; AbDiagnostics, Inc.; located at: http://www.homehealthtesting.com/antioxidant-tests.htm; printed on Jul. 24, 2006.

Appleton, David; Lockwood, Brian; "Building Bones with Nutraceuticals"; The Pharmaceutical Journal; bearing a date of Jul. 15, 2006; pp. 78-83; vol. 277; located at: http://www.pjonline.com/pdf/articles/pj_20060715_bones.pdf; printed on Aug. 22, 2006.

"Blood Testing and Sampling Kits"; BloodBook.com; bearing dates of Nov. 19, 2005 and 2000-2005; pp. 1-2; located at: http//www.bloodbook.com/test-kits.html; printed on Jul. 10, 2006.

"Body Balance: AntiOxidant Check"; Health HomeTest.com; bearing dates of 2003-2005; pp. 1-4; B Scientific, Inc.; located at: http://www.healthhometest.com/product_info.php?products_id=39; printed on Jul. 24, 2006.

"Body Balance: FemaleCheck / Estradiol, Progesterone & Testosterone"; Health HomeTest.com; bearing dates of 2003-2005; pp. 1-5; B Scientific, Inc.; located at: http://www.healthhometest.com/product_info.php?products_id=36; printed on Jul. 24, 2006.

"Body Balance: MaleCheck / Testosterone & DHEA"; Health HomeTest.com; bearing dates of 2003-2005; pp. 1-4; B Scientific, Inc.; located at: http://www.healthhometest.com/product_info.php?manufacturers_id=10&products_id=40; printed on Jul. 24, 2006.

"Body Balance: Mineral Check"; Health HomeTest.com; bearing dates of 2003-2005; pp. 1-8; B Scientific, Inc.; located at: http://www.healthhometest.com/product_info.php?products_id=35; printed on Jul. 24, 2006.

"Body Balance: Performance Check"; Health HomeTest.com; bearing dates of 2003-2005; pp. 1-7; B Scientific, Inc.; located at: http://www.healthhometest.com/product_info.php?products_id=82; printed on Jul. 24, 2006.

"Body Balance: Sleep Check / Melatonin"; Health HomeTest.com; bearing dates of 2003-2005; pp. 1-4; B Scientific, Inc.; located at: http://www.healthhometest.com/product_info.php?products_id=46; printed on Jul. 24, 2006.

"Body Balance: Stress Check / DHEA & Cortisol"; Health HomeTest.com; bearing dates of 2003-2005; pp. 1-6; B Scientific, Inc.; located at: http://www.healthhometest.com/product_info.php?products_id=43; printed on Jul. 24, 2006.

"Body Building Hormone Tests"; Home Health Testing; bearing dates of Dec. 1, 2005 and 2000; pp. 1-3; AbDiagnostics, Inc.; located at: http://www.homehealthtesting.com/performance-hormone-tests.htm; printed on Jul. 24, 2006.

Bridges, Andrew; "HIV/AIDS patients get $1^{st}$ once-daily pill"; Associated Press; bearing a date of 2006; pp. 1-3; Yahoo! Inc.; located at http://news.yahoo.com/s/ap/20060712/ap_on_he_me/hiv_one_pill; printed on Jul. 12, 2006.

"Browse by: Product Category"; Hach.com; bearing a date of 2006; pp. 1-2; Hach Company; located at: http://www.hach.com/hc/browse.exploded.product.category/PREVIOUS_BREADCRUMB_ID=/SES SIONID|BzFO VFUzTnpZME1URTB OQ1puZFdWem-RFMUNTZz09QTFOVU1URQ==|; printed on Jul. 14, 2006.

Chiu, KM; Keller, ET; Crenshaw, TD; Gravenstein, S.; "Carnitine and dehydroepiandrosterone sulfate induce protein synthesis in porcine primary osteoblast-like cells"; Calcified Tissue International; bearing a date of Jun. 1999; pp. 527-533 (pp. 1-2); vol. 64, Issue 6; PubMed; located at: http://www.ncbi.nlm.nih.gov/entrez/query.fcgi?cmd=Retrieve&db=PubMed&list_uids=10341026&dopt=Abstract; printed on Aug. 22, 2006.

"Clearrx System: Body"; pp. 1-4; located at http://www.index2005.dk/Members/tenamikesy/bodyObject; printed on Jun. 21, 2006.

"Clinical Laboratory: Beckman Coulter clinical systems help to simplify and automate laboratory processes"; Beckman Coulter.com; bearing dates of 1998-2006; p. 1; Beckman Coulter, Inc.; located at: http://www.beckmancoulter.com/products/pr_clinical_lab.asp; printed on Jul. 14, 2006.

Colucci, S; Mori, G; Vaira, S; Brunetti, G; Greco, G; Mancini, L; Simone, GM; Sardelli, F; Koverech, A; Zallone, A; Grano, M; "L-carnitine and isovaleryl L-carnitine fumarate positively affect human osteoblast proliferation and differentiation in vitro"; Calcified Tissue International; bearing a date of Jun. 2005; pp. 458-465 (pp. 1-2); vol. 76, Issue 6; PubMed; located at: http://www.ncbi.nlm.nih.gov/entrez/query.fcgi?cmd=Retrieve&db=PubMed&list_uids=15906015&dopt=Abstract; printed on Aug. 22, 2006.

"Confidential Home DNA Infidelity Testing, Infidelity Test Kit"; Gtldna.com; bearing dates of Jul. 10, 2006 and 2002-2005; pp. 1-3; The Genetic Testing Laboratories, Inc.; located at: http://www.gtldna.com/infidelity.html; printed on Jul. 10, 2006.

Davidow, Julie; "Surge in home diagnostic kits provides doctor in a box"; Seattlepi.com; bearing dates of Mar. 29, 2006 and 1996-2006; pp. 1-4; Seattle Post-Intelligencer; located at: http://seattlepi.nwsource.com/health/264716_hometesting29.html; printed on Jul. 10, 2006.

"Direct to Consumer Blood Test Index"; PreventiveLabs.com; bearing a date of 2004; pp. 1-6; Preventive Services, LLC; located at: http://www.preventivelabs.com/lab_test/blood_test.cfm; printed on Jul. 10, 2006.

"DR / 2400 Portable Spectrophotometer, 115 Vac"; Hach.com; bearing a date of 2006; p. 1; Hach Company; located at: http://www.hach.com/hc/search.product.details.invoker/PackagingCode=5940000/NewLinkLabel=DR%26frasl%3B2400+Portable+Spectrophotometer%2C+115+Vac/PREVIOUS_BREADCRUMB_ID=HC_SEARCH_KEYWORD/SESSIONID|BzFOVFUzTnpFMk56WXINUIpuZFdWemRFTk9-Vdz09QTFsTkIURQ==|; printed on Jul. 14, 2006.

"DR 5000 UV-VIS Spectrophotometer (115 Vac)"; Hach.com; bearing a date of 2006; p. 1; Hach Company; located at: http://www.hach.com/hc/search.product.details.invoker/PackagingCode=DR5000-01/NewLinkLabel=DR+5000+UV-Vis+Spectrophotometer%2C+115+Vac/PREVIOUS_BREADCRUMB_ID=HC_SEARCH_BROWSE_PRODUCTSpectrophotometersColorimeters/SESSIONID|B3hOVFUxTnpjeE5qYzJNakVtWjNWbGMzUk-RUZz09QWxOW1RURQ==|; printed on Jul. 14, 2006.

"Drugstore.com-online pharmacy & drugstore, prescriptions filled"; drugstore.com; bearing dates of 1999-2006; pp. 1 (Sheets 1-3), pp. 2 (Sheets 1-4), pp. 3 (Sheets 1-2) (pp. total 1-9); drugstore.com, inc.; located at: http://www.drugstore.com/search/search.asp?searchtype=1&trx=28198&trxp1=60&ipp=20&srchtree=l&search=home+test+kit&Go.x=17&Go.y=16; printed on Jul. 10, 2006.

Duffy, SJ; Vita, JA; "Effects of phenolics on vascular endothelial function"; Current Opinion in Lipidology; bearing a date of Feb. 2003; pp. 21-27 (p. 1 ); vol. 14, Issue 1; PubMed; located at: http://www.ncbi.nlm.nih.gov/entrez/query.fcgi?cmd=Retrieve&db=PubMed&list_uids=12544657&dopt=Abstract; printed on Aug. 22, 2006.

Eskin, N.A. Michael; Dictionary of Nutraceuticals and Functional Foods (Functional Foods and Nutraceuticals); bearing a date of Dec. 19, 2005; 520 pages; ISBN No. 0849315727; CRC Press (not provided).

"Family Age Groups"; testsymptomsathome.com; pp. 1-4; located at: http://www.testsymptomsathome.com/family_age_groups.asp; printed on Jul. 10, 2006.

"FDA OKs 3-Drug Combo Pill to Treat HIV"; bearing a date of Jun. 30, 2006; pp. 1-2; FoxNews.com; located at http://www.foxnews.com/wires/2006Jun30/0,4670,AIDSRelief,00.html; printed on Jun. 30, 2006.

Felkey, Bill G.; Berger, Bruce A.; Krueger, Kem P.; "The Pharmacist's Role in Treatment Adherence—Part 5: The Impact of Pharmacy-Specific Technology"; U.S. Pharmacist; bearing dates of 2005, 2000-2005; and a posted date of Aug. 18, 2005; pp. 36-39 (pp. 1-6); vol. 30:08; Jobson Publishing, L.L.C.; located at: http://www.uspharmacist.com/index.asp?show=article&page=8_1547.htm; printed on Nov. 13, 2005.

"Female Hormone Tests"; Home Health Testing; bearing dates of Dec. 1, 2005 and 2000; pp. 1-3; AbDiagnostics, Inc.; located at: http://www.homehealthtesting.com/female-hormone-tests.htm; printed on Jul. 24, 2006.

Fitzgerald, Katherine A.; O'Neill, Luke A.J.; Gearing, Andy J.H.; Callard, Robin E.; "The Cytokine Factsbook"; bearing a date of Sep. 2001; 515 pages; 2nd Edition; ISBN No. 0121551423; Academic Press; San Francisco, CA (not provided).

Gennaro, Alfonso R. (Ed); Remington: The Science and Practice of Pharmacy; bearing a date of Dec. 15, 2000; 2077 pages; $20^{th}$ Edition; ISBN No. 0683306472; Lippincott Williams and Wilkins; Philadelphia, PA (not provided).

"Heart-Help's Handbook . . . Living with CM & CHF (Cardiomyopathy & Congestive Heart Failure)"; bearing a date of Sep. 23, 2001; pp. 1-5; located at: http://www.heart-help.net/handbook.html; printed on Nov. 13, 2005.

"Home Allergy Tests"; Home Health Testing; bearing dates of Dec. 1, 2005 and 2000; pp. 1-3; AbDiagnostics, Inc.; located at: http://www.homehealthtesting.com/allergy-tests.htm; printed on Jul. 24, 2006.

"Home DNA Maternity Testing, Test Kit, Blood Paternity Testing"; Gtldna.com; bearing dates of 2002-2005; pp. 2-5; The Genetic Testing Laboratories, Inc.; located at: http://www.gtldna.com/maternitytest.html; printed on Jul. 10, 2006.

"Home DNA Prenatal Paternity, Maternity, Siblingship Test, Twin Zygosity, Kinship, Immigration DNA Testing"; Gtldna.com; bearing dates of Jul. 10, 2006 and 2002-2005; pp. 1-5; The Genetic Testing Laboratories, Inc.; located at: http://www.gtldna.com/dnatests.html; printed on Jul. 10, 2006.

"Home Test Kits, Blood Groups, Diabetes, Menopause, Prostate, Osteoporosis"; WorldWideShoppingMall.co.uk; pp. 1-2; World Wide Shopping Mall (WWSM); located at: http://www.worldwideshoppingmall.co.uk/Body-Soul/shelves/home . . . ; printed on Jul. 10, 2006.

"Home Test Kits, Hepatitis Test, HIV Test, Blood Type Test"; Quick Medical: Professional and Home Health Products; bearing a date of 2006; pp. 1-2; located at: http://www.quickmedical.com/monitors/blood_testing/; printed on Jul. 10, 2006.

"Home Test Kits"; PriceGrabber.com; pp. 1 (Sheets 1-5), pp. 2 (Sheets 1-4), pp. 3 (1-5), pp. 4 (Sheets 1-3) (pp. total 1-17); PriceGrabber.com, Inc.; located at: http://www.pricegrabber.com/search_attrib.php/page_id=1970; printed on Jul. 10, 2006.

"Hormone Tests"; Home Health Testing; bearing dates of Dec. 1, 2005 and 2000; pp. 1-2; AbDiagnostics, Inc.; located at: http://www.homehealthtesting.com/hormone-tests.htm?gend-civ; printed on Jul. 24, 2006.

"Hormone Test Kit-Blood"; The Official Web Site of John R. Lee, MD: Your Information Source for Natural Hormone Balance and Natural HRT; pp. 1-3; Hormones Etc.; located at: http://www.johnleemd.com/store/prod_btest.html; printed on Jul. 10, 2006.

"Instant Anemia Test"; Health HomeTest.com; bearing dates of 2003-2005; pp. 1-9; B Scientific, Inc.; located at: http://www.health-hometest.com/product_info.php?products_id=81; printed on Jul. 24, 2006.

"Introducing Integrated Instrument + Reagent Analysis: Hach DR 5000™ UV-VIS Spectrophotometer and DR 2800™ Portable Spectrophotometer + new Hach TNTplus™ Vial Reagents"; Hach.com; bearing a date of 2006; pp. 1-3; Hach Company; located at: http://www.hach.com/photometry; printed on Jul. 14, 2006.

Keung, WM; "Anti-dipsotropic isoflavones: the potential therapeutic agents for alcohol dependence"; Medicinal Research Reviews; bearing a date of Nov. 2003; pp. 669-696 (pp. 1-2); vol. 23, Issue 6; PubMed; located at: http://www.ncbi.nlm.nih.gov/entrez/query.fcgi?cmd=Retrieve&db=PubMed&list_uids=12939789&dopt=Abstract; printed on Aug. 22, 2006.

Klinge, CM; Blankenship, KA; Risinger, KE; Bhatnagar, S; Noisin, EL; Sumanasekera, WK; Zhao, L; Brey, DM; Keynton, RS; "Resveratrol and estradiol rapidly activate MAPK signaling through estrogen receptors alpha and beta in endothelial cells"; The Journal of Biological Chemistry; bearing a date of Mar. 4, 2005; pp. 7460-7468 (pp. 1-2); vol. 280, Issue 9; PubMed; located at: http://www.ncbi.nlm.nih.gov/entrez/query.fcgi?cmd=Retrieve&db=PubMed&list_uids=15615701&dopt=Abstract; printed on Aug. 22, 2006.

Li, JX; Xue, B; Chai, Q; Liu, ZX; Zhao, AP; Chen, LB; "Antihypertensive effect of total flavonoid fraction of Astragalus complanatus in hypertensive rats"; The Chinese Journal of Physiology; bearing a date of Jun. 30, 2005; pp. 101-106 (pp. 1-2); vol. 48, Issue 2; PubMed; located at: http://www.ncbi.nlm.nih.gov/entrez/query.fcgi?cmd=Retrieve&db=PubMed&list_uids=16201455&dopt=Abstract; printed on Aug. 22, 2006.

Lin, RC; Guthrie, S; Xie, CY; Mai, K; Lee, DY; Lumeng, L; Li, TK; "Isoflavonoid compounds extracted from Pueraria lobata suppress alcohol preference in a pharmacogenetic rat model of alcoholism"; Alcoholism, Clinical & Experimental Research; bearing a date of Jun. 1996; pp. 659-663 (pp. 1-2); vol. 20, Issue 4; PubMed; located at: http://www.ncbi.nlm.nih.gov/entrez/query.fcgi?CMD=Display&DB=pubmed; printed on Aug. 22, 2006.

Machha, A; Mustafa, MR; "Chronic treatment with flavonoids prevents endothelial dysfunction in spontaneously hypertensive rat aorta"; Journal of Cardiovascular Pharmacology; bearing a date of Jul. 2005; pp. 36-40 (p. 1); vol. 46, Issue 1; PubMed; located at: http://www.ncbi.nlm.nih.gov/entrez/query.fcgi?CMD=Display&DB=pubmed; printed on Aug. 22, 2006.

"Male Hormone Tests"; Home Health Testing; bearing dates of Dec. 1, 2005 and 2000; pp. 1-2; AbDiagonistcs, Inc.; located at: http://www.homehealthtesting.com/male-hormone-tests.htm; printed on Jul. 24, 2006.

Mangels, Reed; "Vitamin B12 in the Vegan Diet"; The Vegetarian Resource Group: Nutrition; bearing dates of 1996-2003 and Jun. 20, 2006; pp. 1-3; The Vegetarian Resource Group; located at http://www.vrg.org/nutrition/b12.htm; printed on Jul. 7, 2006.

McClatchey, Kenneth D.; "Clinical Laboratory Medicine"; bearing a date of Jan. 15, 2002; 1693 pages; 2nd Edition; ISBN No. 0683307517; Lippincott Williams & Wilkins; Philadelphia, PA (not provided).

"Mineral & Toxic Element Tests"; Home Health Testing; bearing dates of Dec. 1, 2005 and 2000; pp. 1-3; AbDiagnostics, Inc.; located at: http://www.homehealthtesting.com/mineral-tests.htm; printed on Jul. 24, 2006.

Morrow, Daniel G.; Leirer, Von O.; Andrassy, Jill M.; "Using icons to convey medication schedule information"; Abstract; Science Direct; bearing dates of Aug. 1996, May 3, 1999 and 2000; pp. 1-2; vol. 27, Issue 4; Elsevier Ltd.; located at http://www.sciencedirect.com/science?_ob=ArticleURL&_udi=B6VIW-3WCSSG5-5&_coverDate=08%2F31%2F1996&_alid=413837048&_rdoc=1&_fmt=&_orig=search&_qd=1&_cdi=5685&_sort=d&view=c&_acct=C000050221&_version=1&_urlVersion=0&_userid=10&md5=8a92d091167ef0d84c80fe26ae9fdbae; printed on Jun. 7, 2006.

Morrow, Daniel G.; Weiner, Michael; Young, James; Steinley, Douglas; Deer, Melissa; Murray, Michael D.; "Improving Medication Knowledge Among Older Adults with Heart Failure: A Patient-Centered Approach to Instruction Design"; The Gerontologist; bearing a date of 2005; pp. 545-552; vol. 45, No. 4; Practice Concepts; The Gerontological Society of America.

Nissen, David (Ed); Mosby's Drug Guide; bearing a date of 2004; ISBN No. 0-323-02872-1; Mosby, Inc: Elsevier; St. Louis, MO (not provided).

"Occult Blood (stool)—Take-Home Test Kit—$25"; St. Vincent Healthcare; bearing a date of 2006; p. 1; located at: http://www.svh-mt.org/services/all_health/labcheck/occult_blood.htm; printed on Jul. 10, 2006.

"OnTime-RX Medication Reminders"; bearing dates of 2000-2004; pp. 1-4; AmeliaPlex, Inc.; Orlando, FL; located at: http://www.ontimerx.com/PDA/index.asp; printed on Nov. 13, 2005.

"Ovulation Predictor: Home Testing Kits"; Pharm.uky.edu; pp. 1-2; located at: http://www.pharm.uky.edu/hometest/Ovulate/OHP.html; printed on Jul. 10, 2006.

"Pain Relief / Injuries / Home Test Kits"; Round-Earth.com; pp. 1-2; Round Earth Publishing; located at: http://roundearth.stores.yahoo.net/relaxers.html; printed on Jul. 10, 2006.

"Personal Test Kits: Hormone Saliva Test, Home Hormone Test Kit"; Womenshealth.com; bearing a date of 2005; pp. 1-3; Women's Health America, Inc.; located at: http://www.womenshealth.com/personaltestkit.html; printed on Jul. 10, 2006.

Physicians' Desk Reference; The PDR Family Guide to Nutritional Supplements: An Authoritative A-to-Z Resource on the 100 Most Popular Nutritional Therapies and Nutraceuticals; bearing a date of Nov. 2003; 3000 pages; 58$^{th}$ Edition; ISBN No. 1563634724; Thomson PDR; Montvale, NJ (not provided).

Physicians' Desk Reference; The PDR Family Guide to Nutritional Supplements: An Authoritative A-to-Z Resource on the 100 Most Popular Nutritional Therapies and Nutraceuticals; bearing a date of Nov. 27, 2001; 352 pages; 1$^{st}$ Edition; ISBN No. 0345433769; Ballantine Books (not provided).

Pregnancy Test, Ovulation Test, Drug Test by Medimpex; bearing a date of 2002; pp. 1-3; Medimpex United Inc.; located at http://www.meditests.com/; printed on Jul. 10, 2006.

"Probiotics Basics"; bearing a date of 2004; pp. 1-11; CDRF, Dairy & Food Culture Technologies; located at: http://www.usprobiotics.org/basics/; printed on Jul. 7, 2006.

"Quality Standards Issued for Testing Herbal Products"; ScienceDaily; bearing dates of Apr. 18, 2006 and 1995-2006; pp. 1-2; ScienceDaily LLC; located at: http://www.sciencedaily.com/releases/2006/04/060418011332.htm; printed on Jul. 14, 2006.

Rapport, Lisa; Lockwood, Brian; Nutraceuticals; bearing a date of Dec. 2001; 184 pages; 1$^{st}$ Edition; ISBN No. 0 85369 503 2; Pharmaceutical Press (not provided).

Roberts, Arthur J.; Subak-Sharpe, Genelle; O'Brien, Mary E.; Nutraceuticals: The Complete Encyclopedia of Supplements, Herbs, Vitamins, and Healing Foods; bearing a date of Jan. 9, 2001; 669 pages; 1$^{st}$ Edition; ISBN No. 0399526323; Perigee Trade (not provided).

Samuel, Buck S.; Gordon, Jeffrey I.; "A Humanized Gnotobiotic Mouse Model of Host-Archaeal-Bacterial Mutualism"; PNAS; bearing dates of 2006, Mar. 16, 2006, May 17, 2006 and Jun. 27, 2006; pp. 10011-10016; vol. 103, No. 26; The National Academy of Sciences of the USA; located at: www.pnas.org/cgi/doi/10.1073/pnas.0602187103.

Sarkar, FH; Adsule, S; Padhye, S; Kulkarni, S; Li, Y; "The role of genistein and synthetic derivatives of isoflavone in cancer prevention and therapy"; Mini Reviews in Medicinal Chemistry; bearing a date of Apr. 2006; pp. 401-407 (pp. 1-2); vol. 6, Issue 4; PubMed; located at: http://www.ncbi.nlm.nih.gov/entrez/query.fcgi?CMD=Display&DB=pubmed; printed on Aug. 22, 2006.

"Search Results"; Health HomeTest.com; bearing dates of 2003-2005; pp. 1-2; B Scientific, Inc.; located at: http://www.health-hometest.com/index.php?cPath=40; printed on Jul. 24, 2006.

"Single Parameter Test Kits"; Hach.com; bearing a date of 2006; pp. 1-9; Hach Company; located at: http://www.hach.com/hc/browse.exploded.product.category.catalog/PRODCAT0033/NewLinkLabel=Single+Parameter+Test+Kits/PREVIOUS_BREADCRUMB_ID=HC_SEARCH_BROWSE/SESSIONID|BkUxT|RVM05UQTVPVFEzT0NabmRXVnpkRT-VEVWc9PUEwdFhNVA==|; printed on Jul. 14, 2006.

"Sleep Hormone Tests"; Home Health Testing; bearing dates of Dec. 1, 2005 and 2000; pp. 1-3; AbDiagnostics, Inc.; located at: http://www.homehealthtesting.com/sleep-tests.htm; printed on Jul. 24, 2006.

Smith, Ann; Heckelman, Patricia E.; O'Neil, Maryadele J. (Ed); Budavari, Susan (Ed); The Merck Index: An Encyclopedia of Chemicals, Drugs and Biologicals; bearing a date of Oct. 2001; 2564 pages; 13$^{th}$ Edition; ISBN No. 0911910131; John Wiley and Sons and Merck & Co. Inc.; Whitehouse Station, NJ (not provided).

Sojourner, Russell J.; Wogalter, Michael S.; "The Influence of Pictorials on Evaluations of Prescription Medication Instructions"; Drug Information Journal; bearing a date of 1997; pp. 963-972; vol. 31; Drug Information Association, Inc.

"Spectrophotometers and Colorimeters"; Hach.com; bearing a date of 2006; pp. 1-2; Hach Company; located at: http://www.hach.com/hc/browse.exploded.product.category.catalog/PRODCAT0001/NewLinkLabel=Spectrophotometers+%26+Colorimeters/PREVIOUS_BREADCRUMB_ID=HC_SEARCH_BROWSE/SESSIONID|A3INVE14TnpJeUITWm5kV1Z6ZEZCWIQxZEIN-VEUxTIE9PUNUTQ==|; printed on Jul. 14, 2006.

"Stress Hormone Tests"; Home Health Testing; bearing dates of Dec. 1, 2005 and 2000; pp. 1-3; AbDiagnostics, Inc., located at: http://www.homehealthtesting.com/stress-hormone-tests.htm; printed on Jul. 24, 2006.

"Talking Medicine Identifiers"; bearing a date of Jul. 10, 2003; pp. 1-5.

"UV-Vis-NIR Advantage Note"; bearing a date of May 2005; No. 1; pp. 1-3; Varian, Inc.; located at: www.varianinc.com/image/vimage/docs/applications/apps/uv_an1.pdf; printed on Jul. 14, 2006.

"UV-Vis-IR-Raman Spectrophotometers"; Micro Photonics; bearing a date of Dec. 7, 2005; pp. 1-2; Micro Photonics, Inc.; located at: http://www.microphotonics.com/spectrophotometer.html; printed on Jul. 14, 2006.

Wallerath, T; Deckert, G; Ternes, T; Anderson, H; Li, H; Witte, K; Forstermann, U; "Resveratrol, a polyphenolic phytoalexin present in red wine, enhances expression and activity of endothelial nitric oxide synthase"; Circulation; bearing a date of Sep. 24, 2002; pp. 1652-1658 (pp. 1-2); vol. 106, Issue 13; PubMed; located at: http://www.ncbi.nlm.nih.gov/entrez/query.fcgi?cmd=Retrieve&db=PubMed&list_uids=12270858&dopt=Abstract; printed on Aug. 22, 2006.

Walji, Rishma; "Acidophilus Effects, Benefits and Other Information"; About: Alternative Medicine; bearing a date of 2006; p. 1; Ablut, Inc., A part of *The New York Times Company*; located at: http://altmedicine.about.com/cs/digestiveproblems/a/Acidophilus.htm; printed on Jul. 7, 2006.

Walji, Rishma; "What are Probiotics?"; About: Alternative Medicine; bearing a date of 2006; p. 1; About, Inc., A part of *The New York Times Company*; located at: http://altmedicine.about.com/cs/digestiveproblems/a/Acidophilus_2.htm; printed on Jul. 7, 2006.

"What are Probioties?"; USProbiotics; bearing a date of 2004; 1 page; CDRF, Dairy & Food Culture Technologies; located at: http://www.usprobiotics.org/mainpageframe.htm; printed on Jul. 7, 2006.

Widdershoven, J.; Van Munster, P.; De Abreu, R.; Bosman, H.; Van Lith, TH.; Van Der Putten-Van Meyel, M.; Motohara, K.; Matsuda, I.; "Four Methods Compared for Measuring Des-Carboxy-Prothrombin (PIVKA-II)"; Clinical Chemistry; bearing a date of 1987; pp. 2074-2078; vol. 33, No. 11.

Wildman, Robert E.C.; Handbook of Nutraceuticals and Functional Foods; bearing a date of Nov. 10, 2000; 568 pages; 1$^{st}$ Edition; ISBN No. 0849387345; CRC Press (not provided).

Wynn, Susan G.; Emerging Therapies: Using Herbs and Nutraceuticals for Small Animals; bearing a date of 1999; 160 pages; 1$^{st}$ Edition; ISBN No. 1583260102; American Animal Hospital Assn Press (not provided).

U.S. Appl. No. 11/900,660, Jung et al.
U.S. Appl. No. 11/900,649, Jung et al.
U.S. Appl. No. 11/900,637, Jung et al.
U.S. Appl. No. 11/893,608, Jung et al.
U.S. Appl. No. 11/893,606, Jung et al.
U.S. Appl. No. 11/893,605, Jung et al.
U.S. Appl. No. 11/888,627, Jung et al.
U.S. Appl. No. 11/888,614, Jung et al.
U.S. Appl. No. 11/888,613, Jung et al.

Brüssow, Harald; "Phage Therapy: the *Escherichia coli* experience"; Microbiology; 2005; pp. 2133-2140; vol. 151.

Merril, Carl R.; Biswas, Biswajit; Carlton, Richard; Jensen, Nicole C.; Creed, G. Joseph; Zullo, Steve; Adhya, Sankar; "Long-circulating bacteriophage as antibacterial agents"; Proc. Natl. Acad. Sci.; Apr. 1996; pp. 3188-3192; vol. 93.

PCT International Search Report; International App. No. PCT/US2005/033347; Aug. 23, 2006; 4 pages.

PCT International Search Report; International App. No. PCT/US03/41466; Aug. 26, 2004; 2 pages.

PCT International Search Report; International App. No. PCT/US01/09745; Aug. 2, 2001; 1 page.

PCT International Search Report; International App. No. PCT/IL99/00122; Aug. 30, 1999; 2 pages.

"Smart Pillbox Goes Direct to Consumer"; Health Data Management; Bearing dates of Aug. 28, 2007 and Aug. 29, 2007; pp. 1-2; Health Data Management and SourceMedia, Inc.; located at: http://healthdata management.com/html/news/NewsStory.cfm?articleId=15652; printed on Aug. 29, 2007.

Woolley, AT et al.; "Functional integration of PCR amplification and capillary electrophoresis in a microfabricated DNA analysis device"; Anal Chem; Bearing a date of Dec. 1, 1996; pp. 4081-4086 (p. 1); vol. 68, No. 23; PubMed; located at: http://www.ncbi.nlm.nih.gov; printed on Aug. 2, 2007.

Wald, NJ; Law, MR; "A strategy to reduce cardiovascular disease by more than 80%"; BMJ; Jun. 28, 2003; pp. 1-6; vol. 326; located at: www.bmj.com.

PCT International Search Report; International App. No. PCT/US 06/47436; Jan. 30, 2008; pp. 1-2.

U.S. Appl. No. 12/011,008, Jung et al.
U.S. Appl. No. 11/977,174, Jung et al.

PCT International Search Report; International App. No. PCT/US07/25379; May 13, 2008; pp. 1-2.

PCT International Search Report; International App. No. PCT/US07/25417; May 14, 2008; pp. 1-3.

PCT International Search Report; International App. No. PCT/US07/25417; May 19, 2008; pp. 1-2.

PCT International Search Report; International App. No. PCT/US2007/025450; May 23, 2008; pp. 1-2.

PCT International Search Report; International App. No. PCT/US06/47835; Jul. 14, 2008; pp. 1-2.

Smith, Stevie; "New Chip Identifies Bird Flu in Humans"; The Tech Herald.com, WOTR Limited; 2008; located at: www.thetechherald.com/article/php200813/520/new-chip-identifies-bird-flu-in-humans; Bearing a date of Mar. 25, 2008; printed on Sep. 8, 2008; pp. 1-6.

PCT International Search Report; International App. No. PCT/US07/25451; Sep. 15, 2008; pp. 1-2.

PCT International Search Report; International App. No. PCT/US07/20272; Sep. 15, 2008; pp. 1-2.

PCT International Search Report; International App. No. PCT/US07/20305; Sep. 11, 2008; pp. 1-2.

PCT International Search Report; International App. No. PCT/US07/20283; Sep. 11, 2008; pp. 1-2.

PCT International Search Report; International App. No. PCT/US07/14994; Sep. 9, 2008; pp. 1-2.

PCT International Search Report; International App. No. PCT/US08/07993; Sep. 8, 2008; pp. 1-3.

PCT International Search Report; International App. No. PCT/US06/47451; Sep. 5, 2008; pp. 1-2.

PCT International Search Report; International App. No. PCT/US06/44658; Aug. 29, 2008; pp. 1-2.

PCT International Search Report; International App. No. PCT/US06/44279; Aug. 19, 2008; pp. 1-3.

PCT International Search Report; International App. No. PCT/US06/44283; Aug. 18, 2008; pp. 1-2.

PCT International Search Report; International App. No. PCT/US07/14266; Jul. 21, 2008; pp. 1-2.

Evans, R. Scott, Ph.D. et al.; "A Computer-Assisted Management Program for Antibiotics and Other Antiinfective Agents"; The New England Journal of Medicine; bearing a date of Jan. 22, 1998; pp. 232-238; vol. 338, No. 4; The Departments of Clinical Epidemiology (R.S.E., S.L.P., D.C.C., J.F.L., J.P.B.), Critical Care (T.P.C., L.K.W., J.F.O.,), and Medical Informatics (R.S.E.), LDS Hospital, Salt Lake City, UT.

Lagally, E.T. et al.; "Integrated Portable Genetic Analysis Microsystem for Pathogen/Infectious Disease Detection"; Analytical Chemistry; bearing a date of Jun. 1, 2004; pp. 3162-3170; vol. 76, No. 11; © 2004 American Chemical Society.

Leibovici, Leonard et al.; "A Causal Probabilistic Network for Optimal Treatment of Bacterial Infections"; IEEE Transactions on Knowledge and Data Engineering; bearing a date of Jul./Aug. 2000; pp. 517-528; vol. 12, No. 4; © 2000 IEEE.

U.S. Appl. No. 13/374,765, Jung et al.

Edible Science; bearing dates of 2005-2010; pp. 1-2; located at: http://www.ediblescience.com; printed on May 13, 2010.

Fightermins; bearing a date of 2010; 1 page; located at: http://www.fightermins.com/index.jsp; printed on May 13, 2010.

Ideal Health; "Custom Essentials"; "The Priva Test"; bearing a date of 2010; total of 5 pages; located at: http://www.idealhealth.com; printed on May 13, 2010; The Trump Network.

I-Vita; bearing a date of 2009; 1 page; located at: http://www.mynutrapack.com/index.html; printed on May 13, 2010.

LifeScript; bearing dates of 1998-2010; 1 page; located at: http://vitamins.lifescript.com/Begin.asp?BID=14971&PROMO=zluwiec; printed on May 13, 2010.

Mindell, Earl, Dr.; Vitaganic "Custom-Made Multivitamins"; bearing dates of 2005-2010; 1 page; located at: http://drmindell.vitaganic.com/; printed on May 13, 2010.

My Vitamin Clinic; bearing a date of 2010; 1 page; located at: http://www.myvitaminclinic.com/index.jsp; printed on May 13, 2010.

MyNutraPack; 1 page; located at: http://www.mynutrapack.com/index.html; printed on May 25, 2010.

MyVitaminRx; bearing a date of 2007; 1 page; located at: http://www.myvitaminsrx.com/CustomNutrition/CustomNutrition.aspx?ID=MoonlightSpa; printed on May 13, 2010.

Nature Made; pp. 1-2; located at: http://www.naturemade.com/; printed on May 13, 2010.

NutriHerb; bearing dates of 2001-2009; pp. 1-2; Nutri Herb, Inc.; located at: http://www.nutriherb.net/custom_made_to_order_herbal_vitamins_supplements.html; printed on May 13, 2010.

Pharmative LLC; 1 page; located at: http://www.pharmavite.com/index.asp; printed on May 13, 2010.

"Pharmavite LLC Launches New Direct-To-Consumer Company" Press Release; Pharmavite LLC; bearing a date of Sep. 4, 2009; 1 page; located at: http://www.pharmavite.com/MediaCenter/MC_PR.asp?ID=164; printed on May 13, 2010.

Signature Supplements; bearing a date of 2009; pp. 1-2; located at: http://www.signaturesupplements.com/jsp/main/index.jsp; printed on May 13, 2010; Signature Supplements.

Soyjoy®; bearing a date of 2010; 1 page; located at: http://www.soyjoy.com/index.aspx; printed on May 13, 2010; Pharmavite LLC.

Total Health Nutrients; pp. 1-2; located at: http://www.totalhealthnutrients.com/ph/index.html; printed on May 13, 2010.

VitaminID.com; bearing a date of 2010; 1 page; located at: http://www.vitaminid.com/webapp/wes/stores/servlet/StoreView?storeId=201 &langId=-1; printed on May 25, 2010; Pharmavite Direct LLC.

Vitamins on Demand; bearing a date of 2010; 1 page; located at: http://www.vitaminsondemand.com/?gclid=CNbygPut9aACFRYhDQodyGkivw; printed on May 13, 2010.

VitaXact; bearing a date of 2009; 1 page; located at: http://www.viaxact.com; printed on May 13, 2010.

Weil, Andrew, M.D.; "Dr. Weil's Vitamin Advisor & Complete Program Supplements"; bearing a date of 2010; 1 page; located at: https://www.drweilvitaminadvisor.com/drw/ecs/Va2/land_goog_08girl.html?aid=999910&aparam=TSAsGoogleApr10VA_vitamins&refcd=GO000000101882154s_vitamins&tsacr=GO3784957603&gclid=CM3NpLzm9aACFRYhDQodyGkivw; printed on May 13, 2010; Weil Lifestyle Custom Pak.

Mullett, Charles J. et al.; "Computerized antimicrobial decision support: an offline evaluation of a database-driven empiric antimicrobial guidance program in hospitalized patients with a bloodstream infection"; International Journal of Medical Informatics; 2004; pp. 455-460; vol. 73; Elsevier Ireland Ltd.

Sriskanthan, N. and Subramanian, K. R.; "Braille Display Terminal for Personal Computers"; IEEE Transactions on Consumer Electronics; May 1990; pp. 121-128; vol. 36, No. 2; IEEE.

UK Intellectual Property Office Examination Report Under Section 18(3); App. No. GB1000316.8; Jul. 26, 2011; pp. 1-3.

U.S. Appl. No. 11/524,084, Jung et al.
U.S. Appl. No. 11/904,016, Jung et al.
U.S. Appl. No. 11/906,112, Jung et al.
U.S. Appl. No. 11/355,517, Jung et al.
U.S. Appl. No. 11/339,316, Jung et al.
U.S. Appl. No. 11/314,949, Jung et al.
U.S. Appl. No. 11/314,764, Jung et al.
U.S. Appl. No. 11/291,532, Jung et al.
U.S. Appl. No. 11/285,753, Jung et al.
U.S. Appl. No. 11/285,500, Jung et al.
U.S. Appl. No. 11/283,548, Jung et al.

PCT International Search Report; International App. No. PCT/US 06/44664; Apr. 14, 2008; pp. 1-3.

PCT International Search Report; International App. No. PCT/US 06/44269; Sep. 18, 2007; pp. 1-2.

U.S. Appl. No. 12/924,700, Jung et al.

* cited by examiner

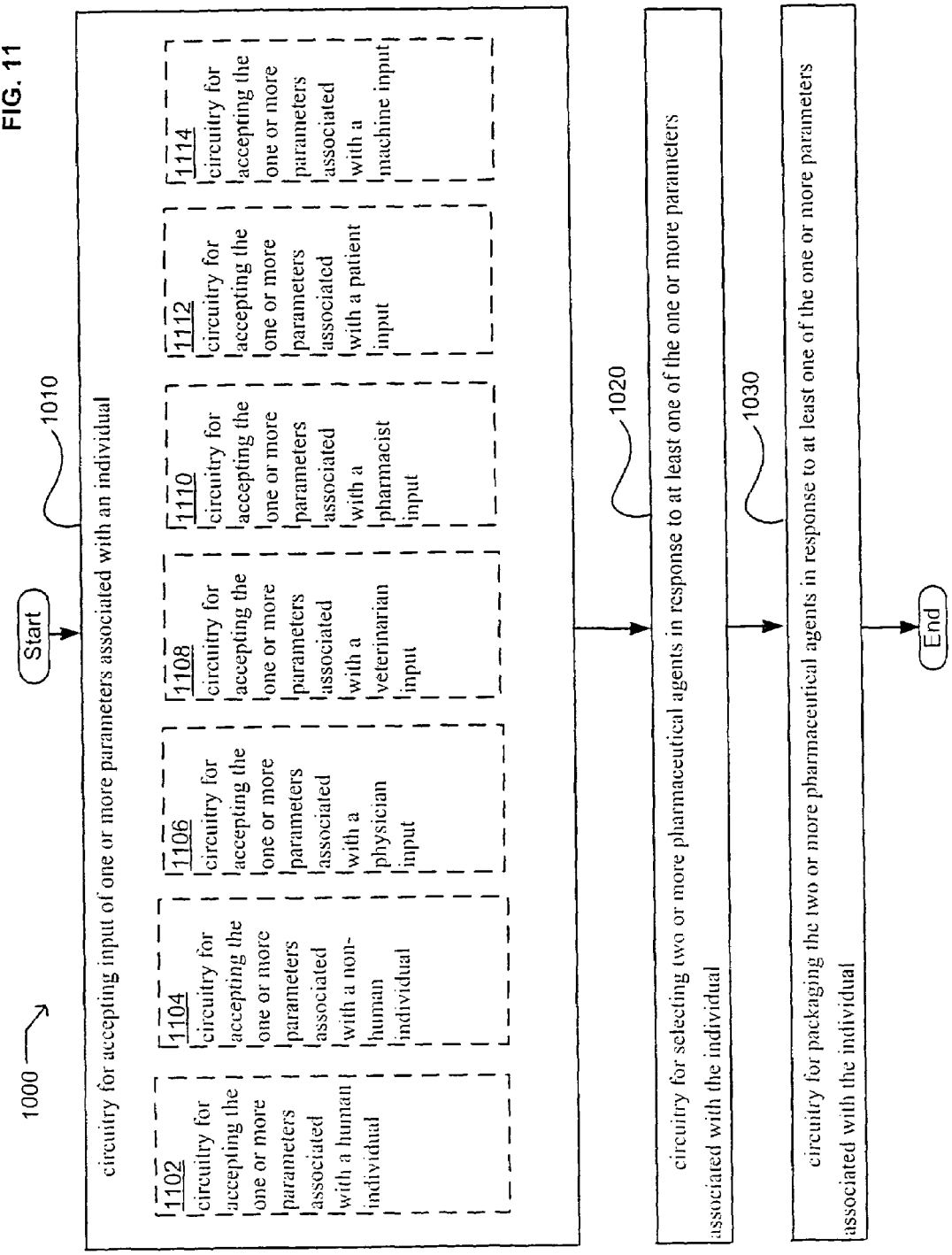

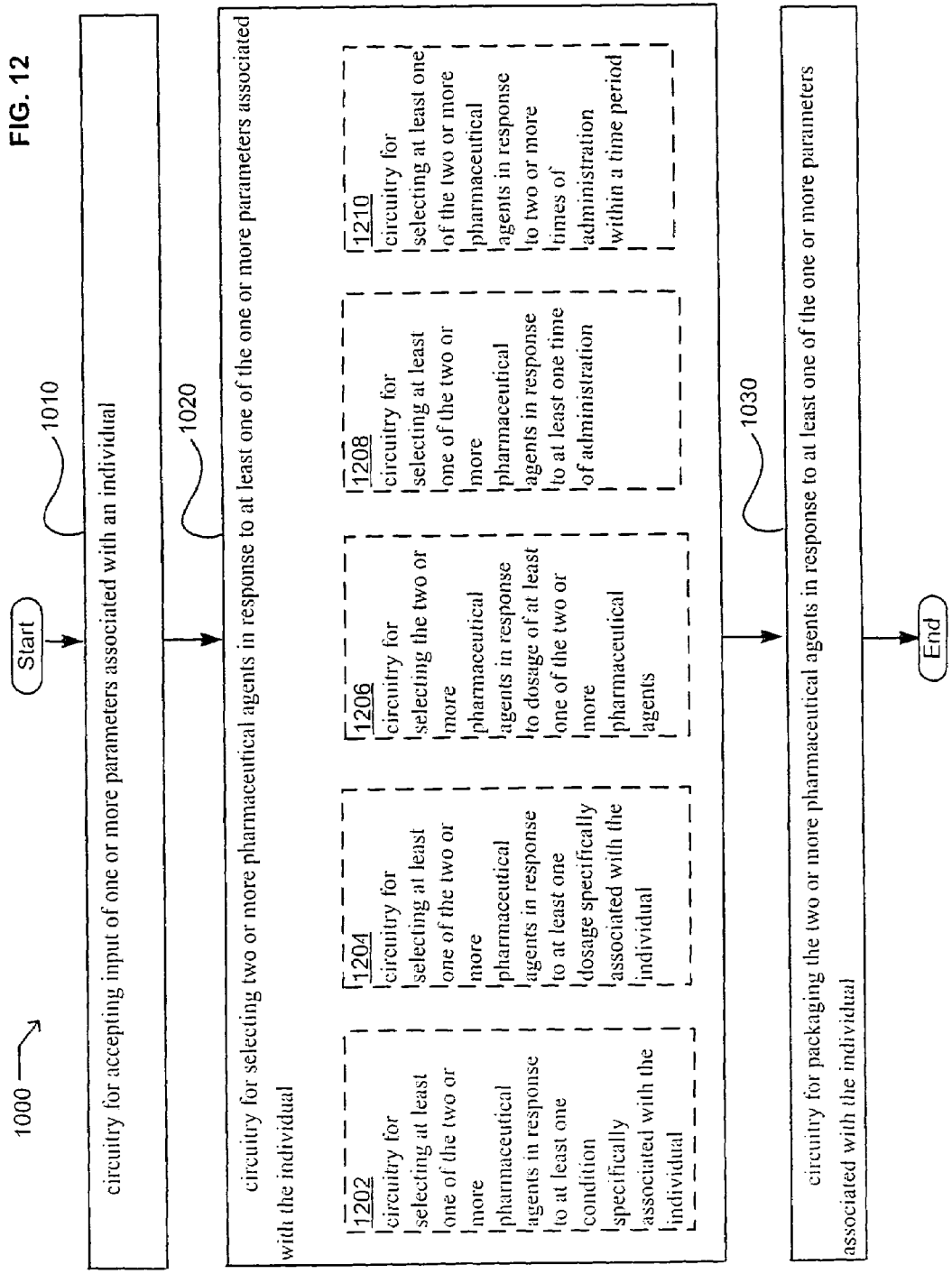

Start → 1010 circuitry for accepting input of one or more parameters associated with an individual

1020 circuitry for selecting two or more pharmaceutical agents in response to at least one of the one or more parameters associated with the individual

1302 circuitry for selecting at least one of the two or more pharmaceutical agents in response to one or more sites of administration associated with the individual

1304 circuitry for selecting at least one of the two or more pharmaceutical agents in response to one or more sites of release associated with the individual

1306 circuitry for selecting at least one of the two or more pharmaceutical agents in response to one or more physiological characteristics associated with the individual.

1308 circuitry for selecting at least one of the two or more pharmaceutical agents in response to cost associated with at least one of the two or more pharmaceutical agents

1310 circuitry for selecting at least one of the two or more pharmaceutical agents in response to compatibility of at least one of the pharmaceutical agents with another of the two or more pharmaceutical agents

1030 circuitry for packaging the two or more pharmaceutical agents in response to at least one of the one or more parameters associated with the individual End

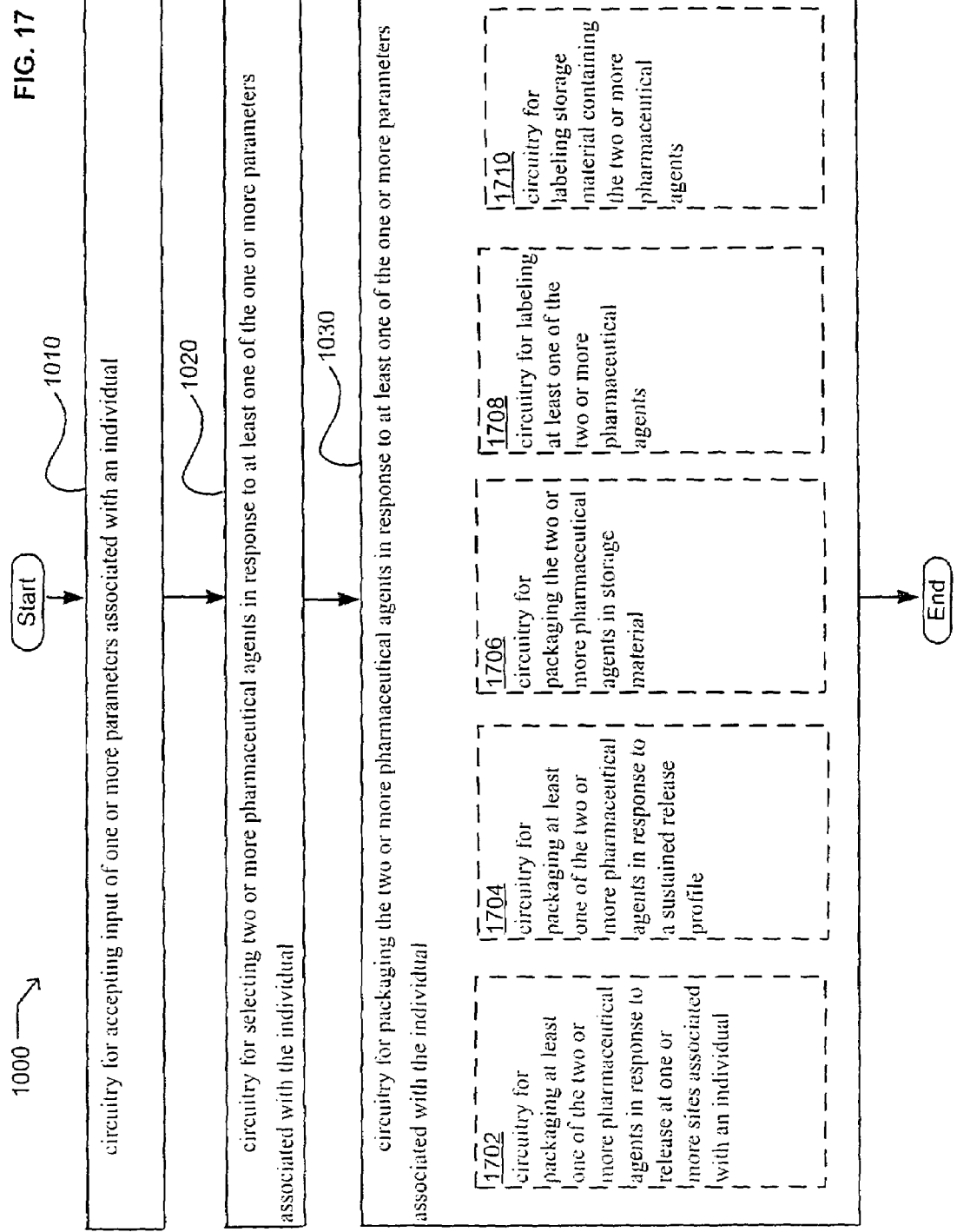

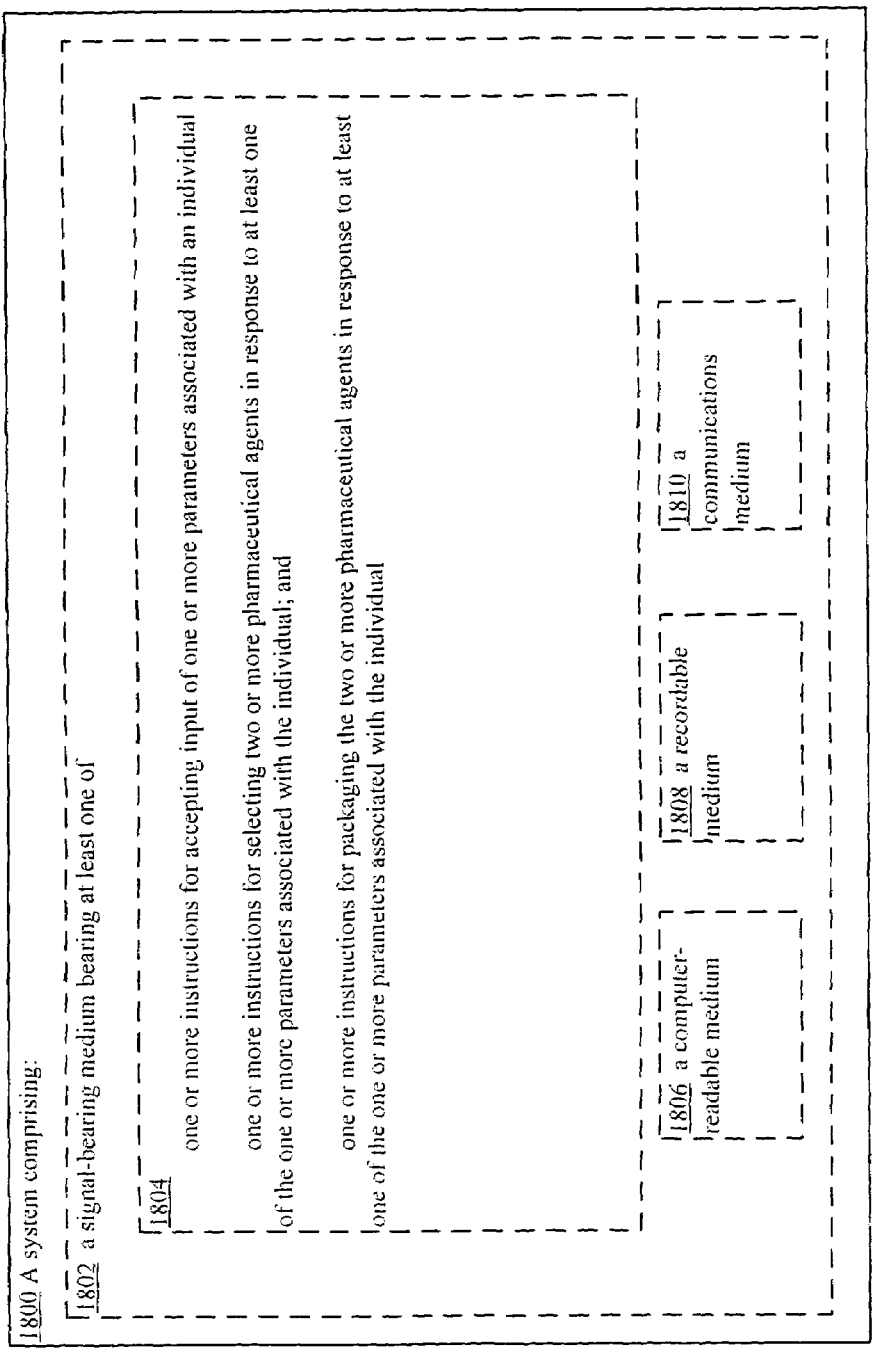

INDIVIDUALIZED PHARMACEUTICAL SELECTION AND PACKAGING

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/453,571, entitled INDIVIDUALIZED PHARMACEUTICAL SELECTION AND PACKAGING, naming Edward K. Y. Jung, Royce A. Levien, Robert W. Lord, Mark A. Malamud, John D. Rinaldo, Jr, and Lowell L. Wood, Jr. as inventors, filed 14 Jun. 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to individualized selection and packaging of pharmaceutical agents.

SUMMARY

In some embodiments a method is provided that includes accepting input of one or more parameters associated with an individual, selecting two or more pharmaceutical agents in response to at least one of the one or more parameters associated with the individual and packaging the two or more pharmaceutical agents in response to at least one of the one or more parameters associated with the individual. In addition to the foregoing, other method aspects are described in the claims, drawings, and text forming a part of the present disclosure.

In some embodiments a system is provided that includes circuitry for accepting input of one or more parameters associated with an individual, circuitry for selecting two or more pharmaceutical agents in response to at least one of the one or more parameters associated with the individual and circuitry for packaging the two or more pharmaceutical agents in response to at least one of the one or more parameters associated with the individual. In addition to the foregoing, other system aspects are described in the claims, drawings, and text forming a part of the present disclosure.

In some embodiments a system is provided that includes means for accepting input of one or more parameters associated with an individual, means for selecting two or more pharmaceutical agents in response to at least one of the one or more parameters associated with the individual, and means for packaging the two or more pharmaceutical agents in response to at least one of the one or more parameters associated with the individual. In addition to the foregoing, other system aspects are described in the claims, drawings, and text forming a part of the present disclosure.

In some embodiments a system is provided that includes a signal-bearing medium bearing at least one of, one or more instructions for accepting input of one or more parameters associated with an individual, one or more instructions for selecting two or more pharmaceutical agents in response to at least one of the one or more parameters associated with the individual, and one or more instructions for packaging the two or more pharmaceutical agents in response to at least one of the one or more parameters associated with the individual. In addition to the foregoing, other system aspects are described in the claims, drawings, and text forming a part of the present disclosure.

In some embodiments, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and/or text forming a part of the present application.

The foregoing summary is illustrative only and is not intended to be in any way limiting. In addition to the illustrative aspects, embodiments, and features described above, further aspects, embodiments, and features will become apparent by reference to the drawings, claims, and the following detailed description.

BRIEF DESCRIPTION OF THE FIGURES

FIG. 11 illustrates alternative embodiments of the example operation flow of FIG. 10.

FIG. 12 illustrates alternative embodiments of the example operation flow of FIG. 10.

FIG. 13 illustrates alternative embodiments of the example operation flow of FIG. 10.

FIG. 17 illustrates alternative embodiments of the example operation flow of FIG. 10.

FIG. 18 illustrates an example system 1800 in which embodiments may be implemented.

DETAILED DESCRIPTION

Figure 1:
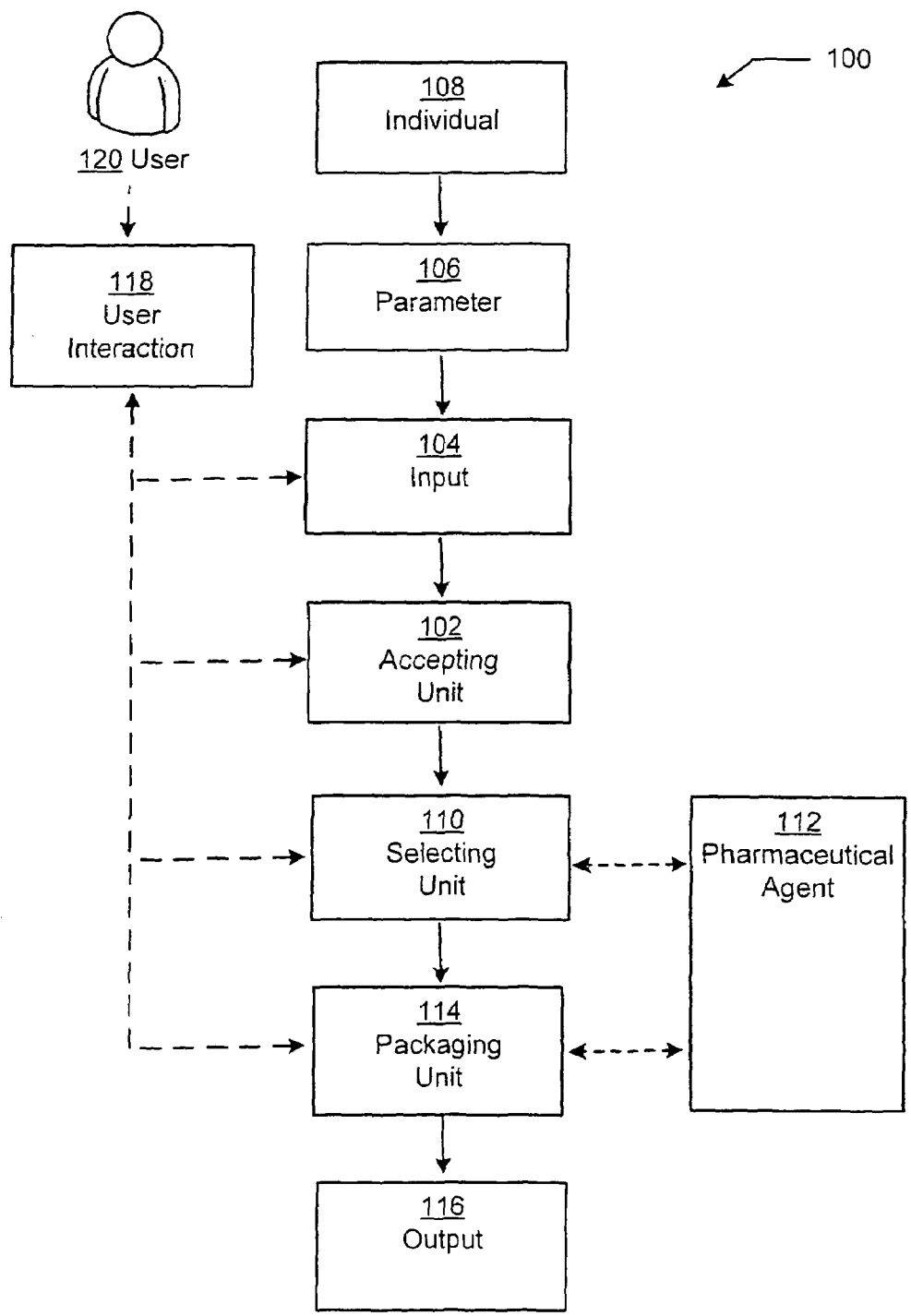
FIG. 1 illustrates an example system 100 in which embodiments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1 illustrates an example system 100 in which embodiments may be implemented. In some embodiments, the system 100 is operable to provide a method and system for individualized pharmaceutical selection and packaging. In some embodiments, one or more accepting units 102 accept input 104 of one or more parameters 106 associated with an individual 108, one or more selecting units 110 may then select two or more pharmaceutical agents 112 in response to at least one of the one or more parameters 106 associated with the individual 108, and one or more packaging units 114 may then package the two or more pharmaceutical agents 112 in response to at least one of the one or more parameters 106 associated with the individual 108. In some embodiments, the two or more pharmaceutical agents 112 may be packaged and output 116 in an administration form that may be administered to an individual 108. In some embodiments, the system provides for user interaction 118 with a user 120. In some embodiments, one or more users 120 may provide input 104 to one or more accepting units 102. In some embodiments, one or more users 120 may interact with one or more accepting units 102. In some embodiments, one or more users 120 may interact with one or more selecting units 110. In some embodiments, one or more users 120 may interact with one or more packaging units 114. In some embodiments, one or more users 120 may interact with one or more accepting units 102, one or more selecting units 110, one or more packaging units 114, and/or substantially any combination thereof. In some embodiments, the individual units may be combined together into a single system 100. For example, in some embodiments, the accepting unit 102, selecting unit 110, and packaging unit 114 may all be combined into a single system 100. In some embodiments, the individual units may be located in separate locations. For example, an accepting unit 102 may be located in one area, a selecting unit 110 may be located in another area, and a packaging unit 114 may be located in yet another area. For example, in some embodiments, an accepting unit 102 may be in the form of a personal digital assistant into which an individual 108 can input 104 parameters 106 associated with the individual 108. A separately located selecting unit 110 may receive information from the accepting unit 102 and select two or more pharmaceutical agents 112 in response to the one or more parameters 106 associated with the individual 108. A separately located packaging unit 114 may receive information from the selecting unit 110 and package two or more pharmaceutical agents 112 in response to the one or more parameters 106 associated with the individual 108. Accordingly, the individual units of the system 100 described in FIG. 1 may be oriented in substantially any physical combination. Such systems 100 may be located in numerous areas. Examples of such areas include, but are not limited to, hospitals, clinics, physician's offices, dentist's offices, pharmacies, individual homes, pharmaceutical companies, veterinary clinics, pet-owners homes, and the like.

Figure 2:
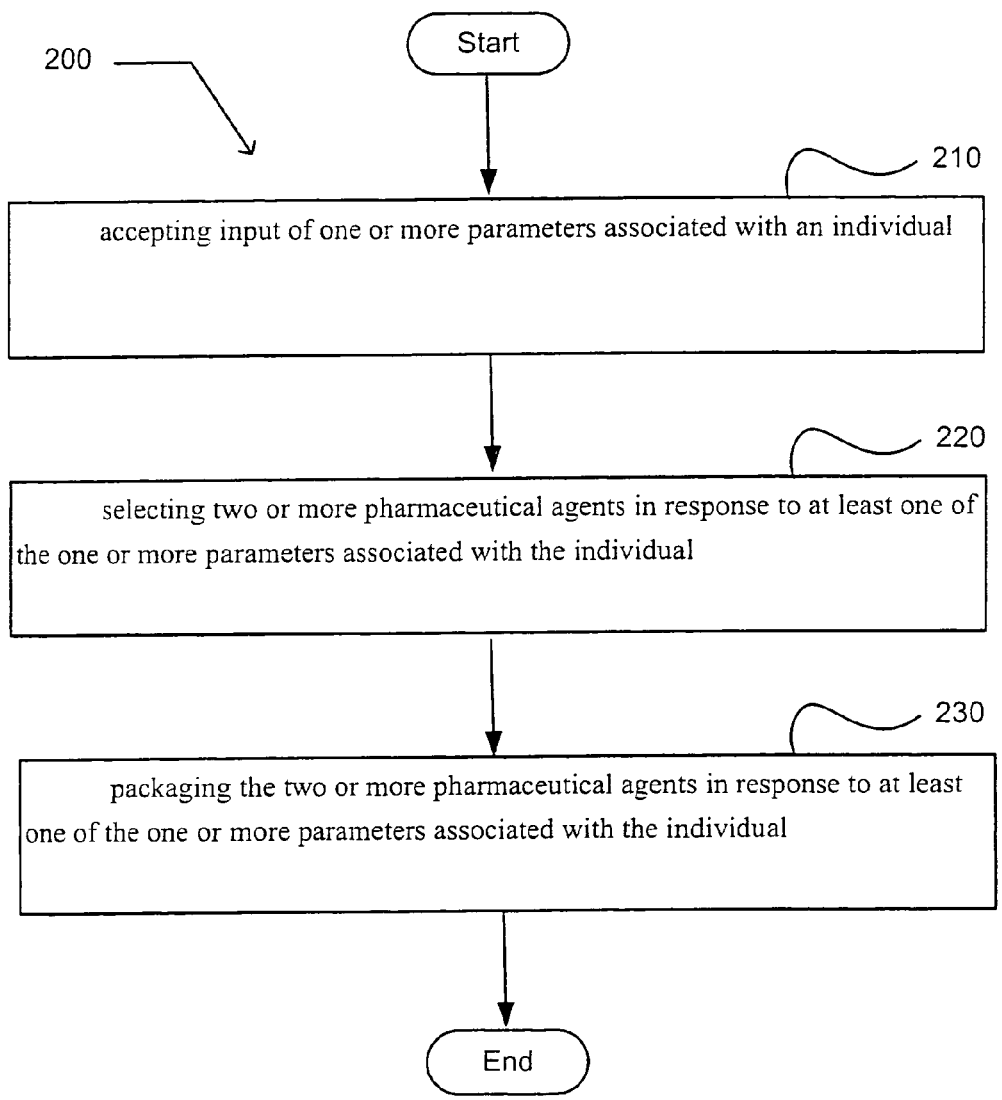
FIG. 2 illustrates an operational flow representing example operations related to methods for individualized pharmaceutical selection and packaging.

FIG. 2 illustrates an operational flow 200 representing examples of operations that are related to the performance of a method for individualized pharmaceutical selection and packaging. In FIG. 2 and in following figures that include various examples of operations used during performance of the method, discussion and explanation may be provided with respect to the above-described example of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 200 includes an accepting operation 210 involving accepting input of one or more parameters associated with an individual. In some embodiments, one or more accepting units 102 may accept input 104 of one or more parameters 106 associated with an individual 108.

In some embodiments, an individual 108 may be a human. In some embodiments, an individual 108 may be a non-human animal. Examples of such non-human animals include, but are not limited to, domestic pets such as dogs, cats, horses, potbelly pigs, ferrets, rodents, reptiles, amphibians, and the like. Non-human animals also include animals that include, but are not limited to, cattle, sheep, goats, chickens, pigs, and the like. Accordingly, the systems and methods described herein may be used in association with substantially any human and/or non-human animal.

Numerous parameters 106 may be associated with an individual 108. Such parameters 106 may include, but are not limited to, physical characteristics, metabolic characteristics, financial characteristics, and the like. Examples of parameters 106 include, an individual's height, weight, gender, kidney function, liver function, level of physical fitness, age, allergic response, metabolic level (i.e., resting metabolic rate and/or activity-related metabolic rate), disease state, body fat percentage, personal health habits (i.e., smoking, alcohol consumption, diet, illegal drug use, and the like), family health history, insurance coverage, food supplement usage, nutraceutical usage, non-prescription drug use, prescription drug use, pregnancy status, and the like.

Numerous technologies may be used to provide input 104 that include one or more parameters 106 associated with an individual 108. Examples of such technologies include, but are not limited to, hardwired input 104, wireless input 104, computer input 104, telephonic input 104, internet based input 104, intranet based input 104, digital input 104, analog input 104, input 104 from a human, input 104 from a palm held organizer, input 104 from a personal digital assistant, input 104 from a web enabled cellular telephone, and the like. In some embodiments, one or more accepting units 102 accept input 104 from one source. In some embodiments, one or more accepting units 102 accept input 104 from more than one source. For example, in some embodiments, an accepting unit 102 may accept input 104 from an insurance company, a physician, a pharmacist, a clinical laboratory and a pharmaceutical company. In some embodiments, input 104 may be associated with a physician input 104, a pharmacist input 104, a patient input 104, a machine input 104 and/or substantially any combination thereof.

In some embodiments, an accepting unit 102 may include an input device. For example, in some embodiments, an accepting unit 102 may include an interface, such as a keyboard, touch-screen and/or the like, where parameters 106 associated with an individual 108 may be input 104 directly into the accepting unit 102. In some embodiments, an accepting unit 102 may lack an interface where parameters 106 associated with an individual 108 may be directly input 104 into the accepting unit 102. In some embodiments, an accepting unit 102 may accept input 104 of one or more parameters 106 associated with an individual 108 from one or more locations that are remote from the accepting unit 102. For example, in some embodiments, an accepting unit 102 may accept input 104 from a wireless device, the internet, an intranet, a telephone, a palm held organizer, input 104 from a personal digital assistant, input 104 from a web enabled cellular telephone, and the like.

After a start operation, the operational flow 200 includes a selecting operation 220 involving selecting two or more pharmaceutical agents in response to at least one of the one or more parameters associated with the individual. In some embodiments, one or more selecting units 110 may select two or more pharmaceutical agents 112 in response to at least one of the one or more parameters 106 associated with the individual 108.

In some embodiments, one or more selecting units 110 act to select two or more pharmaceutical agents 112 in response to at least one of the one or more parameters 106 associated with an individual 108. In some embodiments, one or more selecting units 110 may select one or more first pharmaceutical agents 112 in response to at least one of the one or more parameters 106 associated with an individual 108 and select one or more second pharmaceutical agents 112 based on the identity of the one or more first pharmaceutical agents 112 selected. For example, in some embodiments, one or more selecting units 110 may select the first and second pharmaceutical agents 112 to act synergistically with each other when administered to an individual 108. In some embodiments, one or more selecting units 110 may select the first and second pharmaceutical agents 112 so that they do not contraindicate each other when administered to an individual 108. Pharmaceutical agents 112 may be selected in response to numerous parameters 106.

After a start operation, the operational flow 200 includes a packaging operation 230 involving packaging the two or more pharmaceutical agents in response to at least one of the one or more parameters associated with the individual. In some embodiments, one or more packaging units 114 may package the two or more pharmaceutical agents 112 in response to at least one of the one or more parameters 106 associated with the individual 108.

Numerous types of packaging units 114 may be used to package two or more pharmaceutical agents 112. In some embodiments, one packaging unit 114 is used to package two or more pharmaceutical agents 112. In some embodiments, one or more packaging units 114 are used to package two or more pharmaceutical agents 112. In some embodiments, two or more packaging units 114 are used to package two or more pharmaceutical agents 112. In some embodiments, a first packaging unit 114 may package one or more first pharmaceutical agents 112, a second packaging unit 114 may package one or more second pharmaceutical agents 112, and a third packaging unit 114 may package the one or more first pharmaceutical agents 112 and one or more second pharmaceutical agents 112 together. In some embodiments, one packaging unit 114 may package the two or more pharmaceutical agents 112. In some embodiments, one or more packaging units 114 may formulate two or more pharmaceutical agents 112 for administration to an individual 108. In some embodiments, one or more packaging units 114 may package two or more preformulated pharmaceutical agents 112 for administration to an individual 108. For example, in some embodiments, one or more packaging units 114 may package two or more commercially available pharmaceutical preparations to provide for single administration to an individual 108. In some embodiments, one or more packaging units 114 may package two or more preformulated tablets containing the two or more pharmaceutical agents 112 into a single capsule for administration to an individual 108. In some embodiments, one or more packaging units 114 may wrap a second pharmaceutical agent 112 around a first pharmaceutical agent 112 through use of a biocompatible and dissolvable wrapper to produce an administration form having the first and second pharmaceutical agents 112 in concentric orientation relative to each other. In some embodiments, one or more packaging units 114 may package two or more pharmaceutical agents 112 into a compartmentalized capsule.

Figure 3:
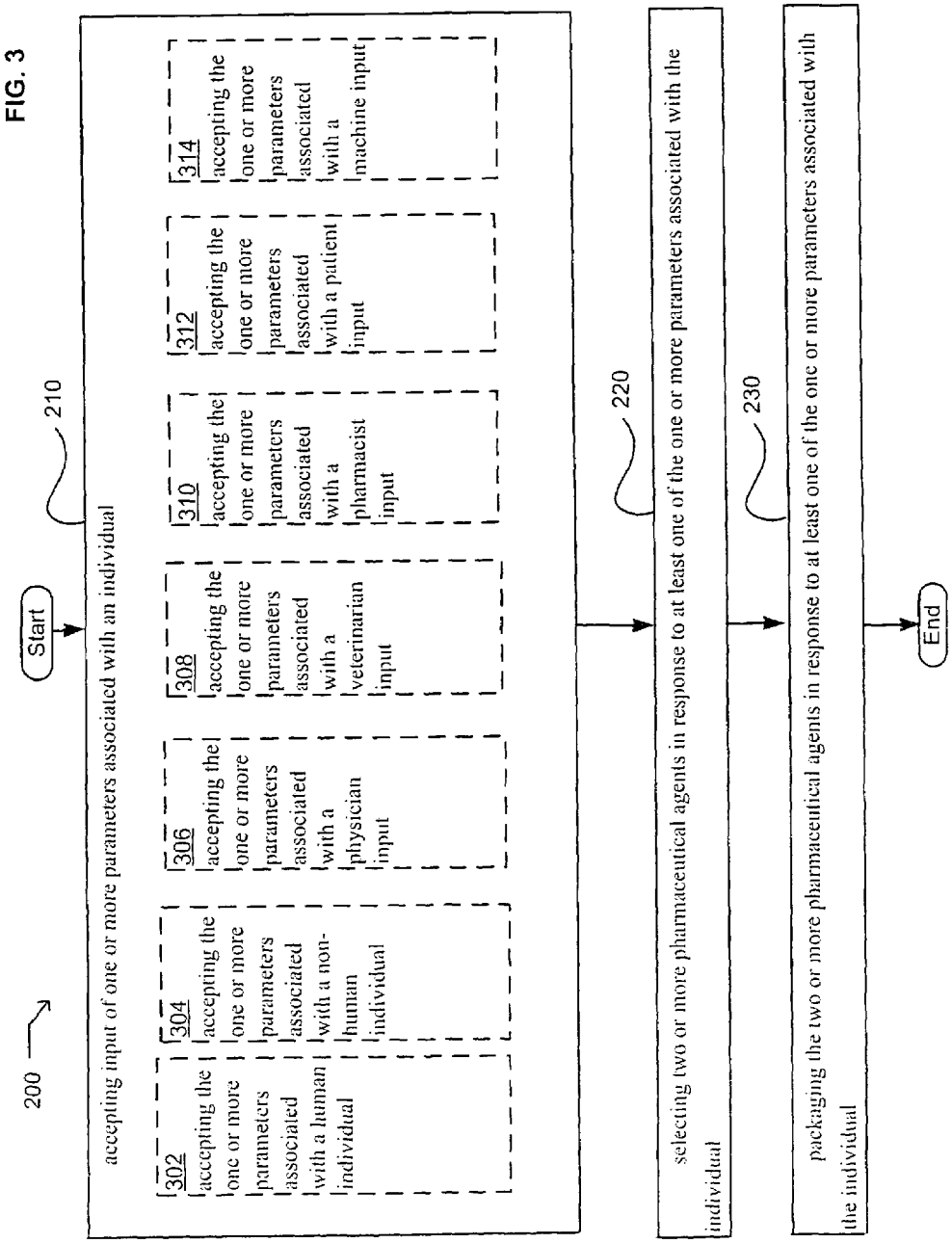
FIG. 3 illustrates alternative embodiments of the example operation flow of FIG. 2.

FIG. 3 illustrates alternative embodiments of the example operational flow 200 of FIG. 2. FIG. 3 illustrates example embodiments where the accepting operation 210 may include at least one additional operation. Additional operations may include an operation 302, operation 304, operation 306, operation 308, operation 310, operation 312 and/or operation 314.

At operation 302, the accepting operation 210 may include accepting the one or more parameters 106 associated with a human individual 108. In some embodiments, one or more accepting units 102 may accept the one or more parameters 106 associated with a human individual 108. In some embodiments, the one or more parameters 106 may include physical characteristics, metabolic characteristics, financial characteristics, and substantially any combination thereof. In some embodiments, such parameters 106 may include, alone or in combination and not limited to, an individual's height, weight, gender, kidney function, liver function, level of physical fitness, age, allergic response, metabolic level (i.e., resting metabolic rate and/or activity-related metabolic rate), disease state, body fat percentage, personal habits (i.e., smoking, alcohol consumption, diet, illegal drug use, and the like), family health history, insurance coverage, food supplement usage, physical activities, sleep schedule, activity level, occupation, nutraceutical usage, non-prescription drug use, prescription drug use, pregnancy status, predisposition toward the development of a malady, genotype, phenotype, genetic predisposition, administration form of a pharmaceutical agent, mode of administration, time of administration, administration schedule, exposure to pathogens, potential exposure to pathogens, exposure to toxins, potential exposure to toxins, and the like. For example, in some embodiments, one or more parameters 106 associated with a human child may be input 104. Accordingly, such parameters 106 may provide for selection of one or more pharmaceutical agents 112 that may be administered to a human child. In other embodiments, such parameters 106 may provide for selection against one or more pharmaceutical agents 112 that should not be administered to a human child. Accordingly, in some embodiments, an input 104 may provide for the selection of one or more pharmaceutical agents 112. However, in other embodiments, an input 104 may provide for selection against one or more pharmaceutical agents 112. In some embodiments, parameters 106 may be input 104 that relate to environmental factors such as, time, temperature, elevation, humidity, events, activities and the like. For example, an input 104 may include parameters 106 related to an individual 108 who is a mountain climber. Accordingly, one or more pharmaceutical agents 112 may be selected that will not vaporize under lessened atmospheric pressure, that will not freeze, and/or that will not break. In some embodiments, one or more parameters 106 may be input 104 that relate to administration form and mode of administration of the one or more pharmaceutical agents 112 to the individual 108. For example, in some embodiments, one or more parameters 106 may be input 104 that indicate that the individual 108 prefers to orally ingest pharmaceutical agents 112. In some embodiments, one or more parameters 106 may be input 104 that indicate that the individual 108 is to ingest two or more pharmaceutical agents 112 within a given time period. Accordingly, in some embodiments, an input 104 may be associated with the selection of two or more pharmaceutical agents 112 that are compatible with each other and/or that do not contraindicate each other. In some embodiments, an input 104 may be associated with the selection of two or more pharmaceutical agents 112 that act in a synergistic manner when administered to an individual 108.

At operation 304, the accepting operation 210 may include accepting the one or more parameters 106 associated with a non-human individual 108. In some embodiments, one or more accepting units 102 may accept the one or more parameters 106 associated with a non-human individual 108. Examples of such non-human animals include, but are not limited to, domestic pets such as dogs, cats, horses, potbelly pigs, ferrets, rodents, reptiles, amphibians, and the like. Non-human animals may also be animals that include, but are not limited to, cattle, sheep, goats, chickens, pigs, and the like. Accordingly, in some embodiments, the methods and/or systems described herein may be used for veterinary purposes. In some embodiments, the one or more parameters 106 may include physical characteristics, metabolic characteristics, financial characteristics (such as valuation of the non-human animal), and substantially any combination thereof. In some embodiments, such parameters 106 may include, alone or in combination and not limited to, a non-human individual's height, weight, gender, kidney function, liver function, level of physical fitness, age, allergic response, metabolic level (i.e., resting metabolic rate and/or activity-related metabolic rate), disease state, body fat percentage, health history, insurance coverage, food supplement usage, physical activities, sleep schedule, activity level, nutraceutical usage, non-prescription drug use, prescription drug use, pregnancy status, predisposition toward the development of a malady, genotype, phenotype, genetic predisposition, administration form, mode of administration, exposure to pathogens, potential exposure to pathogens, exposure to toxins, potential exposure to toxins, and the like. For example, in some embodiments, parameters 106 associated with an infant non-human individual 108 may be input 104. Accordingly, such parameters 106 may provide for selection of one or more pharmaceutical agents 112 that may be administered to an infant non-human individual 108. In other embodiments, such parameters 106 may provide for selection against one or more pharmaceutical agents 112 that should not be administered to an infant non-human individual 108. Accordingly, in some embodiments, an input 104 may provide for the selection of one or more pharmaceutical agents 112. However, in other embodiments, an input 104 may provide for selection against one or more pharmaceutical agents 112. In some embodiments, parameters 106 may be input 104 that relate to environmental factors surrounding the non-human individual 108 that include time, temperature, elevation, humidity, events, activities and the like. In some embodiments, one or more parameters 106 may be input 104 that relate to administration form and mode of administration of the one or more pharmaceutical agents 112 to the non-human individual 108. For example, in some embodiments, one or more parameters 106 may be input 104 that indicate that one or more pharmaceutical agents 112 should be administered to the non-human individual 108 orally. In some embodiments, one or more parameters 106 may be input 104 that indicate that the non-human individual 108 is to ingest two or more pharmaceutical agents 112 within a given time period. Accordingly, in some embodiments, an input 104 may be associated with the selection of two or more pharmaceutical agents 112 that are compatible with each other and/or that do not contraindicate each other. In some embodiments, an input 104 may be associated with the selection of two or more pharmaceutical agents 112 that act in a synergistic manner when administered to a non-human individual 108.

At operation 306, the accepting operation 210 may include accepting the one or more parameters 106 associated with a physician input 104. In some embodiments, one or more accepting units 102 may accept the one or more parameters 106 associated with a physician input 104. In some embodiments, one or more physicians may input 104 one or more parameters 106 associated with an individual 108. In some embodiments, one or more parameters 106 may be input 104 by one or more physicians and one or more other sources. Other sources of input 104 include, but are not limited to, veterinarian input 104, pharmacist input 104, patient input 104, machine input 104, and the like. In some embodiments, one or more physicians may examine the individual 108 and input 104 one or more parameters 106 associated with the individual 108 that are related to the examination. For example, one or more physicians may input 104 one or more parameters 106 associated with an individual's heart rate, skin condition, allergy status, sleep status, and the like. In some embodiments, one or more physicians may input 104 one or more parameters 106 associated with an individual 108 without ever seeing the individual 108. For example, in some embodiments, one or more physicians may review a medical chart associated with the individual 108 and input 104 parameters 106 based on the information contained in the medical chart. In some embodiments, one or more physicians may input 104 parameters 106 associated with an individual 108 from the physician's memory. In some embodiments, one or more physicians may input 104 parameters 106 associated with an individual 108 following consultation with a database and/or other source of information. In some embodiments, one or more physicians may input 104 parameters 106 associated with an individual 108 directly through use of a keyboard, a touch-screen, and the like. In some embodiments, one or more physicians may input 104 parameters 106 associated with an individual 108 remotely through use of numerous technologies that include, input 104 from a wireless device, the internet, an intranet, a telephone, a palm held organizer, input 104 from a personal digital assistant, input 104 from a web enabled cellular telephone, and the like.

At operation 308, the accepting operation 210 may include accepting the one or more parameters 106 associated with a veterinarian input 104. In some embodiments, one or more accepting units 102 may accept the one or more parameters 106 associated with a veterinarian input 104. In some embodiments, one or more veterinarians may input 104 one or more parameters 106 associated with a non-human individual 108. In some embodiments, one or more parameters 106 may be input 104 by one or more veterinarians and one or more other sources. Other sources of input 104 include, but are not limited to, physician input 104, pharmacist input 104, patient input 104, machine input 104, and the like. In some embodiments, one or more veterinarians may examine a non-human individual 108 and input 104 one or more parameters 106 associated with the non-human individual 108 that are related to the examination. For example, one or more veterinarians may input 104 one or more parameters 106 associated with a non-human individual's heart rate, skin condition, allergy status, sleep status, and the like. In some embodiments, one or more veterinarians may input 104 one or more parameters 106 associated with a non-human individual 108 without ever seeing the non-human individual 108. For example, in some embodiments, one or more veterinarians may review a medical chart associated with the non-human individual 108 and input 104 parameters 106 based on the information contained in the medical chart. In some embodiments, one or more veterinarians may input 104 parameters 106 associated with a non-human individual 108 from the veterinarian's memory. In some embodiments, one or more veterinarians may input 104 parameters 106 associated with a non-human individual 108 following consultation with a database and/or other source of information. In some embodiments, one or more veterinarians may input 104 parameters 106 associated with a non-human individual 108 directly through use of a keyboard, a touch-screen, and the like. In some embodiments, one or more veterinarians may input 104 parameters 106 associated with a non-human individual 108 remotely through use of numerous technologies that include, input 104 from a wireless device, the internet, an intranet, a telephone, a palm held organizer, input 104 from a personal digital assistant, input 104 from a web enabled cellular telephone, and the like.

At operation 310, the accepting operation 210 may include accepting the one or more parameters 106 associated with a pharmacist input 104. In some embodiments, one or more accepting units 102 may accept the one or more parameters 106 associated with a pharmacist input 104. In some embodiments, one or more pharmacists may input 104 one or more parameters 106 associated with an individual 108. In some embodiments, one or more parameters 106 may be input 104 by one or more pharmacists and one or more other sources. Other sources of input 104 include, but are not limited to, physician input 104, veterinarian input 104, patient input 104, machine input 104, and the like. In some embodiments, one or more pharmacists may consult with an individual 108 and input 104 one or more parameters 106 associated with the individual 108 that are related to the consultation. For example, one or more pharmacists may input 104 one or more parameters 106 associated with an individual's heart rate, skin condition, allergy status, sleep status, and the like. In some embodiments, one or more pharmacists may input 104 one or more parameters 106 associated with an individual 108 without ever seeing the individual 108. For example, in some embodiments, one or more pharmacists may receive information associated with the individual 108 and input 104 parameters 106 based on the received information. In some embodiments, one or more pharmacists may input 104 parameters 106 associated with an individual 108 from the pharmacist's memory. In some embodiments, one or more pharmacists may input 104 parameters 106 associated with an individual 108 following consultation with a database and/or other source of information. In some embodiments, one or more pharmacists may input 104 parameters 106 associated with an individual 108 directly through use of a keyboard, a touch-screen, and the like. In some embodiments, one or more pharmacists may input 104 parameters 106 associated with an individual 108 remotely through use of numerous technologies that include, input 104 from a wireless device, the internet, an intranet, a telephone, a palm held organizer, input 104 from a personal digital assistant, input 104 from a web enabled cellular telephone, and the like.

At operation 312, the accepting operation 210 may include accepting the one or more parameters 106 associated with a patient input 104. In some embodiments, one or more accepting units 102 may accept the one or more parameters 106 associated with a patient input 104. In some embodiments, a patient may input 104 one or more parameters 106 associated with the patient. In some embodiments, one or more parameters 106 may be input 104 by the patient and one or more other sources. Other sources of input 104 include, but are not limited to, physician input 104, pharmacist input 104, patient input 104, machine input 104, and the like. In some embodiments, a patient may input 104 one or more parameters 106 associated with the patient's heart rate, skin condition, allergy status, sleep status, and the like. In some embodiments, a patient may input 104 parameters 106 associated with the patient following consultation with a database and/or other source of information. In some embodiments, a patient may input 104 parameters 106 associated with the patient directly through use of a keyboard, a touch-screen, and the like. In some embodiments, a patient may input 104 parameters 106 associated with the patient remotely through use of numerous technologies that include, input 104 from a wireless device, the internet, an intranet, a telephone, a palm held organizer, input 104 from a personal digital assistant, input 104 from a web enabled cellular telephone, and the like. In some embodiments, a patient may input 104 parameters 106 associated with pharmaceutical agents 112 that are being administered to the patient. In some embodiments, a patient may input 104 parameters 106 associated with one or more times of administration of one or more pharmaceutical agents 112.

At operation 314, the accepting operation 210 may include accepting the one or more parameters 106 associated with a machine input 104. In some embodiments, one or more accepting units 102 may accept the one or more parameters 106 associated with a machine input 104. In some embodiments, the one or more parameters 106 may include physical characteristics, metabolic characteristics, financial characteristics, and substantially any combination thereof. In some embodiments, such parameters 106 may include, alone or in combination and not limited to, an individual's height, weight, gender, kidney function, liver function, level of physical fitness, age, allergic response, metabolic level (i.e., resting metabolic rate and/or activity-related metabolic rate), disease state, body fat percentage, personal habits (i.e., smoking, alcohol consumption, diet, illegal drug use, and the like), family health history, insurance coverage, food supplement usage, physical activities, sleep schedule, activity level, occupation, nutraceutical usage, non-prescription drug use, prescription drug use, pregnancy status, predisposition toward the development of a malady, genotype, phenotype, genetic predisposition, administration form of a pharmaceutical agent, mode of administration, time of administration, administration schedule, exposure to pathogens, potential exposure to pathogens, exposure to toxins, potential exposure to toxins, and the like. For example, in some embodiments, one or more parameters 106 associated with a human child may be input 104. Accordingly, such parameters 106 may provide for selection of one or more pharmaceutical agents 112 that may be administered to a human child. In other embodiments, such parameters 106 may provide for selection against one or more pharmaceutical agents 112 that should not be administered to a human child. Accordingly, in some embodiments, an input 104 may provide for the selection of one or more pharmaceutical agents 112. However, in other embodiments, an input 104 may provide for selection against one or more pharmaceutical agents 112. In some embodiments, parameters 106 may be input 104 that relate to environmental factors such as, time, temperature, elevation, humidity, events, activities and the like. For example, an input 104 may include parameters 106 related to an individual 108 who is a mountain climber. Accordingly, one or more pharmaceutical agents 112 may be selected that will not vaporize under lessened atmospheric pressure, that will not freeze, and/or that will not break. In some embodiments, one or more parameters 106 may be input 104 that relate to administration form and mode of administration of the one or more pharmaceutical agents 112 to the individual 108. For example, in some embodiments, one or more parameters 106 may be input 104 that indicate that the individual 108 prefers to orally ingest pharmaceutical agents 112. In some embodiments, one or more parameters 106 may be input 104 that indicate that the individual 108 is to ingest two or more pharmaceutical agents 112 within a given time period. Accordingly, in some embodiments, an input 104 may be associated with the selection of two or more pharmaceutical agents 112 that are compatible with each other and/or that do not contraindicate each other. In some embodiments, an input 104 may be associated with the selection of two or more pharmaceutical agents 112 that act in a synergistic manner when administered to an individual 108. In some embodiments, the machine is a diagnostic machine that has been utilized during examination of the individual 108.

Figure 4:
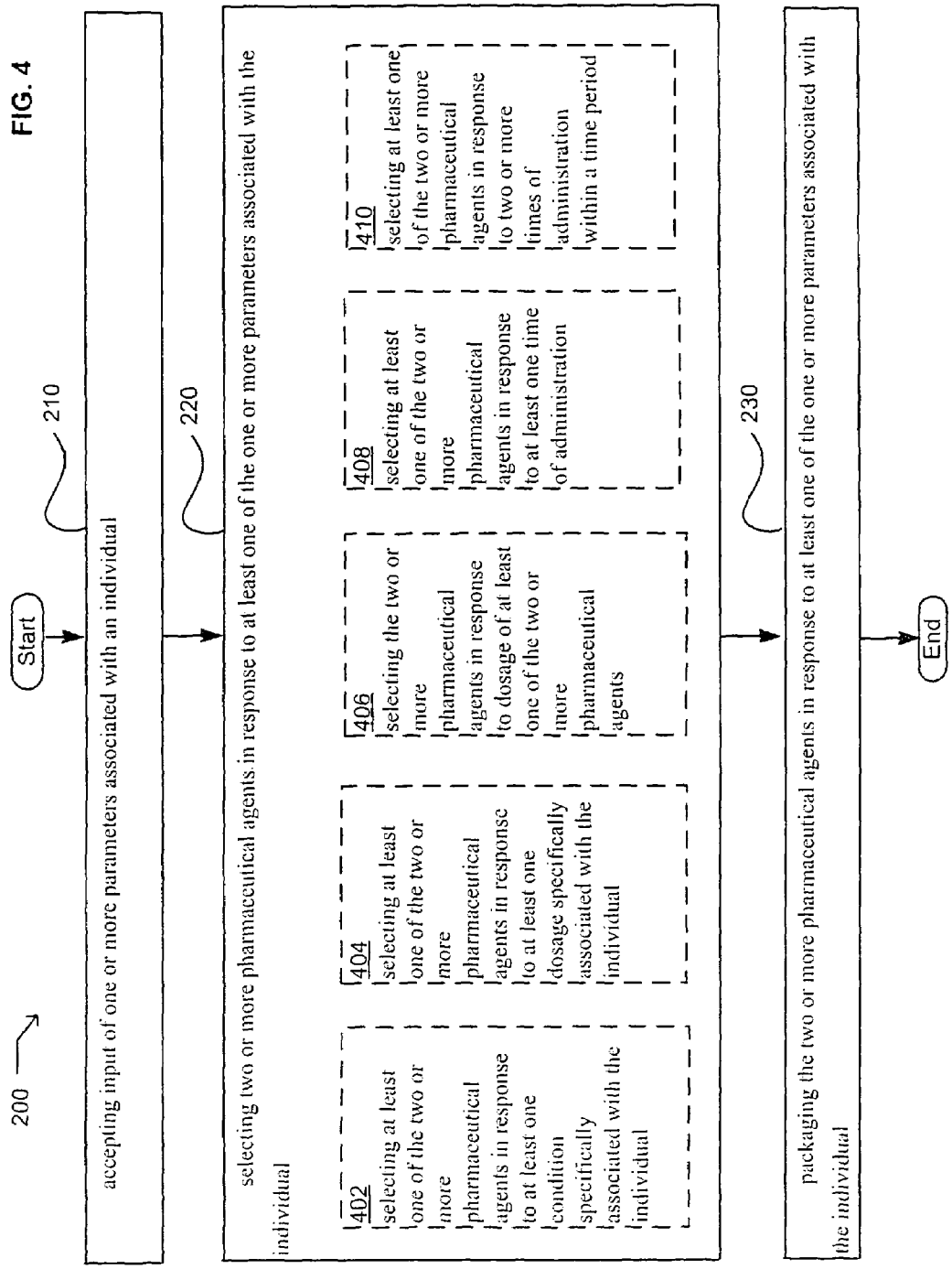
FIG. 4 illustrates alternative embodiments of the example operation flow of FIG. 2.

FIG. 4 illustrates alternative embodiments of the example operational flow 200 of FIG. 2. FIG. 4 illustrates example embodiments where the selecting operation 220 may include at least one additional operation. Additional operations may include an operation 402, operation 404, operation 406, operation 408 and/or operation 410.

At operation 402, the selecting operation 220 may include selecting at least one of the two or more pharmaceutical agents 112 in response to at least one condition specifically associated with the individual 108. In some embodiments, one or more selecting units 110 may select at least one of the two or more pharmaceutical agents 112 in response to at least one condition specifically associated with the individual 108.

In some embodiments, a condition specifically associated with an individual 108 may be an existing condition. In some embodiments, an existing condition is a medical condition. Examples of such medical conditions include, but are not limited to, viral infection, bacterial infection, fungal infection, diabetes, arthritis, gastrointestinal maladies, cancer, allergic responses, psychological disorders, osteoporosis, Alzheimer's disease, asthma, chronic fatigue syndrome, epilepsy, heart disease, hemochromatosis, hepatitis, stroke, food intolerance, and the like in substantially any combination. Accordingly, one or more pharmaceutical agents 112 may be selected to reduce or ameliorate the symptoms of a condition and/or to treat the condition directly. Numerous pharmaceutical agents 112 that may be selected in response to a condition are known (i.e., The Merck Index, 13$^{th}$ Edition, An Encyclopedia of Chemicals, Drugs, and Biologicals, Merck & Co. Inc., Whitehouse Station, N.J. 2001; Mosby's Drug Guide, Mosby, Inc., St. Louis, Mo. 2004; Remington: The Science and Practice of Pharmacy, 20$^{th}$ Edition, Lippincott Williams & Wilkins, Philadelphia, Pa. 2000; Physicians' Desk Reference, 58$^{th}$ Edition, Thompson, PDR, Montvale, N.J. 2004; U.S. Pat. No. 6,773,721, herein incorporated by reference).

In some embodiments, a condition specifically associated with an individual 108 may be a past condition. For example, one or more pharmaceutical agents 112 may be selected such that a condition, such as a medical condition, that an individual 108 was treated for in the past will be disallowed from reoccurring or the condition, or symptoms of the condition, may be reduced or minimized if the condition were to reoccur in the individual 108. For example, in some embodiments, one or more pharmaceutical agents 112 may be selected to prevent or reduce the consequences of a heart attack that may reoccur in an individual 108. In some embodiments, one or more pharmaceutical agents 112 may be selected to prevent or reduce the consequences of an epileptic seizure in an individual 108. Accordingly, one or more pharmaceutical agents 112 may be selected in response to numerous past conditions associated with the individual 108.

In some embodiments, a condition specifically associated with an individual 108 may be a future condition. For example, one or more pharmaceutical agents 112 may be selected such that a condition, such as a medical condition, that an individual 108 is predisposed to developing in the future may be disallowed from occurring or the condition, or symptoms of the condition, may be reduced or minimized if the condition were to occur in the individual 108. For example, bisphosphonates (alendronate, ibandronate and risedronate), calcitonin, estrogens, parathyroid hormone and raloxifene may be used for the prevention and/or treatment of osteoporosis. Accordingly, one or more pharmaceutical agents 112 may be selected in response to numerous future conditions associated with the individual 108. In some embodiments, one or more pharmaceutical agents 112 may be selected to prevent the occurrence of a future condition. For example, in some embodiments, the one or more pharmaceutical agents 112 may be vaccines that prevent or reduce infection by one or more infectious agents. In some embodiments, one or more pharmaceutical agents 112 may be selected in response to conditions that are cyclic. For example, in some embodiments, one or more pharmaceutical agents 112 may be selected in response to a woman's menstrual cycle. In other embodiments, one or more pharmaceutical agents 112 may be selected in response to a psychological malady, such as depression, that occurs in a cyclic manner. In other embodiments, one or more pharmaceutical agents 112 may be selected in response to hormonal changes that are expected to occur in the future, such as menopause.

In some embodiments, a condition specifically associated with an individual 108 may be an event or activity associated with an individual 108. For example, in some embodiments, one or more pharmaceutical agents 112 may be selected in response to a condition that is an event associated with an individual 108. For example, in some embodiments, an individual 108 may be expecting to participate in a sporting event. Accordingly, one or more pharmaceutical agents 112 may be selected in response to the event such that the one or more agents will not interfere with the performance of the individual 108. In other examples, the one or more pharmaceutical agents 112 may be selected to improve performance of the individual 108 in the event. In some embodiments, an individual 108 may expect to give a presentation. Accordingly, one or more pharmaceutical agents 112 may be selected that will not interfere with the performance of the individual 108 or that will improve performance of the individual 108 giving the presentation.

In some embodiments, a condition specifically associated with an individual 108 may be related to the environment in which the individual 108 resides or expects to reside. For example, if an individual 108 expects to travel on a boat, one or more pharmaceutical agents 112 may be selected that will not contribute to, or that will reduce or ameliorate, motion sickness. In some embodiments, the one or more pharmaceutical agents 112 may be selected based on the climactic environment in which an individual 108 resides or expects to reside. For example, one or more pharmaceutical agents 112 may be selected based on temperature, humidity, atmospheric pressure, and the like in substantially any combination. In some embodiments, the one or more pharmaceutical agents 112 may be selected based on the biological environment in which an individual 108 resides or expects to reside. For example, one or more pharmaceutical agents 112 may be selected based on the presence of allergens, pathogens, infectious agents, toxins, organisms and the like in substantially any combination.

In some embodiments, a condition specifically associated with an individual 108 may be a condition known to be associated with the individual 108 or a condition thought to be associated with an individual 108. For example, in some embodiments, one or more pharmaceutical agents 112 may be selected that can be used to treat an individual 108 with a diagnosed condition. In other embodiments, one or more pharmaceutical agents 112 may be selected that can be administered to an individual 108 with an undiagnosed condition with which the individual 108 was believed to be affected in the in the past, present or future.

At operation 404, the selecting operation 220 may include selecting at least one of the two or more pharmaceutical agents 112 in response to at least one dosage specifically associated with the individual 108. In some embodiments, one or more selecting units 110 may select at least one of the two or more pharmaceutical agents 112 in response to at least one dosage specifically associated with the individual 108.

In some embodiments, one or more selecting units 110 may select one or more pharmaceutical agents 112 with regard to a volume of one or more of the pharmaceutical agents 112. For example, one or more selecting units 110 may select a first pharmaceutical agent 112 preferentially over a second pharmaceutical agent 112 if the first pharmaceutical agent 112 occupies less volume than the second pharmaceutical agent 112. In other examples, one or more selecting units 110 may select a first pharmaceutical agent 112 preferentially over a second pharmaceutical agent 112 if the first pharmaceutical agent 112 occupies more volume than the second pharmaceutical agent 112. Accordingly, one or more pharmaceutical agents 112 may be selected to increase or decrease the volume of the administration form of the one or more pharmaceutical agents 112 to promote administration to an individual 108.

In some embodiments, one or more selecting units 110 may select one or more pharmaceutical agents 112 with regard to the compatibility of the pharmaceutical agents 112 with each other or with the individual 108 at the dosage associated with the individual 108. For example, in some embodiments, one or more pharmaceutical agents 112 may be selected that are compatible with each other in response to dosage of at least one of the pharmaceutical agents 112 (i.e., see Mosby's Drug Guide, Mosby, Inc., St. Louis. Mo., 2004). In some embodiments, one or more pharmaceutical agents 112 may be selected to act synergistically with each other when administered to an individual 108 at a given dosage. In some embodiments, one or more pharmaceutical agents 112 may be selected to avoid synergistic interactions with each other when administered to an individual 108 at a given dosage. In some embodiments, one or more pharmaceutical agents 112 may be selected to counteract or reduce any negative side-effects of the one or more pharmaceutical agents 112 when they are administered to an individual 108 at a given dosage. In some embodiments, one or more pharmaceutical agents 112 may be selected with regard to dosage so that they do not contraindicate additional components, such as nutraceuticals and/or food supplements, ingested by an individual 108. In some embodiments, one or more pharmaceutical agents 112 may be selected with regard to the price of the one or more pharmaceutical agents 112 with regard to one or more dosages associated with an individual 108. For example, in some embodiments, a pharmaceutical agent 112 may be commercially available at two or more dosages that are priced differently. Accordingly, in some embodiments, the one or more pharmaceutical agents 112 may be selected to achieve a desired dosage when administered to an individual 108 while reducing or minimizing the price associated with the one or more pharmaceutical agents 112.

At operation 406, the selecting operation 220 may include selecting the two or more pharmaceutical agents 112 in response to dosage of at least one of the two or more pharmaceutical agents 112. In some embodiments, one or more selecting units 110 may select the two or more pharmaceutical agents 112 in response to dosage of at least one of the two or more pharmaceutical agents 112.

In some embodiments, one or more pharmaceutical agents 112 may be commercially available in preformulated administration forms. Accordingly, in some embodiments, one or more pharmaceutical agents 112 may be selected in response to administration forms that are commercially available. For example, in some embodiments, a pharmaceutical agent 112 may be commercially available in 100 milligram, 250 milligram, 500 milligram, 750 milligram, and 1000 milligram preformulated administration forms. In some instances, an individual 108 may be prescribed to ingest 750 milligram of a pharmaceutical agent 112. Accordingly, in some embodiments, a 750 milligram administration form of the pharmaceutical agent 112 may be selected. In other embodiments, a 250 milligram and a 500 milligram administration form of the pharmaceutical agent 112 may be selected. In other embodiments, a 250 milligram and five 100 milligram administration forms of the pharmaceutical agent 112 may be selected. Numerous combinations of administration forms may be selected. In some embodiments, administration forms may be selected with regard to price associated with the administration form. For example, in some embodiments, it may be less expensive to achieve a 750 milligram dosage of a pharmaceutical agent 112 by combining one 250 milligram administration form with five 100 milligram administration forms than selecting a single 750 milligram administration form.

In some embodiments, one or more pharmaceutical agents 112 may be selected with regard to administration forms for administration to an individual 108 over one or more periods of time. For example, it may be desirable to administer 1000 milligrams of a pharmaceutical agent 112 to an individual 108 over a ten hour time period. Accordingly, in some embodiments, a single 1000 milligram controlled release administration form may be selected. In other embodiments, ten 100 milligram administration forms may be selected and then packaged to be released at a rate of one 100 milligram administration form per hour over the ten hour period. Accordingly, numerous combinations of administration forms and timed release may be selected.

In some embodiments, one or more selecting units 110 may select one or more pharmaceutical agents 112 with regard to one or more volumes of one or more of the pharmaceutical agents 112 in the available administration forms. For example, one or more selecting units 110 may select a first pharmaceutical agent 112 preferentially over a second pharmaceutical agent 112 if the first pharmaceutical agent 112 occupies less volume than the second pharmaceutical agent 112 with regard to available administration forms. In other examples, one or more selecting units 110 may select a first pharmaceutical agent 112 preferentially over a second pharmaceutical agent 112 if the first pharmaceutical agent 112 occupies more volume than the second pharmaceutical agent 112 with regard to available administration forms. Accordingly, one or more pharmaceutical agents 112 may be selected to increase or decrease the volume of the one or more pharmaceutical agents 112 to promote administration to an individual 108.

In some embodiments, one or more selecting units 110 may select one or more pharmaceutical agents 112 with regard to compatibility of the pharmaceutical agents 112 with each other and/or with the individual 108 when administered to the individual 108 at dosages corresponding to available administration forms of the pharmaceutical agents 112. For example, in some embodiments, one or more pharmaceutical agents 112 may be selected in response to administration forms available for the two or more pharmaceutical agents 112 (i.e., see Mosby's Drug Guide, Mosby, Inc., St. Louis, Mo., 2004). In some embodiments, two or more pharmaceutical agents 112 may be selected to act synergistically with each other when administered to an individual 108 at available administration forms. In some embodiments, one or more pharmaceutical agents 112 may be selected to avoid synergistic interactions with each other when administered to an individual 108 as available administration forms. In some embodiments, one or more pharmaceutical agents 112 may be selected to counteract or reduce any negative side-effects of the one or more pharmaceutical agents 112 when they are administered to an individual 108 at an available dosage. In some embodiments, one or more pharmaceutical agents 112 may be selected with regard to available dosage so that they do not contraindicate additional components, such as nutraceuticals and/or food supplements, ingested by an individual 108. In some embodiments, one or more pharmaceutical agents 112 may be selected with regard to the price of the one or more pharmaceutical agents 112 with regard to one or more available dosages associated with the one or more pharmaceutical agents 112. For example, in some embodiments, a pharmaceutical agent 112 may be commercially available at two or more dosages that are priced differently. Accordingly, in some embodiments, the one or more pharmaceutical agents 112 may be selected to achieve a desired dosage when administered to an individual 108 while reducing or minimizing the price associated with the one or more pharmaceutical agents 112.

At operation 408, the selecting operation 220 may include selecting at least one of the two or more pharmaceutical agents 112 in response to at least one time of administration. In some embodiments, one or more selecting units 110 may select at least one of the two or more pharmaceutical agents 112 in response to at least one time of administration In some embodiments, the at least one time of administration is a time when the one or more pharmaceutical agents 112 are to be administered to an individual 108 to provide for release of the one or more pharmaceutical agents 112 from the administration form at a specified time following administration. For example, in some embodiments, at least one of the two or more pharmaceutical agents 112 may be selected such that it is released from an administration form about one hour after being administered to an individual 108. In other embodiments, a first pharmaceutical agent 112 may be selected such that it is released from an administration form about one hour after being administered to an individual 108 and a second pharmaceutical agent 112 may be selected such that it is released from an administration form about two hours after being administered to the individual 108. Accordingly, one or more pharmaceutical agents 112 may be selected that are released from an administration form at a specified time following administration to an individual 108 and thereupon become functionally available to the individual 108. In some embodiments, two or more incompatible pharmaceutical agents 112 may be administered to an individual 108 at the same time without adverse consequences by providing for release of the incompatible pharmaceutical agents 112 at different times such that they do not contraindicate each other. In some embodiments, two or more pharmaceutical agents 112 that act synergistically may be coadministered to an individual 108 such that they are released at substantially the same time to provide for synergistic action of the two or more pharmaceutical agents 112 with regard to the individual 108. Substantially any combination of pharmaceutical agents 112, dosages and release times may be selected.

In some embodiments, the at least one time of administration is relative to a time or event preceding or following administration of one or more pharmaceutical agents 112 to an individual 108. Accordingly, one or more pharmaceutical agents 112 may be selected that are released from an administration form at a relative time following administration to an individual 108 and thereupon become functionally available to the individual 108. For example, in some embodiments, two or more pharmaceutical agents 112 may be coadministered to an individual 108 such that a first pharmaceutical agent 112 is released from the administration form and a second pharmaceutical agent 112 is released from the administration form at a second time that is relative to the time of release of the first pharmaceutical agent 112. Accordingly, in some embodiments, two or more incompatible pharmaceutical agents 112 may be administered to an individual 108 at the same time without adverse consequences by providing for release of the incompatible pharmaceutical agents 112 at different times such that they do not contraindicate each other. In some embodiments, two or more pharmaceutical agents 112 that act synergistically may be coadministered to an individual 108 such that they are released at substantially the same time to provide for synergistic action of the two or more pharmaceutical agents 112 with regard to the individual 108.

In some embodiments, dosages of the two or more pharmaceutical agents 112 may be altered in a relative manner. For example, in some embodiments, the dosage of two or more pharmaceutical agents 112 may be calibrated relative to time of day. In other embodiments, the dosage of two or more pharmaceutical agents 112 may be calibrated relative to hormonal cycles. In other embodiments, the dosage of two or more pharmaceutical agents 112 may be calibrated relative to circadian rhythms. Substantially any combination of pharmaceutical agents 112, dosages and release times may be selected relative to a time, event and/or the like.

At operation 410, the selecting operation 220 may include selecting at least one of the two or more pharmaceutical agents 112 in response to two or more times of administration within a time period. In some embodiments, one or more selecting units 110 may select at least one of the two or more pharmaceutical agents 112 in response to two or more times of administration within a time period. In some embodiments, a time period is defined as being a discrete amount of time. For example, in some embodiments, a time period may be defined in seconds, minutes, hours, days, months, years and substantially any combination thereof. In some embodiments, a time period may be defined as being an amount of time that is relative to a measurable quantity and/or event. For example, in some embodiments, a time period may be determined based on the concentration of a pharmaceutical agent 112 that was previously administered to an individual 108. Accordingly, in some embodiments, a first pharmaceutical agent 112 may be administered to an individual 108 and a second pharmaceutical agent 112 may be administered to the same individual 108 when the concentration of the first pharmaceutical agent 112 associated with the individual 108 either reaches a certain level or decreases to a certain level. Numerous combinations of discrete and/or relative amounts of time may be used during the selection of at least one of two or more pharmaceutical agents 112. In some embodiments, at least one of the two or more pharmaceutical agents 112 may be selected based on the identity of a second pharmaceutical agent 112 that is to be administered to an individual 108 within a time period in which the first pharmaceutical agent 112 is still present and/or functionally active in association with an individual 108. For example, in some embodiments, a first pharmaceutical agent 112 is selected such that it does not contraindicate a second pharmaceutical agent 112 that is to be administered to the individual 108 within a time period when the first and second pharmaceutical agents 112 are both present and/or functionally active in association with the individual 108. In some embodiments, the second pharmaceutical agent 112 is selected such that it does not contraindicate a first pharmaceutical agent 112 that is present and/or functionally active in association with the individual 108. In some embodiments, a first pharmaceutical agent 112 is selected such that it will act in a synergistic manner with a second pharmaceutical agent 112 that is to be administered to the individual 108 within a time period when the first and second pharmaceutical agents 112 are both present and/or functionally active in association with the individual 108. In some embodiments, the second pharmaceutical agent 112 is selected such that it will act in a synergistic manner with a first pharmaceutical agent 112 that is present and/or functionally active in association with the individual 108.

Figure 5:
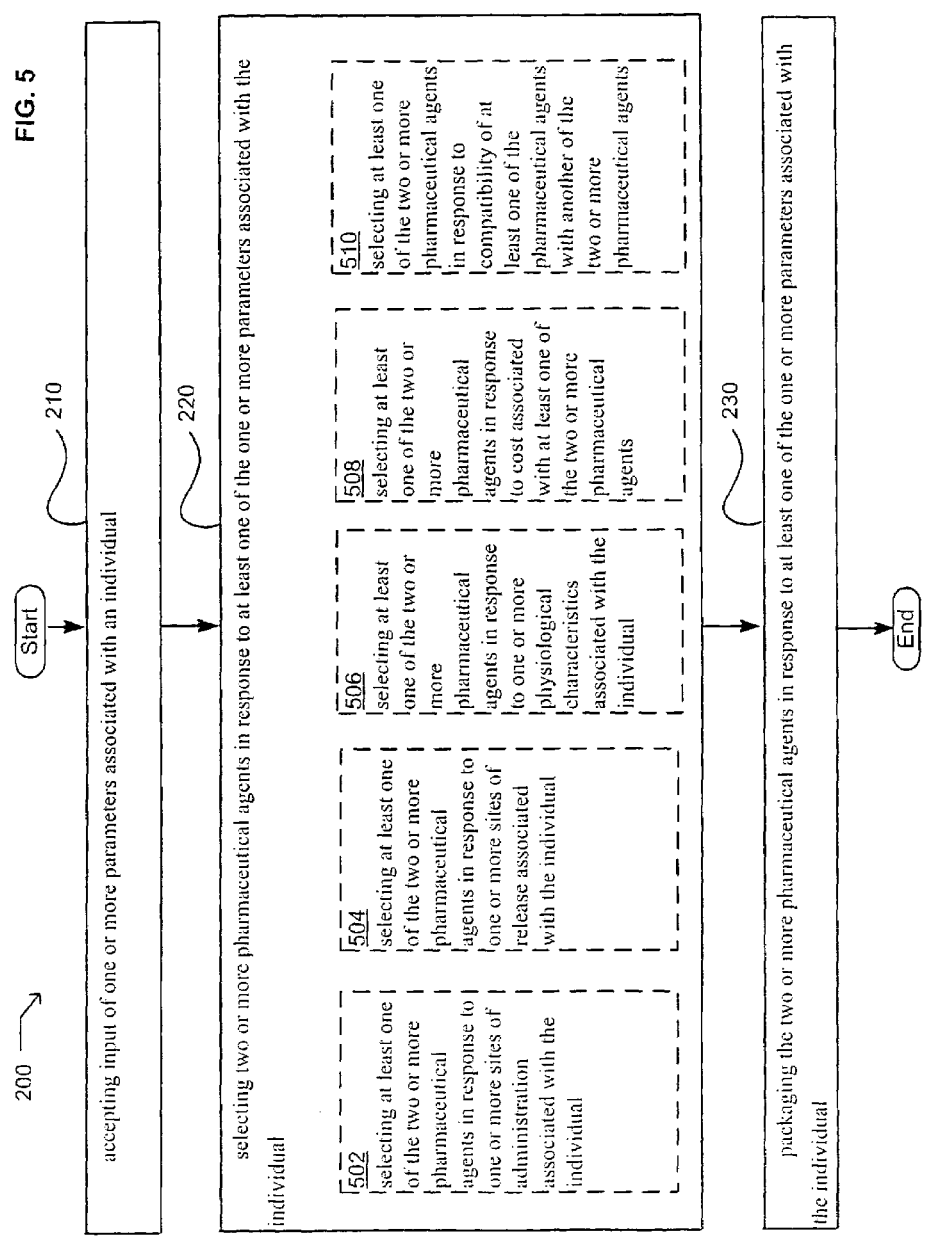
FIG. 5 illustrates alternative embodiments of the example operation flow of FIG. 2.

FIG. 5 illustrates alternative embodiments of the example operational flow 200 of FIG. 2. FIG. 5 illustrates example embodiments where the selecting operation 220 may include at least one additional operation. Additional operations may include an operation 502, operation 504, operation 506, operation 508 and/or operation 510.

At operation 502, the selecting operation 220 may include selecting at least one of the two or more pharmaceutical agents 112 in response to one or more sites of administration associated with the individual 108. In some embodiments, one or more selecting units 110 may select at least one of the two or more pharmaceutical agents 112 in response to one or more sites of administration associated with the individual 108. One or more pharmaceutical agents 112 may be administered at numerous sites associated with an individual 108. Examples of such sites include, but are not limited to, the eyes, ears, nose, skin, mouth, stomach, intestine, rectum, vagina, vascular system, pulmonary system, gastrointestinal system, urinary system and lymphatic system. In some embodiments, one or more pharmaceutical agents 112 may be administered at a first site associated with an individual 108 in preference to a second site associated with an individual 108. For example, in some embodiments, it may be desirable to administer a pharmaceutical agent 112 that is acid labile by injection into the vascular system in preference to oral administration which may expose the pharmaceutical agent 112 to acidic conditions. Accordingly, in some embodiments, one or more pharmaceutical agents 112 may be selected based on the physical and chemical characteristics of the one or more pharmaceutical agents 112 and where the one or more pharmaceutical agents 112 will be administered to an individual 108. In some embodiments, one or more pharmaceutical agents 112 may be selected in response to the site of action of the one or more pharmaceutical agents 112 on an individual 108. For example, in some embodiments, an adhesive patch may be used to administer one or more pharmaceutical agents 112 for the treatment of a malady associated with the skin. In some embodiments, one or more first pharmaceutical agents 112 may be selected for administration to a first site associated with an individual 108 and one or more second pharmaceutical agents 112 may be selected such that the second pharmaceutical agents 112 facilitate administration of the first pharmaceutical agents 112, do not contraindicate the first pharmaceutical agents 112, act synergistically with the first pharmaceutical agents 112, are administered to a second site associated with the individual 108, and/or substantially any combination thereof.

At operation 504, the selecting operation 220 may include selecting at least one of the two or more pharmaceutical agents 112 in response to one or more sites of release associated with the individual 108. In some embodiments, one or more selecting units 110 may select at least one of the two or more pharmaceutical agents 112 in response to one or more sites of release associated with the individual 108. In some embodiments, one or more pharmaceutical agents 112 may be administered to an individual 108 at a first site and then released from the administration form in which the pharmaceutical agents 12 were administered at a second site associated with the individual 108. For example, in some embodiments, one or more pharmaceutical agents 112 may be administered to an individual 108 in an oral administration form which can be released in the small intestine of the individual 108. In examples of other embodiments, one or more pharmaceutical agents 112 may be released into the vascular system of an individual 108 following transdermal administration of the one or more pharmaceutical agents 112 to the individual 108. In some embodiments, two or more pharmaceutical agents 112 may be coadministered to an individual 108 such that they are released from their administration forms at two or more separate sites associated with the individual 108. For example, in some embodiments, a first and second pharmaceutical agent 112 may be coadministered to an individual 108 such that the first pharmaceutical agent 112 is substantially released from the administration form in the upper gastrointestinal tract and the second pharmaceutical agent 112 is substantially released from the administration form in the lower gastrointestinal tract. Accordingly, in some embodiments, two or more pharmaceutical agents 112 that are incompatible or that would contraindicate each may be coadministered to an individual 108 for release at different sites associated with the individual 108 and/or at different times.

At operation 506, the selecting operation 220 may include selecting at least one of the two or more pharmaceutical agents 112 in response to one or more physiological characteristics associated with the individual 108. In some embodiments, one or more selecting units 110 may select at least one of the two or more pharmaceutical agents 112 in response to one or more physiological characteristics associated with the individual 108. Numerous physiological characteristics may be associated with an individual 108. Examples of such characteristics include, but are not limited to, age, gender, disease state, allergic responses, activity-related metabolic rate, resting metabolic rate, liver function, kidney function, weight, body fat percentage, epithelial cell function, lung function, skin function, gastrointestinal tract function, and substantially any combination thereof. Methods to predict drug response and to assess and correlate metabolism to drug dosage are known (i.e., International Publication Numbers: WO 03/084395 and WO 2005/041105; U.S. Pat. Nos. 6,317,719 and 6,087,090, herein incorporated by reference). Numerous assays may be used to assess the ability of an individual 108 to metabolize one or more pharmaceutical agents 112. In some embodiments, enzyme activities may be assessed to determine the ability of an individual 108 to metabolize one or more pharmaceutical agents 12. Examples of such enzyme systems and activities that may be assessed include, but are not limited to, the cytochrome P450 monooxygenase system, the flavin-containing monooxygenase system, alcohol dehydrogenase, aldehyde dehydrogenase, monoamine oxidase, cooxidation by peroxidases, NADPH-cytochrome P450 reductase, the presence of reduced (ferrous) cytochrome P450, esterases, amidases, epoxide hydrolase, glutathione S-transferases, mercapturic acid biosynthesis, UDP-Glucoron(os)yltransferases, N-Acetyltransferases, amino acid N-acyl transferases and sulfotransferases. In some embodiments, first and second pharmaceutical agents 112 may be effective to treat the same condition associated with an individual 108. However, an individual 108 may be able to metabolize the first pharmaceutical agent 112 very quickly but metabolize a second pharmaceutical agent 112 more slowly. Accordingly, in some embodiments, the second pharmaceutical agent 112 may be selected for administration to the individual 108 to avoid higher relative metabolism of the first pharmaceutical agent 112 by the individual 108. In some embodiments, an individual 108 may mount an adverse allergic response to one or more pharmaceutical agents 112. Accordingly, one or more pharmaceutical agents 112 may be selected to avoid or minimize allergic response to administration of the one or more pharmaceutical agents 112 to the individual 108. One or more pharmaceutical agents 112, and combinations of one or more pharmaceutical agents 112, may be selected in response to numerous physiological characteristics associated with an individual 108.

At operation 508, the selecting operation 220 may include selecting at least one of the two or more pharmaceutical agents 112 in response to cost associated with at least one of the two or more pharmaceutical agents 112. In some embodiments, one or more selecting units 110 may select at least one of the two or more pharmaceutical agents 112 in response to cost associated with at least one of the two or more pharmaceutical agents 112. In some embodiments, two or more different pharmaceutical agents 112 may be used to treat the same or a similar condition associated with an individual 108. In some embodiments, it may be preferable to select a first pharmaceutical agent 112 having a lower associated cost over a second pharmaceutical agent 112 having a higher associated cost for administration to an individual 108. In other embodiments, it may be preferable to select a first pharmaceutical agent 112 having a higher associated cost over a second pharmaceutical agent 112 having a lower associated cost for administration to an individual 108. In some embodiments, one or more pharmaceutical agents 112 may be selected in response to cost associated with the one or more pharmaceutical agents 112 and numerous additional considerations. Such additional considerations include, but are not limited to, allergic response, dosage, effectiveness, interaction with other pharmaceutical agents 112 and substantially any combination thereof.

At operation 510, the selecting operation 220 may include selecting at least one of the two or more pharmaceutical agents 112 in response to compatibility of at least one of the pharmaceutical agents 112 with another of the two or more pharmaceutical agents 112. In some embodiments, one or more selecting units 110 may select at least one of the two or more pharmaceutical agents 112 in response to compatibility of at least one of the pharmaceutical agents 112 with another of the two or more pharmaceutical agents 112. In some embodiments, at least one of the pharmaceutical agents 112 is selected that does not interact with another of the two or more pharmaceutical agents 112. In some embodiments, at least one of the pharmaceutical agents 112 is selected to act in a synergistic manner with another of the two or more pharmaceutical agents 112. In some embodiments, at least one of the pharmaceutical agents 112 is selected to not contraindicate at least one of the two or more pharmaceutical agents 112.

Figure 6:
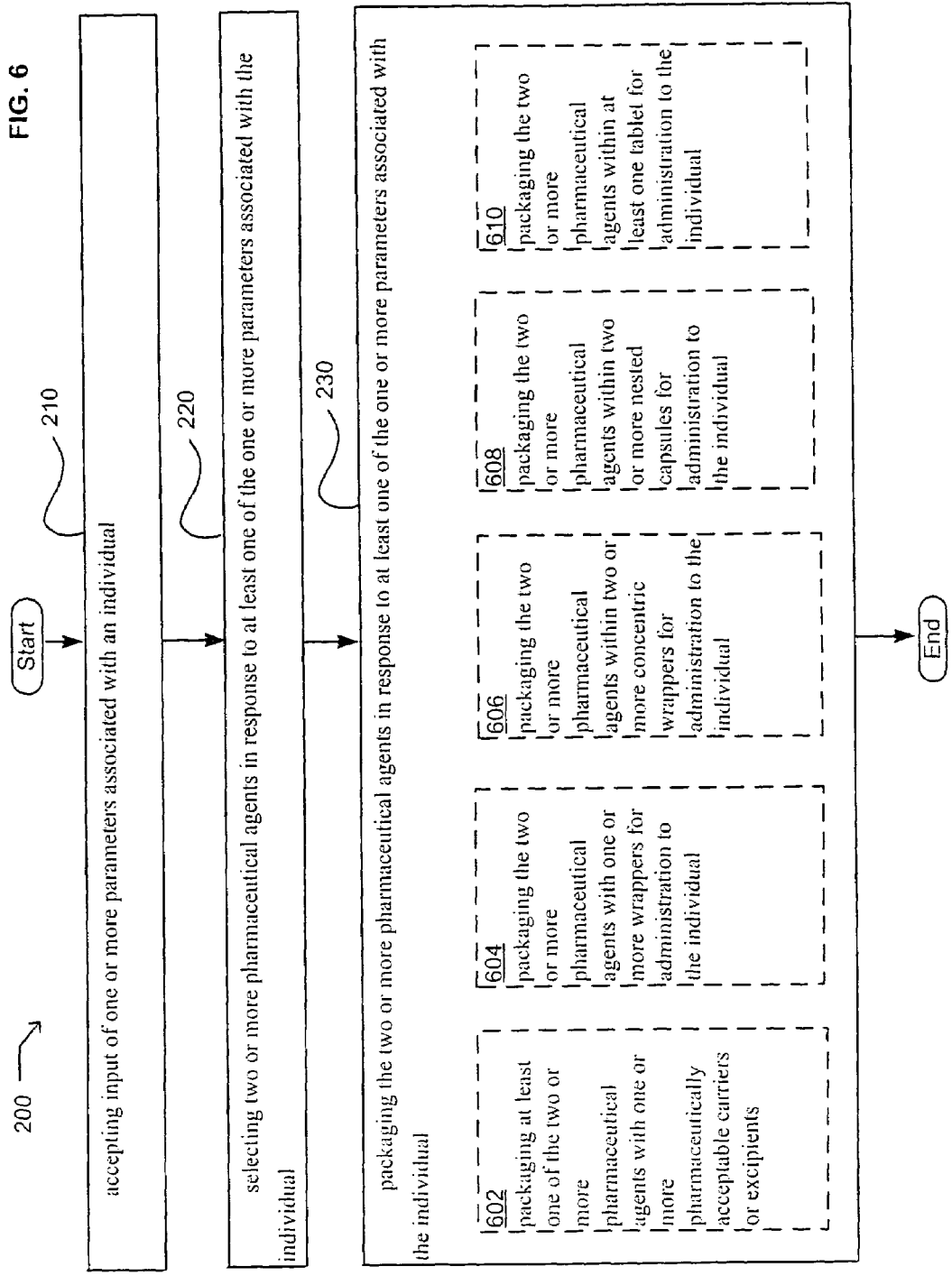
FIG. 6 illustrates alternative embodiments of the example operation flow of FIG. 2.

FIG. 6 illustrates alternative embodiments of the example operational flow 200 of FIG. 2. FIG. 6 illustrates example embodiments where the packaging operation 230 may include at least one additional operation. Additional operations may include an operation 602, operation 604, operation 606, operation 608 and/or operation 610.

At operation 602, the packaging operation 230 may include packaging at least one of the two or more pharmaceutical agents 112 with one or more pharmaceutically acceptable carriers or excipients. In some embodiments, one or more packaging units 114 may package at least one of the two or more pharmaceutical agents 112 with one or more pharmaceutically acceptable carriers or excipients.

Pharmaceutical agents 112 may be packaged through use of numerous known methods, such as conventional mixing, dissolving, granulating, dragee-making, levigating, emulsifying, encapsulating, entrapping or lyophilizing processes. In some embodiments, the pharmaceutical agents 112 may be packaged in a manner that depends on the route that the pharmaceutical agents 112 are to be administered to an individual 108.

In some embodiments, one or more pharmaceutical agents 112 may be packaged with one or more solid or gel phase carriers or excipients. Examples of such carriers or excipients include, but are not limited to, croscarmellose sodium, povidone, microcrystalline cellulose, calcium carbonate, calcium phosphate, various sugars, starches, cellulose derivatives, gelatin, pregelatinized starch, polymers such as polyethylene glycols, lactose, lactose monohydrate, sucrose, talc, gelatin, agar, pectin, acacia, magnesium stearate, stearic acid and substantially any combination thereof. If a solid carrier is used, the one or more pharmaceutical agents 112 may be tableted, placed in a hard gelatin capsule in powder or pellet form, packaged in the form of a troche or lozenge, and the like.

In some embodiments, one or more pharmaceutical agents 112 may be packaged with a liquid carrier or excipient. Examples of such liquid carriers include syrup, peanut oil, olive oil, water, physiologically compatible buffers (i.e., Hanks solution and Ringers solution), physiological saline buffer, and the like. If a liquid carrier is used, the administration form may be in the form of a syrup, emulsion, drop, soft gelatin capsule, sterile injectable solution, suspension in an ampoule or vial, non-aqueous liquid suspension, and the like.

One or more pharmaceutical agents 112 may be packaged in stable water-soluble administration forms. For example, in some embodiments, a pharmaceutically acceptable salt of one or more pharmaceutical agents 112 may be dissolved in an aqueous solution of an organic or inorganic acid, such as 0.3M solution of succinic acid or citric acid. If a soluble salt form is not available, a pharmaceutical agent 112 may be dissolved in a suitable cosolvent or combination of cosolvents. Examples of suitable cosolvents include, but are not limited to, alcohol, propylene glycol, polyethylene glycol 300, polysorbate 80, glycerin and the like in concentrations ranging from 0-60% of the total volume. In some embodiments, one or more pharmaceutical agents 112 may be dissolved in DMSO and diluted with water. The administration form may also be in the form of a solution of a salt form of one or more pharmaceutical agents 112 in an appropriate aqueous vehicle such as water or isotonic saline or dextrose solution.

In some embodiments, pharmaceutical agents 112 that are hydrophobic may be packaged through use of a cosolvent system comprising benzyl alcohol, a nonpolar surfactant, a water-miscible organic polymer, and an aqueous phase. The cosolvent system may be the VPD co-solvent system. VPD is a solution of 3 percent weight/volume benzyl alcohol, 8 percent weight/volume of the nonpolar surfactant polysorbate 80, and 65 percent weight/volumen polyethylene glycol 300, made up to volume in absolute ethanol. The VPD co-solvent system (VPD:5W) consists of VPD diluted 1:1 with a 5 percent dextrose in water solution. This co-solvent system dissolves hydrophobic pharmaceutical agents 112 well, and itself produces low toxicity upon systemic administration. The proportions of a co-solvent system may be varied considerably without destroying its solubility and toxicity characteristics. Furthermore, the identity of the co-solvent components may be varied: for example, other low-toxicity nonpolar surfactants may be used instead of polysorbate 80; the fraction size of polyethylene glycol may be varied; other biocompatible polymers may replace polyethylene glycol (i.e., polyvinyl pyrrolidone; and other sugars or polysaccharides may substitute for dextrose). Many other delivery systems may be used to administer hydrophobic pharmaceutical agents 112 as well. For example, liposomes and emulsions are well known examples of delivery vehicles or carriers for hydrophobic drugs. Certain organic solvents such as dimethysulfoxide also may be employed, although usually at the cost of greater toxicity.

Some pharmaceutical agents 112 may be packaged as salts with pharmaceutically compatible counter ions. Pharmaceutically compatible salts may be formed with many acids, including hydrochloric, sulfuric, acetic, lactic, tartaric, malic, succinic, etc. Salts of pharmaceutical agents 112 tend to be more soluble in aqueous or other protonic solvents than are the corresponding free-base forms.

Numerous carriers and excipients are known and are commercially available (i.e., The Merck Index, 13$^{th}$ Edition, An Encyclopedia of Chemicals, Drugs, and Biologicals, Merck & Co. Inc., Whitehouse Station, N.J. 2001; Mosby's Drug Guide, Mosby, Inc., St. Louis, Mo. 2004; Remington: The Science and Practice of Pharmacy, 20$^{th}$ Edition, Lippincott Williams & Wilkins, Philadelphia, Pa. 2000; Physicians' Desk Reference, 58$^{th}$ Edition. Thompson, PDR, Montvale, N.J. 2004; U.S. Pat. Nos. 6,773,721; 7,053,107; 7,049,312 and Published U.S. Patent Application No. 20040224916; herein incorporated by reference).

At operation 604, the packaging operation 230 may include packaging the two or more pharmaceutical agents 112 with one or more wrappers for administration to the individual 108. In some embodiments, one or more packaging units 114 may package the two or more pharmaceutical agents 112 with one or more wrappers for administration to the individual 108. In some embodiments, two or more pharmaceutical agents 112 may be packaged by wrapping the two or more pharmaceutical agents 112 into a single administration form for administration to an individual 108. In some embodiments, the two or more pharmaceutical agents 112 may be preformulated prior to being wrapped in one or more wrappers. For example, two or more pharmaceutical agents 112 that are in prescription form may be wrapped into a single administration form. In other embodiments, the two or more pharmaceutical agents 112 may be combined together and then wrapped in one or more wrappers. In other embodiments, two or more pharmaceutical agents 112 may be combined together with a suitable carrier and then wrapped in one or more wrappers. Numerous materials may be used to wrap the two or more pharmaceutical agents 112. Examples of such materials include, but are not limited to, polymers that include esters of cellulose and its derivatives (cellulose acetate phthalate, hydroxypropyl methylcellulose phthalate, hydroxypropyl methylcellulose acetate succinate), polyvinyl acetate phthalate, pH-sensitive methacrylic acid-methamethacrylate copolymers, shellac, and the like. Numerous water insoluble polymers may be used that include cellulose derivatives (i.e., ethylcellulose), polyvinyl acetate, neutral copolymers based on ethyl acrylate and methylmethacrylate, copolymers of acrylic and methacrylic acid esters with quaternary ammonium groups, and the like. In some embodiments, polymers used in forming the wrappers may be plasticized. Examples of plasticizers that may be used to plasticize the wrappers include, but are not limited to, triacetin, tributyl citrate, triethyl citrate, acetyl tri-n-butyl citrate diethyl phthalate, castor oil, dibutyl sebacate, acetylated monoglycerides, and the like and/or substantially any combination thereof. In some embodiments, the plasticizer may be present at about 3 to 30 weight percent and more typically about 10 to 25 weight percent based on the polymer to which the plasticizer is added. The type of plasticizer and its content depends on the polymer or polymers, nature of the coating system. In some embodiments, water-soluble nonionic polysaccharide derivatives may be used to wrap one or more pharmaceutical agents 112. For example, hydroxypropylmethylcellulose, hydroxypropylcellulose, and/or sodium carboxymethylcellulose may be used. Such polymers form coatings that quickly dissolve in water and have a high permeability. Accordingly, in some embodiments, such polymers may be used for rapid release of one or more pharmaceutical agents 112 that are wrapped in such a wrapper following administration to an individual 108. In some embodiments, one or more pharmaceutical agents 112 may be wrapped in a wrapper that provides for sustained release of the one or more pharmaceutical agents 112. For example, one or more pharmaceutical agents 112 may be released continuously over twelve hours through use of wrappers constructed from ethyl cellulose and an ethyl acrylate-methyl methacrylate-ethyl trimethylammonium-chloride methacrylate copolymer as the release controlling wrapper. Methods and materials that may be used to prepare wrappers are known in the art and are commercially available (i.e., Rohm Pharma, Piscataway, N.J.; U.S. Pat. Nos. 6,656,507; 7,048,945; 7,056,951; hereby incorporated by reference).

In some embodiments, one wrapper may be used to wrap two or more pharmaceutical agents 112 into an administration form. For example, the two or more pharmaceutical agents 112 may be combined together and then wrapped into an administration form in one wrapper for release at the same time following administration to an individual 108. In other embodiments, one continuous wrapper may be used to wrap the two or more pharmaceutical agents 112 into an administration form in which the two or more pharmaceutical agents 112 are separated from each other. For example, in some embodiments, one of the two or more pharmaceutical agents 112 may be covered with a continuous wrapper to form a core and then a second pharmaceutical agent 112 may be wrapped around the core with the continuous wrapper to form an administration form. This process may be repeated with multiple pharmaceutical agents 112 to form a multilayered administration form in which the multiple pharmaceutical agents 112 are separated from each other. In some embodiments, such a configuration provides for the release of pharmaceutical agents 112 from the administration form at different times and/or at different sites associated with an individual 108 to which the administration form is administered. In some embodiments, two or more pharmaceutical agents 112 are wrapped into an administration form together and additional pharmaceutical agents 112 are wrapped into the administration form in separate layers. Accordingly, pharmaceutical agents 112 may be oriented in the administration form to be released from the administration form at the same time and/or site or such that they are released at different times and/or sites. Examples of such sites include, but are not limited to, the mouth, esophagus, stomach, duodenum, small intestine, large intestine, and the rectum.

At operation 606, the packaging operation 230 may include packaging the two or more pharmaceutical agents 12 within two or more concentric wrappers for administration to the individual 108. In some embodiments, one or more packaging units 114 may package the two or more pharmaceutical agents 112 within two or more concentric wrappers for administration to the individual 108. In some embodiments, two or more pharmaceutical agents 112 may be packaged by wrapping the two or more pharmaceutical agents 112 within two or more wrappers to form an administration form. In some embodiments, the same type of material is used to form the two or more wrappers in the administration form. In some embodiments, different types of material are used as wrappers to form the administration form. For example, an outer wrapper may be selected to dissolve rapidly and release one or more pharmaceutical agents 112 soon after administration of the administration form to the individual 108 while an inner wrapper may be selected to release one or more pharmaceutical agents 112 at a later time and/or at a different site associated with an individual 108. Accordingly, in some embodiments, multiple pharmaceutical agents 112 may be packaged into the same administration form for release at different times and at different sites following administration of the administration form to an individual 108. In some embodiments, the pharmaceutical agents 112 may be the same to provide for continuous dosing of an individual 108. In some embodiments, the pharmaceutical agents 112 may be different to provide for dosing of an individual 108 with different pharmaceutical agents 112. In some embodiments, some of the pharmaceutical agents 112 may be the same to provide for continuous dosing of an individual 108 and others may be different to provide for dosing of an individual 108 with different pharmaceutical agents 112. Accordingly, numerous combinations of pharmaceutical agents 112 and wrappers may be assembled into an administration form.

At operation 608, the packaging operation 230 may include packaging the two or more pharmaceutical agents 112 within two or more nested capsules for administration to the individual 108. In some embodiments, one or more packaging units 114 may package the two or more pharmaceutical agents 112 within two or more nested capsules for administration to the individual 108.

In some embodiments, two or more pharmaceutical agents 112 may be packaged into an administration form through use of nested capsules. In some embodiments, a first pharmaceutical agent 112 may be packaged in a first capsule and a second pharmaceutical agent 112 may be packaged in a second capsule in which the first capsule is included to create an administration form having nested capsules. Accordingly, administration forms may be constructed that include two or more nested capsules. In some embodiments, such administration forms may include two or more pharmaceutical agents 112. In other embodiments, such administration forms may include one type of pharmaceutical agent 112 that is contained within multiple capsules of the administration form and one or more types of different pharmaceutical agents 112 that are also contained within the capsules included within the administration form. In some embodiments, the material used to construct the individual capsules of a single administration form is the same. In some embodiments, the material used to construct the individual capsules of a single administration form is different. In some embodiments, the material used to construct some of the individual capsules of a single administration form may be the same while the material used to construct other individual capsules of the single administration form may be different. Accordingly, through selection of materials used to construct the individual capsules contained in an administration form, two or more pharmaceutical agents 112 may be released from one administration form at one or more times and/or at one or more sites associated with the individual 108. For example, as with wrapping materials described herein, materials may be selected for constructing capsules that release one or more pharmaceutical agents 112 at a site associated with an individual 108. Examples of such sites include, but are not limited to, the mouth, esophagus, stomach, duodenum, small intestine, large intestine, and the rectum.

At operation 610, the packaging operation 230 may include packaging the two or more pharmaceutical agents 112 within at least one tablet for administration to the individual 108. In some embodiments, one or more packaging units 114 may package the two or more pharmaceutical agents 112 within at least one tablet for administration to the individual 108. In some embodiments, two or more pharmaceutical agents 112 may be selected in response to one or more parameters 106 associated with an individual 108 and packaged into at least one table. Methods to package two or more pharmaceutical agents 112 into at least one tablet for administration to an individual 108 are known (i.e., Published U.S. Patent Application Nos. 20040224916 and 20050013863; and U.S. Pat. Nos. 5,490,962; 6,280,771; herein incorporated by reference). Accordingly, in some embodiments, two or more pharmaceutical agents 112 may be packaged into a tablet such that the two or more pharmaceutical agents 112 are released at the same or different times following administration of the tablet to an individual 108. In other embodiments, two or more pharmaceutical agents 112 may be packaged into a tablet such that the two or more pharmaceutical agents 112 are released at the same or different sites associated with an individual 108 following administration of the tablet to an individual 108. In other embodiments, two or more pharmaceutical agents 112 may be packaged into a tablet such that the two or more pharmaceutical agents 112 are released at the same or different times and at the same or different sites associated with an individual 108 following administration of the tablet to the individual 108.

Figure 7:
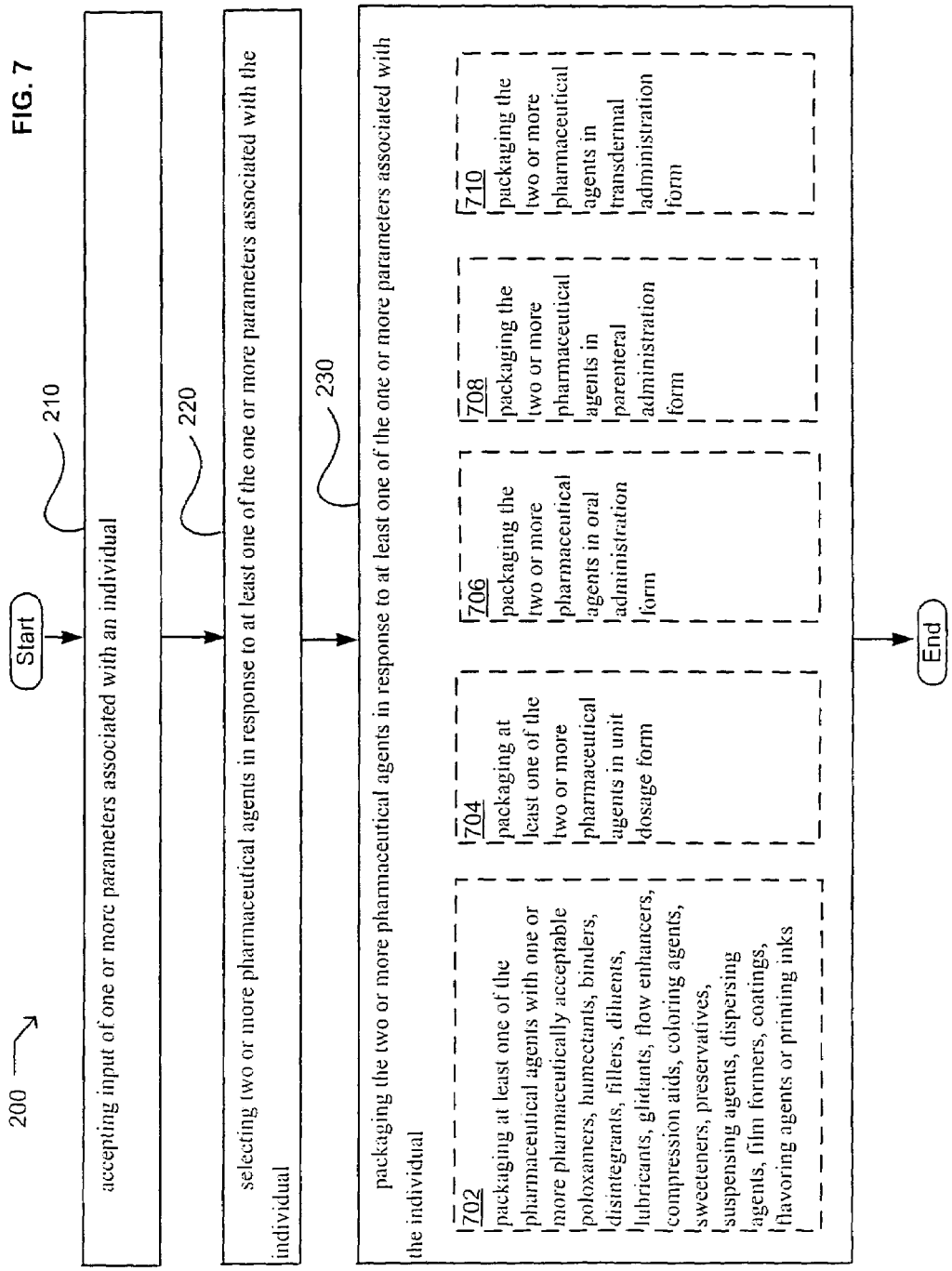
FIG. 7 illustrates alternative embodiments of the example operation flow of FIG. 2.

FIG. 7 illustrates alternative embodiments of the example operational flow 200 of FIG. 2. FIG. 7 illustrates example embodiments where the packaging operation 230 may include at least one additional operation. Additional operations may include an operation 702, operation 704, operation 706, operation 708 and/or operation 710.

At operation 702, the packaging operation 230 may include packaging at least one of the pharmaceutical agents 112 with one or more pharmaceutically acceptable poloxamers, humectants, binders, disintegrants, fillers, diluents, lubricants, glidants, flow enhancers, compression aids, coloring agents, sweeteners, preservatives, suspending agents, dispersing agents, film formers, coatings, flavoring agents or printing inks. In some embodiments, one or more packaging units 114 may package at least one of the pharmaceutical agents 112 with one or more pharmaceutically acceptable poloxamers, humectants, binders, disintegrants, fillers, diluents, lubricants, glidants, flow enhancers, compression aids, coloring agents, sweeteners, preservatives, suspending agents, dispersing agents, film formers, coatings, flavoring agents or printing inks.

At operation 704, the packaging operation 230 may include packaging at least one of the two or more pharmaceutical agents 112 in unit dosage form. In some embodiments, one or more packaging units 114 may package at least one of the two or more pharmaceutical agents 112 in unit dosage form. The term "unit dosage form" refers to one or more amounts of one or more pharmaceutical agents 112 that are suitable as unitary dosages for individuals, such as human and non-human individuals, with each unit containing a predetermined quantity of at least one pharmaceutical agent 112 calculated to produce a desired effect, such as a therapeutic effect, in association with one or more suitable pharmaceutical carriers. Such unit dosage forms may be packaged in numerous configurations that include, but are not limited to, tablets, capsules, ampoules, and other administration forms known in the art and described herein. In some embodiments, two or more unit dosage forms of one or more pharmaceutical agents 112 may be packaged into an administration form. For example, in some embodiments, two unit dosage forms may be wrapped into an administration form through use of a continuous wrapper such that they are released at different times following administration to an individual 108. In such an example, two unit dosage forms are included within one administration form. Accordingly, numerous combinations of pharmaceutical agents 112 and unit dosage forms may be included within an administration form.

At operation 706, the packaging operation 230 may include packaging the two or more pharmaceutical agents 112 in oral administration form. In some embodiments, one or more packaging units 114 may package the two or more pharmaceutical agents 112 in oral administration form.

For oral administration, one or more pharmaceutical agents 112 may be packaged into an oral administration form by combining the one or more pharmaceutical agents 112 with pharmaceutically acceptable carriers that are well known in the art. Such carriers allow the one or more pharmaceutical agents 112 to be formulated as tablets, pills, dragees, capsules, liquids, gels, syrups, slurries, suspensions and the like, for oral ingestion by an individual 108. Oral administration forms can be obtained by combining the one or more pharmaceutical agents 112 with a solid excipient, optionally grinding the resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethylcellulose, and/or polyvinylpyrrolidone. If desired, disintegrating agents may be added, such as the cross-linked polyvinyl pyrrolidone, agar, or alginic acid or a salt thereof such as sodium alginate.

Dragee cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or dragee coatings for identification or to characterize different combinations of pharmaceutical agents 112.

Oral administration forms may include push-fit capsules made of gelatin, as well as soft, sealed capsules made of gelatin and a plasticizer, such as glycerol or sorbitol. The push-fit capsules can contain one or more pharmaceutical agents 112 in admixture with a filler such as lactose, binders such as starches, and/or lubricants such as talc or magnesium stearate and, optionally, stabilizers. In soft capsules, the pharmaceutical agents 112 may be dissolved or suspended in suitable liquids, such as fatty oils, liquid paraffin, or liquid polyethylene glycols. In addition, stabilizers may be added. All oral dosage forms may be prepared in dosages suitable for such administration. For buccal administration, the pharmaceutical agents 112 may take the form of tablets or lozenges formulated in a conventional manner.

At operation 708, the packaging operation 230 may include packaging the two or more pharmaceutical agents 112 in parenteral administration form. In some embodiments, one or more packaging units 114 may package the two or more pharmaceutical agents 112 in parenteral administration form.

The one or more pharmaceutical agents 112 may be formulated for parenteral administration by injection (i.e., bolus injection or continuous infusion). Formulations for injection may be presented in unit dosage form (i.e., in ampoules or in multi-dose containers) with an added preservative. The administration forms may take such forms as suspensions, solutions or emulsions in oily or aqueous vehicles, and may contain formulatory agents such as suspending, stabilizing and/or dispersing agents.

Administration forms for parenteral administration may include aqueous solutions of the one or more pharmaceutical agents 112 in water-soluble form. In some embodiments, the one or more pharmaceutical agents 112 may be formulated in physiologically compatible buffers that include Hanks solution, Ringers solution, physiological saline buffer, and the like. Additionally, suspensions of the one or more pharmaceutical agents 112 may be prepared as appropriate oily injection suspensions. Suitable lipophilic solvents include fatty oils such as sesame oil, or synthetic fatty acid esters, such as ethyl oleate or triglycerides, or liposomes. Aqueous injection suspensions may include substances which increase the viscosity of the suspension, such as sodium carboxymethyl cellulose, sorbitol, or dextran. Optionally, the suspension may also contain suitable stabilizers or agents which increase the solubility of the one or more pharmaceutical agents 112 to allow for the preparation of highly concentrated solutions.

At operation 710, the packaging operation 230 may include packaging the two or more pharmaceutical agents 112 in transdermal administration form. In some embodiments, one or more packaging units 114 may package the two or more pharmaceutical agents 112 in transdermal administration form. For transdermal, including transmucosal, administration of the one or more pharmaceutical agents 112, penetrants appropriate to the barrier or barriers to be permeated may be used in the formulation. Briefly, in some embodiments, a transdermal administration form may include an ethoxylated lipid, an alcohol mixed with the ethoxylated lipid to form a penetration enhancer, an aqueous adjuvant mixed with the penetration enhancer, and a delivered pharmaceutical agent 112 mixed with the aqueous adjuvant and the penetration enhancer. In some embodiments, the aqueous adjuvant is a plant extract from the family of Liliaceae Liliaceae. In some embodiments, the ethoxylated lipid is a vegetable oil or animal oil having at least 20 ethoxylations per molecule. In other embodiments, about 0.1 percent to 40.0 percent by weight or volume is ethoxylated lipid. Other embodiments may include a transdermal delivery system that includes about 0.1 percent to 15 percent by weight or volume of alcohol or where about 0.1 percent to 85 percent by weight or volume is Aloe Vera. Numerous transdermal administration forms are known and have been described (i.e., U.S. Pat. Nos. 5,820,876; 7,045,145; 6,946,144; incorporated herein by reference).

Figure 8:
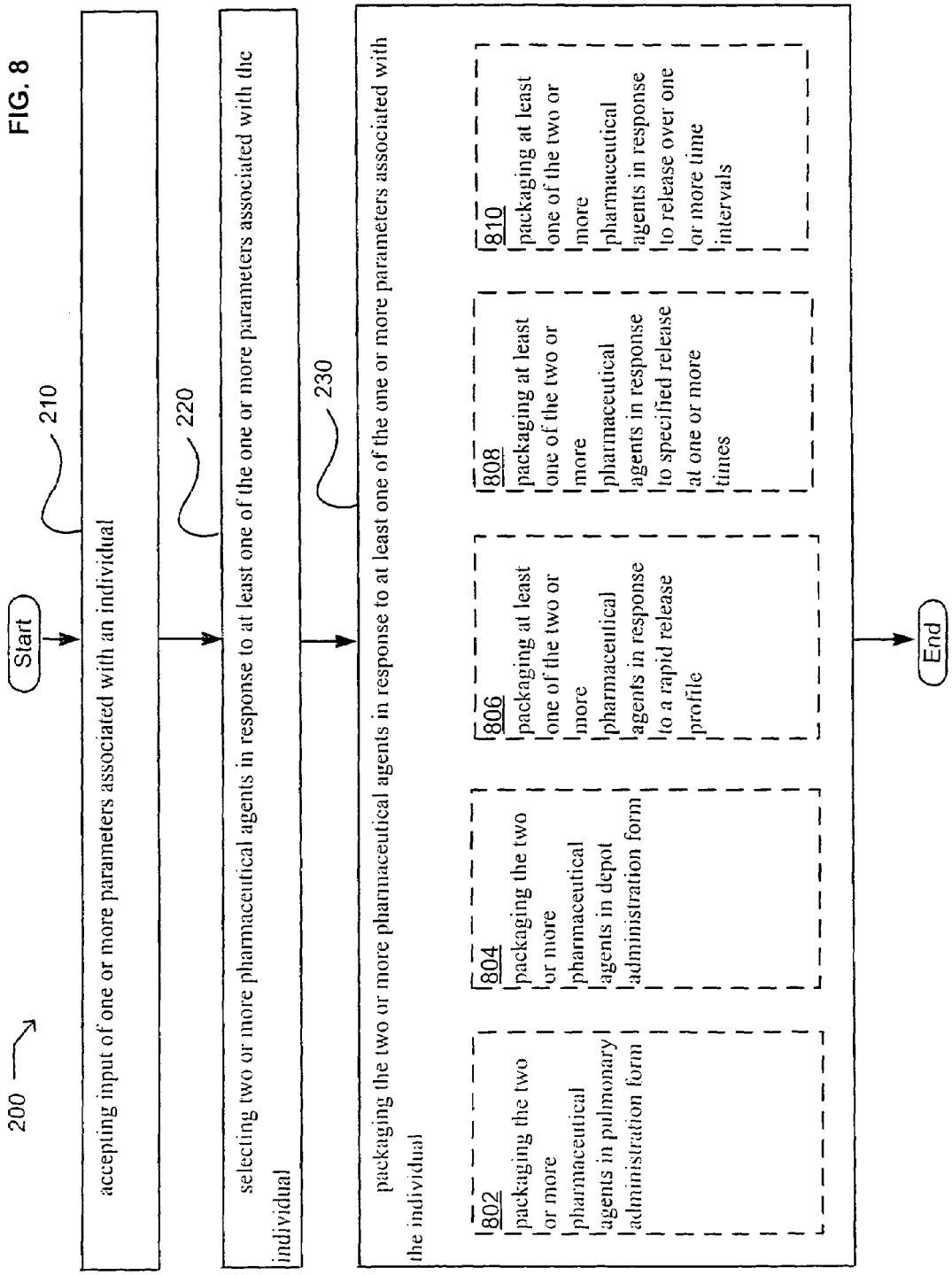
FIG. 8 illustrates alternative embodiments of the example operation flow of FIG. 2.

FIG. 8 illustrates alternative embodiments of the example operational flow 200 of FIG. 2. FIG. 8 illustrates example embodiments where the packaging operation 230 may include at least one additional operation. Additional operations may include an operation 802, operation 804, operation 806, operation 808 and/or operation 810.

At operation 802, the packaging operation 230 may include packaging the two or more pharmaceutical agents 112 in pulmonary administration form. In some embodiments, one or more packaging units 114 may package the two or more pharmaceutical agents 112 in pulmonary administration form. For pulmonary administration, the one or more pharmaceutical agents 112 may be delivered in the form of an aerosol spray from pressurized packs or a nebuliser, with the use of a suitable propellant (i.e., dichlorodifluoromethane, trichlorofluoromethane, dichlorotetrafluoroethane, carbon dioxide or other suitable gas). In the case of a pressurized aerosol, the dosage unit may be determined by providing a valve to deliver a metered amount of the one or more pharmaceutical agents 112. Capsules and cartridges for use in an inhaler or insufflator may be formulated to contain a powder mix of the one or more pharmaceutical agents 112 and a suitable powder base such as lactose or starch. Methods and materials that may be used to package one or more pharmaceutical agents 112 in pulmonary administration form are known and have been described (i.e., U.S. Pat. Nos. 6,921,527; 6,838,0763; 6,565,841; 6,451,286; 6,169,068; 5,993,783; 5,780,014; 5,719,123; 5,354,934; 5,284,656; 5,006,343; hereby incorporated by reference).

At operation 804, the packaging operation 230 may include packaging the two or more pharmaceutical agents 112 in depot administration form. In some embodiments, one or more packaging units 114 may package the two or more pharmaceutical agents 112 in depot administration form. In some embodiments, depot administration forms may be administered by implantation (i.e., subcutaneously, intramuscularly, intramuscular injection, subtenon, intravitreal injection). Accordingly, for example, the one or more pharmaceutical agents 112 may be packaged with suitable polymeric or hydrophobic materials, ion exchange resins, and the like. Methods and materials that may be used to package pharmaceutical agents 112 in depot administration form are known and are commercially available (i.e., U.S. Pat. Nos. 6,773,714; 6,630,155, 6,565,874; 5,945,115; herein incorporated by reference).

At operation 806, the packaging operation 230 may include packaging at least one of the two or more pharmaceutical agents 112 in response to a rapid release profile. In some embodiments, one or more packaging units 114 may package at least one of the two or more pharmaceutical agents 112 in response to a rapid release profile. In some embodiments, water-soluble nonionic polysaccharide derivatives may be used to package one or more pharmaceutical agents 112. For example, hydroxypropylmethylcellulose, hydroxypropylcellulose, and/or sodium carboxymethylcellulose may be used. Such polymers form coatings that quickly dissolve in water and have a high permeability. Accordingly, in some embodiments, such polymers may be used for rapid release of one or more pharmaceutical agents 112 that are packaged in such materials following administration to an individual 108. Numerous rapid release formulations are known and have been described (i.e., U.S. Pat. No. 6,979,463; herein incorporated by reference).

At operation 808, the packaging operation 230 may include packaging at least one of the two or more pharmaceutical agents 112 in response to specified release at one or more times. In some embodiments, one or more packaging units 114 may package at least one of the two or more pharmaceutical agents 112 in response to specified release at one or more times. In some embodiments, one or more pharmaceutical agents 112 may be packaged so that they are released from an administration form at one or more times following administration to an individual 108. In some embodiments, one or more pharmaceutical agents 112 may be released at one or more times following administration to maintain the dosage of the one or more pharmaceutical agents 112 at or above a certain concentration. Accordingly, in some embodiments, the concentration of one pharmaceutical agent 112 may be maintained over a period of time in association with an individual 108. In other embodiments, the concentration of more than one pharmaceutical agent 112 may be maintained over a period of time in association with an individual 108. In some embodiments, one or more pharmaceutical agents 112 may be packaged to be released in anticipation of an event, such as a long airplane flight. For example, in some embodiments, one or more pharmaceutical agents 112 that induce sleep may be packaged into an administration form so that an individual 108 to whom the administration form is administered will fall asleep at a precalculated time on an airplane during a long flight. In other embodiments, one or more pharmaceuticals may be packaged into an administration form such that an individual 108 to whom the administration form is administered will not fall asleep during a long meeting or presentation. For example, an administration form may be prepared with non-drowsy versions of one or more pharmaceutical agents 112. Numerous methods may be used to package one or more pharmaceutical agents 112 for release at one or more times. For example, in some embodiments, one or more pharmaceutical agents 112 may be wrapped into an administration form through methods described herein. In such examples, the time of release of the one or more pharmaceutical agents 112 from the administration form may be controlled through selection of wrappers used to formulate the administration form. For example, a thick wrapper may be used to delay release while a thin wrapper may be used to expedite release of the one or more pharmaceutical agents 112 from the administration form. In other embodiments, one or more wrappers may be selected that are made of material that is more or less resistant to degradation when administered to an individual 108. Accordingly, materials having various chemical and physical properties may be selected to produce administration forms that release one or more pharmaceutical agents 112 at one or more times.

At operation 810, the packaging operation 230 may include packaging at least one of the two or more pharmaceutical agents 112 in response to release over one or more time intervals. In some embodiments, one or more packaging units 114 may package at least one of the two or more pharmaceutical agents 112 in response to release over one or more time intervals. In some embodiments, one or more pharmaceutical agents 112 may be packaged so that they are released from an administration form over one or more time intervals following administration to an individual 108. In some embodiments, one or more pharmaceutical agents 112 may be released over one or more times following administration to maintain the dosage of the one or more pharmaceutical agents 112 at or above a certain concentration. Accordingly, in some embodiments, the concentration of one pharmaceutical agent 112 may be maintained over a period of time in association with an individual 108. In other embodiments, the concentration of more than one pharmaceutical agent 112 may be maintained over a period of time in association with an individual 108. In some embodiments, one or more pharmaceutical agents 112 may be packaged to be released over one or more time intervals in anticipation of an event, such as a long airplane flight, that may occur during the one or more time intervals. For example, in some embodiments, one or more pharmaceutical agents 112 that induce sleep may be packaged into an administration form so that they are released during the time interval in which an individual 108 to whom the administration form is administered is on an airplane. Numerous methods may be used to package one or more pharmaceutical agents 112 for release over one or more time intervals. For example, in some embodiments, one or more pharmaceutical agents 112 may be wrapped into an administration form through methods described herein. In such examples, the time of release of the one or more pharmaceutical agents 112 from the administration form may be controlled through selection of wrappers used to prepare the administration form. For example, a thick wrapper may be used to delay release while a thin wrapper may be used to expedite release of the one or more pharmaceutical agents 112 from the administration form. In other embodiments, one or more wrappers may be selected that are made of material that is more or less resistant to degradation when administered to an individual 108. In other embodiments, controlled-release formulations may be acquired and then packaged for release over one or more time intervals.

Figure 9:
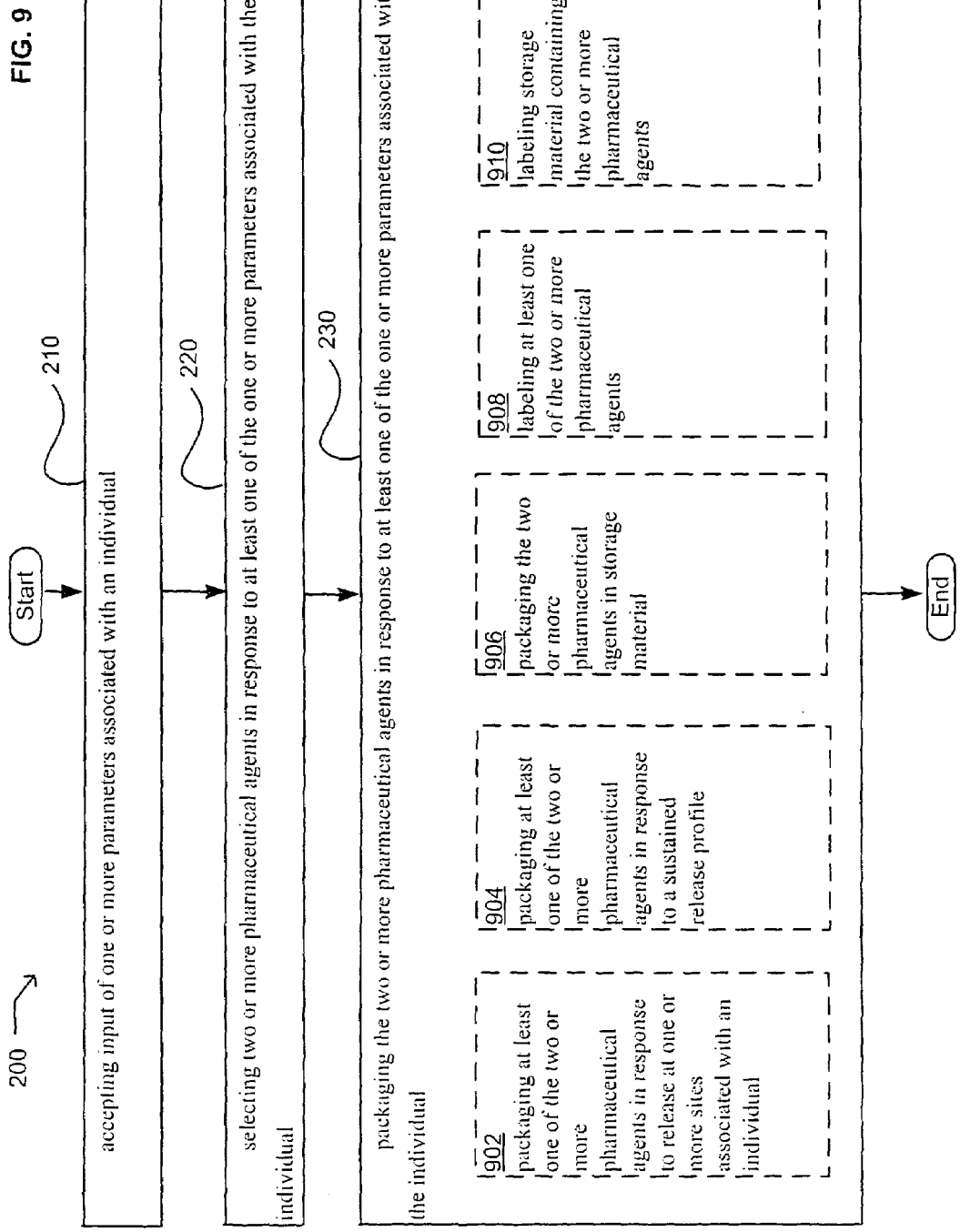
FIG. 9 illustrates alternative embodiments of the example operation flow of FIG. 2.

FIG. 9 illustrates alternative embodiments of the example operational flow 200 of FIG. 2. FIG. 9 illustrates example embodiments where the packaging operation 230 may include at least one additional operation. Additional operations may include an operation 902, operation 904, operation 906, operation 908 and/or operation 910.

At operation 902, the packaging operation 230 may include packaging at least one of the two or more pharmaceutical agents 112 in response to release at one or more sites associated with an individual 108. In some embodiments, one or more packaging units 114 may package at least one of the two or more pharmaceutical agents 112 in response to release at one or more sites associated with an individual 108. One or more pharmaceutical agents 112 may be packaged for administration to numerous sites that are associated with an individual 108. Examples of such sites include, but are not limited to, the eyes, ears, nose, skin, mouth, stomach, intestine, rectum, vagina, vascular system, pulmonary system, gastrointestinal system, urinary system and lymphatic system. Accordingly, in some embodiments, release of one or more pharmaceutical agents 112 from an administration form at one or more sites associated with an individual 108 may be controlled through selection of materials that degrade under conditions present at the desired site of release. For example, for release in the stomach, one or more pharmaceutical agents 112 may be packaged into an administration form that degrades when exposed to acidic conditions. In other examples, one or more pharmaceutical agents 112 may be released in the gastrointestinal tract by preparing an administration form that is acid resistant but that degrades under basic conditions. Numerous methods are known that may be used to release one or more pharmaceutical agents 112 at one or more sites associated with an individual 108.

At operation 904, the packaging operation 230 may include packaging at least one of the two or more pharmaceutical agents 112 in response to a sustained release profile. In some embodiments, one or more packaging units 114 may package at least one of the two or more pharmaceutical agents 112 in response to a sustained release profile. In some embodiments, one or more pharmaceutical agents 112 may be packaged with a carrier that may include a time-delay or time-release material known in the art, such as glyceryl monostearate or glyceryl distearate alone or with a wax, ethylcellulose, hydroxypropylmethylcellulose, methylmethacrylate and the like. Additionally, in some embodiments, one or more pharmaceutical agents 112 may be administered using a sustained-release system, such as semipermeable matrices of solid hydrophobic polymers containing the one or more pharmaceutical agents 112. Various sustained-release materials are known and have been described. For example, sustained-release capsules may, depending on their chemical composition, release one or more pharmaceutical agents 112 for a few weeks up to over 100 days. Numerous additional sustained-release formulations are known and have been described (i.e., U.S. Pat. Nos. 7,041,670; 7,041,317; 6,709,676; herein incorporated by reference).

At operation 906, the packaging operation 230 may include packaging the two or more pharmaceutical agents 112 in storage material. In some embodiments, one or more packaging units 114 may package the two or more pharmaceutical agents 112 in storage material. Two or more pharmaceutical agents 112 may be packaged in numerous types of storage material. Examples of storage material include, but are not limited to, containers, boxes, ampoules, vials, syringes, and the like. In some embodiments, storage material includes advertising. In some embodiments, storage material includes instructions for administration. Such instructions may include time for administration, route of administration, the name of the individual 108 to whom the two or more pharmaceutical agents 112 are to be administered, the identity of the two or more pharmaceutical agents 112, the dosage of the two or more pharmaceutical agents 112, appropriate buffers for suspension of the two or more pharmaceutical agents 112, the source of the two or more pharmaceutical agents 112, the name of a physician or physicians who prescribed the two or more pharmaceutical agents 112, the date when the two or more pharmaceutical agents 112 were prescribed, the date when the two or more pharmaceutical agents 112 were packaged, the date when the two or more pharmaceutical agents 112 were manufactured, the expiration date of the two or more pharmaceutical agents 112, and the like.

At operation 908, the packaging operation 230 may include labeling at least one of the two or more pharmaceutical agents 112. In some embodiments, one or more packaging units 114 may label at least one of the two or more pharmaceutical agents 112. In some embodiments, one or more packaging units 114 may place a label directly on at least one of the two or more pharmaceutical agents 112. Numerous methods may be used to label at least one of the two or more pharmaceutical agents 112. For example, in some embodiments, one or more labeling units may stamp an indented label into at least one of the two or more pharmaceutical agents 112. In some embodiments, one or more packaging units 114 may stamp a label onto at least one of the two or more pharmaceutical agents 112 through use of one or more edible dyes. Such labels may include numerous types of information. For example, such labels may indicate the manufacturer of at least one of the two or more pharmaceutical agents 112, the date of manufacture, the date of packaging, the dosage, the route of administration, and the like. Such labels may be in substantially any language. In some embodiments, at least one label may be a bar code.

At operation 910, the packaging operation 230 may include labeling storage material containing the two or more pharmaceutical agents 112. In some embodiments, one or more packaging units 114 may label storage material containing the two or more pharmaceutical agents 112. In some embodiments, storage material may be labeled with advertising. In some embodiments, storage material may be labeled with instructions for administration. Such instructions may include time for administration, route of administration, the name of the individual 108 to whom the two or more pharmaceutical agents 112 are to be administered, the identity of the two or more pharmaceutical agents 112, the dosage of the two or more pharmaceutical agents 112, appropriate buffers for suspension of the two or more pharmaceutical agents 112, the source of the two or more pharmaceutical agents 112, the name of a physician or physicians who prescribed the two or more pharmaceutical agents 112, the date when the two or more pharmaceutical agents 112 were prescribed, the date when the two or more pharmaceutical agents 112 were packaged, the date when the two or more pharmaceutical agents 112 were manufactured, the expiration date of the two or more pharmaceutical agents 112, and the like.

Figure 10:
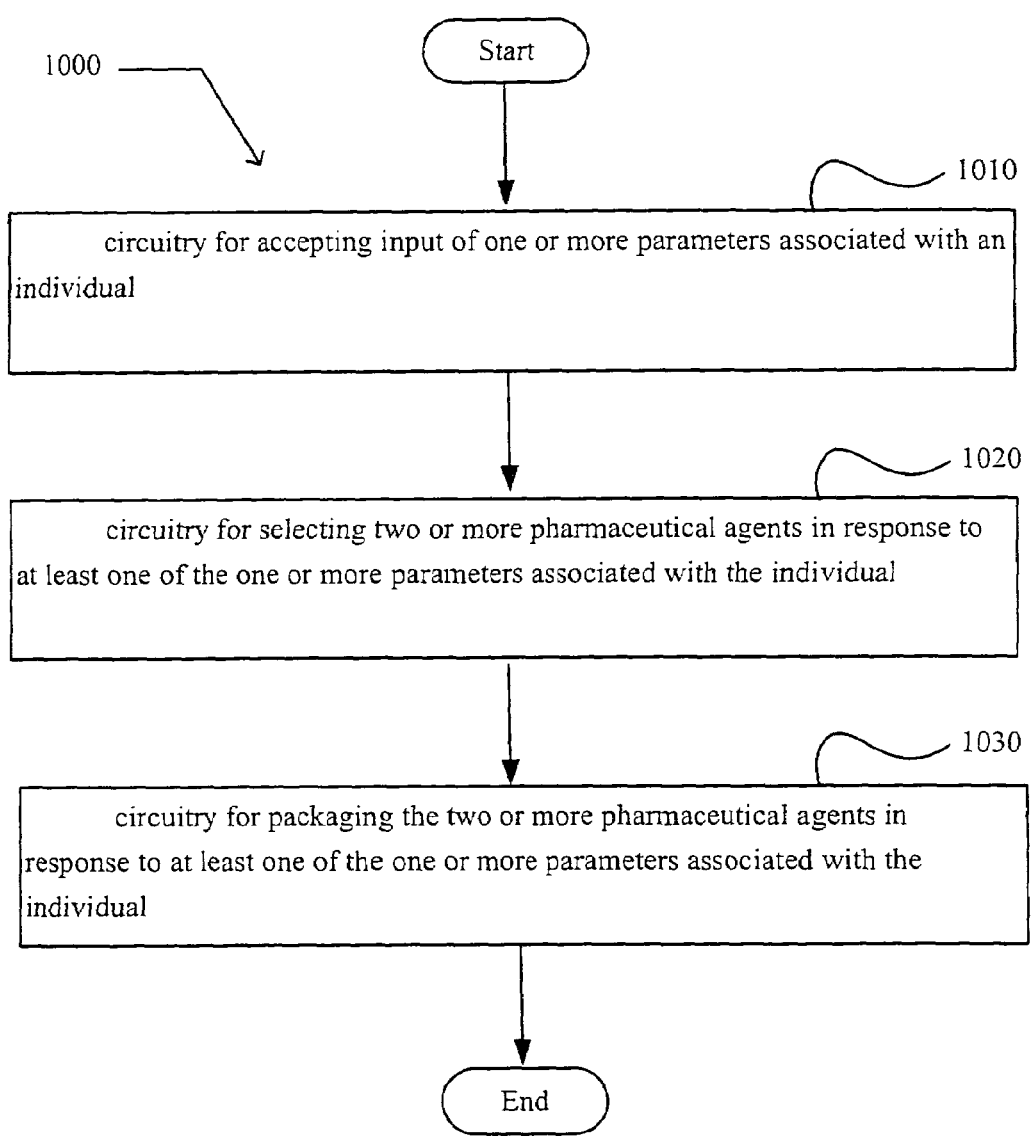
FIG. 10 illustrates an operational flow representing example operations related to systems for individualized pharmaceutical selection and packaging.

FIG. 10 illustrates an operational flow 1000 representing examples of circuitry that is related to systems for individualized pharmaceutical selection and packaging. In FIG. 10 and in following figures that include various examples of circuitry that is related to operations used during performance of a method, discussion and explanation may be provided with respect to the above-described example of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 1000 includes an accepting operation 1010 involving circuitry for accepting input of one or more parameters associated with an individual. In some embodiments, the circuitry may be used to accept input 104 of one or more parameters 106 associated with an individual 108. In some embodiments, the circuitry may be included within one or more accepting units 102 that accept input 104 of one or more parameters 106 associated with an individual 108.

In some embodiments, an individual 108 may be a human. In some embodiments, an individual 108 may be a non-human animal. Examples of such non-human animals include, but are not limited to, domestic pets such as dogs, cats, horses, potbelly pigs, ferrets, rodents, reptiles, amphibians, and the like. Non-human animals also include animals that include, but are not limited to, cattle, sheep, goats, chickens, pigs, and the like. Accordingly, the systems and methods described herein may be used in association with substantially any human and/or non-human animal.

Numerous parameters 106 may be associated with an individual 108. Such parameters 106 may include, but are not limited to, physical characteristics, metabolic characteristics, financial characteristics, and the like. Examples of parameters 106 include, an individual's height, weight, gender, kidney function, liver function, level of physical fitness, age, allergic response, metabolic level (i.e., resting metabolic rate and/or activity-related metabolic rate), disease state, body fat percentage, personal health habits (i.e., smoking, alcohol consumption, diet, illegal drug use, and the like), family health history, insurance coverage, food supplement usage, nutraceutical usage, non-prescription drug use, prescription drug use, pregnancy status, and the like.

Numerous technologies may be used to provide input 104 that include one or more parameters 106 associated with an individual 108. Examples of such technologies include, but are not limited to, hardwired input 104, wireless input 104, computer input 104, telephonic input 104, internet based input 104, intranet based input 104, digital input 104, analog input 104, input 104 from a human, input 104 from a palm held organizer, input 104 from a personal digital assistant, input 104 from a web enabled cellular telephone, and the like. In some embodiments, one or more accepting units 102 accept input 104 from one source. In some embodiments, one or more accepting units 102 accept input 104 from more than one source. For example, in some embodiments, an accepting unit 102 may accept input 104 from an insurance company, a physician, a pharmacist, a clinical laboratory and a pharmaceutical company. In some embodiments, input 104 may be associated with a physician input 104, a pharmacist input 104, a patient input 104, a machine input 104 and/or substantially any combination thereof.

In some embodiments an accepting unit 102 may include an input device. For example, in some embodiments, an accepting unit 102 may include an interface, such as a keyboard, touch-screen and/or the like, where parameters 106 associated with an individual 108 may be input 104 directly into the accepting unit 102. In some embodiments, an accepting unit 102 may lack an interface where parameters 106 associated with an individual 108 may be directly input 104 into the accepting unit 102. In some embodiments, an accepting unit 102 may accept input 104 of one or more parameters 106 associated with an individual 108 from one or more locations that are remote from the accepting unit 102. For example, in some embodiments, an accepting unit 102 may accept input 104 from a wireless device, the internet, an intranet, a telephone, a palm held organizer, input 104 from a personal digital assistant, input 104 from a web enabled cellular telephone, and the like.

After a start operation, the operational flow 1000 includes a selecting operation 1020 involving circuitry for selecting two or more pharmaceutical agents in response to at least one of the one or more parameters associated with the individual. In some embodiments, the circuitry may be used to select two or more pharmaceutical agents 112 in response to at least one of the one or more parameters 106 associated with the individual 108. In some embodiments, the circuitry may be included within one or more selecting units 110 that can be used to select two or more pharmaceutical agents 112 in response to at least one of the one or more parameters 106 associated with the individual 108. In some embodiments, one or more selecting units 110 may select one or more first pharmaceutical agents 112 in response to at least one of the one or more parameters 106 associated with an individual 108 and select one or more second pharmaceutical agents 112 based on the identity of the one or more first pharmaceutical agents 112 selected. For example, in some embodiments, one or more selecting units 110 may select the first and second pharmaceutical agents 112 to act synergistically with each other when administered to an individual 108. In some embodiments, one or more selecting units 110 may select the first and second pharmaceutical agents 112 so that they do not contraindicate each other when administered to an individual 108. Pharmaceutical agents 112 may be selected in response to numerous parameters 106.

After a start operation, the operational flow 1000 includes a packaging operation 1030 involving circuitry for packaging the two or more pharmaceutical agents in response to at least one of the one or more parameters associated with the individual. In some embodiments, the circuitry may be used to package the two or more pharmaceutical agents 112 in response to at least one of the one or more parameters 106 associated with the individual 108. In some embodiments, the circuitry may be included within one or more packaging units 114 that can be used to package the two or more pharmaceutical agents 112 in response to at least one of the one or more parameters 106 associated with the individual 108.

Numerous types of packaging units 114 may be used to package two or more pharmaceutical agents 112. In some embodiments, one packaging unit 114 is used to package two or more pharmaceutical agents 112. In some embodiments, one or more packaging units 114 are used to package two or more pharmaceutical agents 112. In some embodiments, two or more packaging units 114 are used to package two or more pharmaceutical agents 112. In some embodiments, a first packaging unit 114 may package one or more first pharmaceutical agents 112, a second packaging unit 114 may package one or more second pharmaceutical agents 112, and a third packaging unit 114 may package the one or more first pharmaceutical agents 112 and one or more second pharmaceutical agents 112 together. In some embodiments, one packaging unit 114 may package the two or more pharmaceutical agents 112. In some embodiments, one or more packaging units 114 may formulate two or more pharmaceutical agents 112 for administration to an individual 108. In some embodiments, one or more packaging units 114 may package two or more preformulated pharmaceutical agents 112 for administration to an individual 108. For example, in some embodiments, one or more packaging units 114 may package two or more commercially available pharmaceutical preparations to provide for single administration to an individual 108. In some embodiments, one or more packaging units 114 may package two or more preformulated tablets containing the two or more pharmaceutical agents 112 into a single capsule for administration to an individual 108. In some embodiments, one or more packaging units 114 may wrap a second pharmaceutical agent 112 around a first pharmaceutical agent 112 through use of a biocompatible and dissolvable wrapper to produce an administration form having the first and second pharmaceutical agents 112 in concentric orientation relative to each other. In some embodiments, one or more packaging units 114 may package two or more pharmaceutical agents 112 into a compartmentalized capsule.

FIG. 11 illustrates alternative embodiments of the example operational flow 1000 of FIG. 10. FIG. 11 illustrates example embodiments where the circuitry for accepting operation 1010 may include at least one additional operation. Additional operations may include an operation 1102, operation 1104, operation 1106, operation 1108, operation 1110, operation 1112 and/or operation 1114.

At operation 1102, the accepting operation 1010 may include circuitry for accepting the one or more parameters 106 associated with a human individual 108. In some embodiments, one or more accepting units 102 may include circuitry for accepting the one or more parameters 106 associated with a human individual 108. In some embodiments, the one or more parameters 106 may include physical characteristics, metabolic characteristics, financial characteristics, and substantially any combination thereof. In some embodiments, such parameters 106 may include, alone or in combination and not limited to, an individual's height, weight, gender, kidney function, liver function, level of physical fitness, age, allergic response, metabolic level (i.e., resting metabolic rate and/or activity-related metabolic rate), disease state, body fat percentage, personal habits (i.e., smoking, alcohol consumption, diet, illegal drug use, and the like), family health history, insurance coverage, food supplement usage, physical activities, sleep schedule, activity level, occupation, nutraceutical usage, non-prescription drug use, prescription drug use, pregnancy status, predisposition toward the development of a malady, genotype, phenotype, genetic predisposition, administration form of a pharmaceutical agent, mode of administration, time of administration, administration schedule, exposure to pathogens, potential exposure to pathogens, exposure to toxins, potential exposure to toxins, and the like. For example, in some embodiments, one or more parameters 106 associated with a human child may be input 104. Accordingly, such parameters 106 may provide for selection of one or more pharmaceutical agents 112 that may be administered to a human child. In other embodiments, such parameters 106 may provide for selection against one or more pharmaceutical agents 112 that should not be administered to a human child. Accordingly, in some embodiments, an input 104 may provide for the selection of one or more pharmaceutical agents 112. However, in other embodiments, an input 104 may provide for selection against one or more pharmaceutical agents 112. In some embodiments, parameters 106 may be input 104 that relate to environmental factors such as, time, temperature, elevation, humidity, events, activities and the like. For example, an input 104 may include parameters 106 related to an individual 108 who is a mountain climber. Accordingly, one or more pharmaceutical agents 112 may be selected that will not vaporize under lessened atmospheric pressure, that will not freeze, and/or that will not break. In some embodiments, one or more parameters 106 may be input 104 that relate to administration form and mode of administration of the one or more pharmaceutical agents 112 to the individual 108. For example, in some embodiments, one or more parameters 106 may be input 104 that indicate that the individual 108 prefers to orally ingest pharmaceutical agents 112. In some embodiments, one or more parameters 106 may be input 104 that indicate that the individual 108 is to ingest two or more pharmaceutical agents 112 within a given time period. Accordingly, in some embodiments, an input 104 may be associated with the selection of two or more pharmaceutical agents 112 that are compatible with each other and/or that do not contraindicate each other. In some embodiments, an input 104 may be associated with the selection of two or more pharmaceutical agents 112 that act in a synergistic manner when administered to an individual 108.

At operation 1104, the accepting operation 1010 may include circuitry for accepting the one or more parameters 106 associated with a non-human individual 108. In some embodiments, one or more accepting units 102 may include circuitry for accepting the one or more parameters 106 associated with a non-human individual 108. Examples of such non-human animals include, but are not limited to, domestic pets such as dogs, cats, horses, potbelly pigs, ferrets, rodents, reptiles, amphibians, and the like. Non-human animals may also be animals that include, but are not limited to, cattle, sheep, goats, chickens, pigs, and the like. Accordingly, in some embodiments, the methods and/or systems described herein may be used for veterinary purposes. In some embodiments, the one or more parameters 106 may include physical characteristics, metabolic characteristics, financial characteristics (such as valuation of the non-human animal), and substantially any combination thereof. In some embodiments, such parameters 106 may include, alone or in combination and not limited to, a non-human individual's height, weight, gender, kidney function, liver function, level of physical fitness, age, allergic response, metabolic level (i.e., resting metabolic rate and/or activity-related metabolic rate), disease state, body fat percentage, health history, insurance coverage, food supplement usage, physical activities, sleep schedule, activity level, nutraceutical usage, non-prescription drug use, prescription drug use, pregnancy status, predisposition toward the development of a malady, genotype, phenotype, genetic predisposition, administration form, mode of administration, exposure to pathogens, potential exposure to pathogens, exposure to toxins, potential exposure to toxins, and the like. For example, in some embodiments, parameters 106 associated with an infant non-human individual 108 may be input 104. Accordingly, such parameters 106 may provide for selection of one or more pharmaceutical agents 112 that may be administered to an infant non-human individual 108. In other embodiments, such parameters 106 may provide for selection against one or more pharmaceutical agents 112 that should not be administered to an infant non-human individual 108. Accordingly, in some embodiments, an input 104 may provide for the selection of one or more pharmaceutical agents 112. However, in other embodiments, an input 104 may provide for selection against one or more pharmaceutical agents 112. In some embodiments, parameters 106 may be input 104 that relate to environmental factors surrounding the non-human individual 108 that include time, temperature, elevation, humidity, events, activities and the like. In some embodiments, one or more parameters 106 may be input 104 that relate to administration form and mode of administration of the one or more pharmaceutical agents 112 to the non-human individual 108. For example, in some embodiments, one or more parameters 106 may be input 104 that indicate that one or more pharmaceutical agents 112 should be administered to the non-human individual 108 orally. In some embodiments, one or more parameters 106 may be input 104 that indicate that the non-human individual 108 is to ingest two or more pharmaceutical agents 112 within a given time period. Accordingly, in some embodiments, an input 104 may be associated with the selection of two or more pharmaceutical agents 112 that are compatible with each other and/or that do not contraindicate each other. In some embodiments, an input 104 may be associated with the selection of two or more pharmaceutical agents 112 that act in a synergistic manner when administered to a non-human individual 108.

At operation 1106, the accepting operation 1010 may include circuitry for accepting the one or more parameters 106 associated with a physician input 104. In some embodiments, one or more accepting units 102 may include circuitry for accepting the one or more parameters 106 associated with a physician input 104. In some embodiments, one or more physicians may input 104 one or more parameters 106 associated with an individual 108. In some embodiments, one or more parameters 106 may be input 104 by one or more physicians and one or more other sources. Other sources of input 104 include, but are not limited to, veterinarian input 104, pharmacist input 104, patient input 104, machine input 104, and the like. In some embodiments, one or more physicians may examine the individual 108 and input 104 one or more parameters 106 associated with the individual 108 that are related to the examination. For example, one or more physicians may input 104 one or more parameters 106 associated with an individual's heart rate, skin condition, allergy status, sleep status, and the like. In some embodiments, one or more physicians may input 104 one or more parameters 106 associated with an individual 108 without ever seeing the individual 108. For example, in some embodiments, one or more physicians may review a medical chart associated with the individual 108 and input 104 parameters 106 based on the information contained in the medical chart. In some embodiments, one or more physicians may input 104 parameters 106 associated with an individual 108 from the physician's memory. In some embodiments, one or more physicians may input 104 parameters 106 associated with an individual 108 following consultation with a database and/or other source of information. In some embodiments, one or more physicians may input 104 parameters 106 associated with an individual 108 directly through use of a keyboard, a touch-screen, and the like. In some embodiments, one or more physicians may input 104 parameters 106 associated with an individual 108 remotely through use of numerous technologies that include, input 104 from a wireless device, the internet, an intranet, a telephone, a palm held organizer, input 104 from a personal digital assistant, input 104 from a web enabled cellular telephone, and the like.

At operation 1108, the accepting operation 1010 may include circuitry for accepting the one or more parameters 106 associated with a veterinarian input 104. In some embodiments, one or more accepting units 102 may include circuitry for accepting the one or more parameters 106 associated with a veterinarian input 104. In some embodiments, one or more veterinarians may input 104 one or more parameters 106 associated with a non-human individual 108. In some embodiments, one or more parameters 106 may be input 104 by one or more veterinarians and one or more other sources. Other sources of input 104 include, but are not limited to, physician input 104, pharmacist input 104, patient input 104, machine input 104, and the like. In some embodiments, one or more veterinarians may examine a non-human individual 108 and input 104 one or more parameters 106 associated with the non-human individual 108 that are related to the examination. For example, one or more veterinarians may input 104 one or more parameters 106 associated with a non-human individual's heart rate, skin condition, allergy status, sleep status, and the like. In some embodiments, one or more veterinarians may input 104 one or more parameters 106 associated with a non-human individual 108 without ever seeing the non-human individual 108. For example, in some embodiments, one or more veterinarians may review a medical chart associated with the non-human individual 108 and input 104 parameters 106 based on the information contained in the medical chart. In some embodiments, one or more veterinarians may input 104 parameters 106 associated with a non-human individual 108 from the veterinarian's memory. In some embodiments, one or more veterinarians may input 104 parameters 106 associated with a non-human individual 108 following consultation with a database and/or other source of information. In some embodiments, one or more veterinarians may input 104 parameters 106 associated with a non-human individual 108 directly through use of a keyboard, a touch-screen, and the like. In some embodiments, one or more veterinarians may input 104 parameters 106 associated with a non-human individual 108 remotely through use of numerous technologies that include, input 104 from a wireless device, the internet, an intranet, a telephone, a palm held organizer, input 104 from a personal digital assistant, input 104 from a web enabled cellular telephone, and the like.

At operation 1110, the accepting operation 1010 may include circuitry for accepting the one or more parameters 106 associated with a pharmacist input 104. In some embodiments, one or more accepting units 102 may include circuitry for accepting the one or more parameters 106 associated with a pharmacist input 104. In some embodiments, one or more pharmacists may input 104 one or more parameters 106 associated with an individual 108. In some embodiments, one or more parameters 106 may be input 104 by one or more pharmacists and one or more other sources. Other sources of input 104 include, but are not limited to, physician input 104, veterinarian input 104, patient input 104, machine input 104, and the like. In some embodiments, one or more pharmacists may consult with an individual 108 and input 104 one or more parameters 106 associated with the individual 108 that are related to the consultation. For example, one or more pharmacists may input 104 one or more parameters 106 associated with an individual's heart rate, skin condition, allergy status, sleep status, and the like. In some embodiments, one or more pharmacists may input 104 one or more parameters 106 associated with an individual 108 without ever seeing the individual 108. For example, in some embodiments, one or more pharmacists may receive information associated with the individual 108 and input 104 parameters 106 based on the received information. In some embodiments, one or more pharmacists may input 104 parameters 106 associated with an individual 108 from the pharmacist's memory. In some embodiments, one or more pharmacists may input 104 parameters 106 associated with an individual 108 following consultation with a database and/or other source of information. In some embodiments, one or more pharmacists may input 104 parameters 106 associated with an individual 108 directly through use of a keyboard, a touch-screen, and the like. In some embodiments, one or more pharmacists may input 104 parameters 106 associated with an individual 108 remotely through use of numerous technologies that include, input 104 from a wireless device, the internet, an intranet, a telephone, a palm held organizer, input 104 from a personal digital assistant, input 104 from a web enabled cellular telephone, and the like.

At operation 1112, the accepting operation 1010 may include circuitry for accepting the one or more parameters 106 associated with a patient input 104. In some embodiments, one or more accepting units 102 may include circuitry for accepting the one or more parameters 106 associated with a patient input 104. In some embodiments, a patient may input 104 one or more parameters 106 associated with the patient. In some embodiments, one or more parameters 106 may be input 104 by the patient and one or more other sources. Other sources of input 104 include, but are not limited to, physician input 104, pharmacist input 104, patient input 104, machine input 104, and the like. In some embodiments, a patient may input 104 one or more parameters 106 associated with the patient's heart rate, skin condition, allergy status, sleep status, and the like. In some embodiments, a patient may input 104 parameters 106 associated with the patient following consultation with a database and/or other source of information. In some embodiments, a patient may input 104 parameters 106 associated with the patient directly through use of a keyboard, a touch-screen, and the like. In some embodiments, a patient may input 104 parameters 106 associated with the patient remotely through use of numerous technologies that include, input 104 from a wireless device, the internet an intranet, a telephone, a palm held organizer, input 104 from a personal digital assistant, input 104 from a web enabled cellular telephone, and the like. In some embodiments, a patient may input 104 parameters 106 associated with pharmaceutical agents 112 that are being administered to the patient. In some embodiments, a patient may input 104 parameters 106 associated with one or more times of administration of one or more pharmaceutical agents 112.

At operation 1114, the accepting operation 1010 may include circuitry for accepting the one or more parameters 106 associated with a machine input 104. In some embodiments, one or more accepting units 102 may include circuitry for accepting the one or more parameters 106 associated with a machine input 104. In some embodiments, the one or more parameters 106 may include physical characteristics, metabolic characteristics, financial characteristics, and substantially any combination thereof. In some embodiments, such parameters 106 may include, alone or in combination and not limited to, an individual's height, weight, gender, kidney function, liver function, level of physical fitness, age, allergic response, metabolic level (i.e., resting metabolic rate and/or activity-related metabolic rate), disease state, body fat percentage, personal habits (i.e., smoking, alcohol consumption, diet, illegal drug use, and the like), family health history, insurance coverage, food supplement usage, physical activities, sleep schedule, activity level, occupation, nutraceutical usage, non-prescription drug use, prescription drug use, pregnancy status, predisposition toward the development of a malady, genotype, phenotype, genetic predisposition, administration form of a pharmaceutical agent, mode of administration, time of administration, administration schedule, exposure to pathogens, potential exposure to pathogens, exposure to toxins, potential exposure to toxins, and the like. For example, in some embodiments, one or more parameters 106 associated with a human child may be input 104. Accordingly, such parameters 106 may provide for selection of one or more pharmaceutical agents 112 that may be administered to a human child. In other embodiments, such parameters 106 may provide for selection against one or more pharmaceutical agents 112 that should not be administered to a human child. Accordingly, in some embodiments, an input 104 may provide for the selection of one or more pharmaceutical agents 112. However, in other embodiments, an input 104 may provide for selection against one or more pharmaceutical agents 112. In some embodiments, parameters 106 may be input 104 that relate to environmental factors such as, time, temperature, elevation, humidity, events, activities and the like. For example, an input 104 may include parameters 106 related to an individual 108 who is a mountain climber. Accordingly, one or more pharmaceutical agents 112 may be selected that will not vaporize under lessened atmospheric pressure, that will not freeze, and/or that will not break. In some embodiments, one or more parameters 106 may be input 104 that relate to administration form and mode of administration of the one or more pharmaceutical agents 112 to the individual 108. For example, in some embodiments, one or more parameters 106 may be input 104 that indicate that the individual 108 prefers to orally ingest pharmaceutical agents 112. In some embodiments, one or more parameters 106 may be input 104 that indicate that the individual 108 is to ingest two or more pharmaceutical agents 112 within a given time period. Accordingly, in some embodiments, an input 104 may be associated with the selection of two or more pharmaceutical agents 112 that are compatible with each other and/or that do not contraindicate each other. In some embodiments, an input 104 may be associated with the selection of two or more pharmaceutical agents 112 that act in a synergistic manner when administered to an individual 108. In some embodiments, the machine is a diagnostic machine that has been utilized during examination of the individual 108.

FIG. 12 illustrates alternative embodiments of the example operational flow 1000 of FIG. 10. FIG. 12 illustrates example embodiments where the circuitry for selecting operation 1020 may include at least one additional operation. Additional operations may include an operation 1202, operation 1204, operation 1206, operation 1208 and/or operation 1210.

At operation 1202, the selecting operation 1020 may include circuitry for selecting at least one of the two or more pharmaceutical agents 112 in response to at least one condition specifically associated with the individual 108. In some embodiments, one or more selecting units 110 may include circuitry for selecting at least one of the two or more pharmaceutical agents 112 in response to at least one condition specifically associated with the individual 108.

In some embodiments, a condition specifically associated with an individual 108 may be an existing condition. In some embodiments, an existing condition is a medical condition. Examples of such medical conditions include, but are not limited to, viral infection, bacterial infection, fungal infection, diabetes, arthritis, gastrointestinal maladies, cancer, allergic responses, psychological disorders, osteoporosis, Alzheimer's disease, asthma, chronic fatigue syndrome, epilepsy, heart disease, hemochromatosis, hepatitis, stroke, food intolerance, and the like in substantially any combination. Accordingly, one or more pharmaceutical agents 112 may be selected to reduce or ameliorate the symptoms of a condition or to treat the condition directly. Numerous pharmaceutical agents 112 that may be selected in response to a condition are known (i.e., The Merck Index, 13$^{th}$ Edition, An Encyclopedia of Chemicals, Drugs, and Biologicals, Merck & Co. Inc., Whitehouse Station, N.J. 2001; Mosby's Drug Guide, Mosby, Inc., St. Louis, Mo. 2004; Remington: The Science and Practice of Pharmacy, 20$^{th}$ Edition, Lippincott Williams & Wilkins, Philadelphia, Pa. 2000; Physicians' Desk Reference, 58$^{th}$ Edition, Thompson, PDR, Montvale, N.J. 2004; U.S. Pat. No. 6,773,721, herein incorporated by reference).

In some embodiments, a condition specifically associated with an individual 108 may be a past condition. For example, one or more pharmaceutical agents 112 may be selected such that a condition, such as a medical condition, that an individual 108 was treated for in the past will be disallowed from reoccurring or the condition, or symptoms of the condition, may be reduced or minimized if the condition were to reoccur in the individual 108. For example, in some embodiments, one or more pharmaceutical agents 112 may be selected to prevent or reduce the consequences of a heart attack that may reoccur in an individual 108. In some embodiments, one or more pharmaceutical agents 112 may be selected to prevent or reduce the consequences of an epileptic seizure in an individual 108. Accordingly, one or more pharmaceutical agents 112 may be selected in response to numerous past conditions associated with the individual 108.

In some embodiments, a condition specifically associated with an individual 108 may be a future condition. For example, one or more pharmaceutical agents 112 may be selected such that a condition, such as a medical condition, that an individual 108 is predisposed to developing in the future may be disallowed from occurring or the condition, or symptoms of the condition, may be reduced or minimized if the condition were to occur in the individual 108. For example, bisphosphonates (alendronate, ibandronate and risedronate), calcitonin, estrogens, parathyroid hormone and raloxifene may be used for the prevention and/or treatment of osteoporosis. Accordingly, one or more pharmaceutical agents 112 may be selected in response to numerous future conditions associated with the individual 108. In some embodiments, one or more pharmaceutical agents 112 may be selected to prevent the occurrence of a future condition. For example, in some embodiments, the one or more pharmaceutical agents 112 may be vaccines that prevent or reduce infection by one or more infectious agents. In some embodiments, one or more pharmaceutical agents 112 may be selected in response to conditions that are cyclic. For example, in some embodiments, one or more pharmaceutical agents 112 may be selected in response to a woman's menstrual cycle. In other embodiments, one or more pharmaceutical agents 112 may be selected in response to a psychological malady, such as depression, that occurs in a cyclic manner. In other embodiments, one or more pharmaceutical agents 112 may be selected in response to hormonal changes that are expected to occur in the future, such as menopause.

In some embodiments, a condition specifically associated with an individual 108 may be an event or activity associated with an individual 108. For example, in some embodiments, one or more pharmaceutical agents 112 may be selected in response to a condition that is an event associated with an individual 108. For example, in some embodiments, an individual 108 may be expecting to participate in a sporting event. Accordingly, one or more pharmaceutical agents 112 may be selected in response to the event such that the one or more agents will not interfere with the performance of the individual 108. In other examples, the one or more pharmaceutical agents 112 may be selected to improve performance of the individual 108 in the event. In some embodiments, an individual 108 may expect to give a presentation. Accordingly, one or more pharmaceutical agents 112 may be selected that will not interfere with the performance of the individual 108 or that will improve performance of the individual 108 giving the presentation.

In some embodiments, a condition specifically associated with an individual 108 may be related to the environment in which the individual 108 resides or expects to reside. For example, if an individual 108 expects to travel on a boat, one or more pharmaceutical agents 112 may be selected that will not contribute to, or that will reduce or ameliorate, motion sickness. In some embodiments, the one or more pharmaceutical agents 112 may be selected based on the climactic environment in which an individual 108 resides or expects to reside. For example, one or more pharmaceutical agents 112 may be selected based on temperature, humidity, atmospheric pressure, and the like in substantially any combination. In some embodiments, the one or more pharmaceutical agents 112 may be selected based on the biological environment in which an individual 108 resides or expects to reside. For example, one or more pharmaceutical agents 112 may be selected based on the presence of allergens, pathogens, infectious agents, toxins, organisms and the like in substantially any combination.

In some embodiments, a condition specifically associated with an individual 108 may be a condition known to be associated with the individual 108 or a condition thought to be associated with an individual 108. For example, in some embodiments, one or more pharmaceutical agents 112 may be selected that can be used to treat an individual 108 with a diagnosed condition. In other embodiments, one or more pharmaceutical agents 112 may be selected that can be administered to an individual 108 with an undiagnosed condition with which the individual 108 was believed to be affected in the in the past, present or future.

At operation 1204, the selecting operation 1020 may include circuitry for selecting at least one of the two or more pharmaceutical agents 112 in response to at least one dosage specifically associated with the individual 108. In some embodiments, one or more selecting units 110 may include circuitry for selecting at least one of the two or more pharmaceutical agents 112 in response to at least one dosage specifically associated with the individual 108.

In some embodiments, one or more selecting units 110 may select one or more pharmaceutical agents 112 with regard to a volume of one or more of the pharmaceutical agents 112. For example, one or more selecting units 110 may select a first pharmaceutical agent 112 preferentially over a second pharmaceutical agent 112 if the first pharmaceutical agent 112 occupies less volume than the second pharmaceutical agent 112. In other examples, one or more selecting units 110 may select a first pharmaceutical agent 112 preferentially over a second pharmaceutical agent 112 if the first pharmaceutical agent 112 occupies more volume than the second pharmaceutical agent 112. Accordingly, one or more pharmaceutical agents 112 may be selected to increase or decrease the volume of the administration form of the one or more pharmaceutical agents 112 to promote administration to an individual 108.

In some embodiments, one or more selecting units 110 may select one or more pharmaceutical agents 112 with regard to the compatibility of the pharmaceutical agents 112 with each other or with the individual 108 at the dosage associated with the individual 108. For example, in some embodiments, one or more pharmaceutical agents 112 may be selected that are compatible with each other in response to dosage of at least one of the pharmaceutical agents 112 (i.e., see Mosby's Drug Guide, Mosby, Inc., St. Louis, Mo., 2004). In some embodiments, one or more pharmaceutical agents 112 may be selected to act synergistically with each other when administered to an individual 108 at a given dosage. In some embodiments, one or more pharmaceutical agents 112 may be selected to avoid synergistic interactions with each other when administered to an individual 108 at a given dosage. In some embodiments, one or more pharmaceutical agents 112 may be selected to counteract or reduce any negative side-effects of the one or more pharmaceutical agents 112 when they are administered to an individual 108 at a given dosage. In some embodiments, one or more pharmaceutical agents 112 may be selected with regard to dosage so that they do not contraindicate additional components, such as nutraceuticals and/or food supplements, ingested by an individual 108. In some embodiments, one or more pharmaceutical agents 112 may be selected with regard to the price of the one or more pharmaceutical agents 112 with regard to one or more dosages associated with an individual 108. For example, in some embodiments, a pharmaceutical agent 112 may be commercially available at two or more dosages that are priced differently. Accordingly, in some embodiments, the one or more pharmaceutical agents 112 may be selected to achieve a desired dosage when administered to an individual 108 while reducing or minimizing the price associated with the one or more pharmaceutical agents 112.

At operation 1206, the selecting operation 1020 may include circuitry for selecting the two or more pharmaceutical agents 112 in response to dosage of at least one of the two or more pharmaceutical agents 112. In some one or more selecting units 10 may include circuitry for selecting the two or more pharmaceutical agents 112 in response to dosage of at least one of the two or more pharmaceutical agents 112.

In some embodiments, one or more pharmaceutical agents 112 may be commercially available in preformulated administration forms. Accordingly, in some embodiments, one or more pharmaceutical agents 112 may be selected in response to administration forms that are commercially available. For example, in some embodiments, a pharmaceutical agent 112 may be commercially available in 100 milligram, 250 milligram, 500 milligram, 750 milligram and 1000 milligram preformulated administration forms. In some instances, an individual 108 may be prescribed to ingest 750 milligrams of a pharmaceutical agent 1112. Accordingly, in some embodiments, a 750 milligram administration form of the pharmaceutical agent 112 may be selected. In other embodiments, a 250 milligram and a 500 milligram administration form of the pharmaceutical agent 112 may be selected. In other embodiments, a 250 milligram and five 100 milligram administration forms of the pharmaceutical agent 112 may be selected. Numerous combinations of administration forms may be selected. In some embodiments, administration forms may be selected with regard to price associated with the administration form. For example, in some embodiments, it may be less expensive to achieve a 750 milligram dosage of a pharmaceutical agent 112 by combining one 250 milligram administration form with five 100 milligram administration forms than selecting a single 750 milligram administration form.

In some embodiments, one or more pharmaceutical agents 112 may be selected with regard to administration forms for administration to an individual 108 over one or more periods of time. For example, it may be desirable to administer 1000 milligrams of a pharmaceutical agent 112 to an individual 108 over a ten hour time period. Accordingly, in some embodiments, a single 1000 milligram controlled release administration form may be selected. In other embodiments, ten 100 milligram administration forms may be selected and then packaged to be released at a rate of one 100 milligram administration form per hour over the ten hour period. Accordingly, numerous combinations of administration forms and timed release may be selected.

In some embodiments, one or more selecting units 110 may select one or more pharmaceutical agents 112 with regard to one or more volumes of one or more of the pharmaceutical agents 112 in the available administration forms. For example, one or more selecting units 110 may select a first pharmaceutical agent 112 preferentially over a second pharmaceutical agent 112 if the first pharmaceutical agent 112 occupies less volume than the second pharmaceutical agent 112 with regard to available administration forms. In other examples, one or more selecting units 110 may select a first pharmaceutical agent 112 preferentially over a second pharmaceutical agent 112 if the first pharmaceutical agent 112 occupies more volume than the second pharmaceutical agent 112 with regard to available administration forms. Accordingly, one or more pharmaceutical agents 112 may be selected to increase or decrease the volume of the one or more pharmaceutical agents 112 to promote administration to an individual 108.

In some embodiments, one or more selecting units 110 may select one or more pharmaceutical agents 112 with regard to compatibility of the pharmaceutical agents 112 with each other and/or with the individual 108 when administered to the individual 108 at dosages corresponding to available administration forms of the pharmaceutical agents 112. For example, in some embodiments, one or more pharmaceutical agents 112 may be selected in response to administration forms available for the two or more pharmaceutical agents 112 (i.e., see Mosby's Drug Guide, Mosby, Inc., St. Louis, Mo., 2004). In some embodiments, two or more pharmaceutical agents 112 may be selected to act synergistically with each other when administered to an individual 108 at available administration forms. In some embodiments, one or more pharmaceutical agents 112 may be selected to avoid synergistic interactions with each other when administered to an individual 108 as available administration forms. In some embodiments, one or more pharmaceutical agents 112 may be selected to counteract or reduce any negative side-effects of the one or more pharmaceutical agents 112 when they are administered to an individual 108 at an available dosage. In some embodiments, one or more pharmaceutical agents 112 may be selected with regard to available dosage so that they do not contraindicate additional components, such as nutraceuticals and/or food supplements, ingested by an individual 108. In some embodiments, one or more pharmaceutical agents 112 may be selected with regard to the price of the one or more pharmaceutical agents 112 with regard to one or more available dosages associated with the one or more pharmaceutical agents 112. For example, in some embodiments, a pharmaceutical agent 112 may be commercially available at two or more dosages that are priced differently. Accordingly, in some embodiments, the one or more pharmaceutical agents 112 may be selected to achieve a desired dosage when administered to an individual 108 while reducing or minimizing the price associated with the one or more pharmaceutical agents 112.

At operation 1208, the selecting operation 1020 may include circuitry for selecting at least one of the two or more pharmaceutical agents 112 in response to at least one time of administration. In some embodiments, one or more selecting units 110 may include circuitry for selecting at least one of the two or more pharmaceutical agents 112 in response to at least one time of administration.

In some embodiments, the at least one time of administration is a time when the one or more pharmaceutical agents 112 are to be administered to an individual 108 to provide for release of the one or more pharmaceutical agents 112 from the administration form at a specified time following administration. For example, in some embodiments, at least one of the two or more pharmaceutical agents 112 may be selected such that it is released from an administration form about one hour after being administered to an individual 108. In other embodiments, a first pharmaceutical agent 112 may be selected such that it is released from an administration form about one hour after being administered to an individual 108 and a second pharmaceutical agent 112 may be selected such that it is released from an administration form about two hours after being administered to the individual 108. Accordingly, one or more pharmaceutical agents 112 may be selected that are released from an administration form at a specified time following administration to an individual 108 and thereupon become functionally available to the individual 108. In some embodiments, two or more incompatible pharmaceutical agents 112 may be administered to an individual 108 at the same time without adverse consequences by providing for release of the incompatible pharmaceutical agents 112 at different times such that they do not contraindicate each other. In some embodiments, two or more pharmaceutical agents 112 that act synergistically may be coadministered to an individual 108 such that they are released at substantially the same time to provide for synergistic action of the two or more pharmaceutical agents 112 with regard to the individual 108. Substantially any combination of pharmaceutical agents 112, dosages and release times may be selected.

In some embodiments, the at least one time of administration is relative to a time or event preceding or following administration of one or more pharmaceutical agents 112 to an individual 108. Accordingly, one or more pharmaceutical agents 112 may be selected that are released from an administration form at a relative time following administration to an individual 108 and thereupon become functionally available to the individual 108. For example, in some embodiments, two or more pharmaceutical agents 112 may be coadministered to an individual 108 such that a first pharmaceutical agent 112 is released from the administration form and a second pharmaceutical agent 112 is released from the administration form at a second time that is relative to the time of release of the first pharmaceutical agent 112. Accordingly, in some embodiments, two or more incompatible pharmaceutical agents 112 may be administered to an individual 108 at the same time without adverse consequences by providing for release of the incompatible pharmaceutical agents 112 at different times such that they do not contraindicate each other. In some embodiments, two or more pharmaceutical agents 112 that act synergistically may be coadministered to an individual 108 such that they are released at substantially the same time to provide for synergistic action of the two or more pharmaceutical agents 112 with regard to the individual 108. In some embodiments, dosages of the two or more pharmaceutical agents 112 may be altered in a relative manner. For example, in some embodiments, the dosage of two or more pharmaceutical agents 112 may be calibrated relative to time of day. In other embodiments, the dosage of two or more pharmaceutical agents 112 may be calibrated relative to hormonal cycles. In other embodiments, the dosage of two or more pharmaceutical agents 112 may be calibrated relative to circadian rhythms. Substantially any combination of pharmaceutical agents, dosages and release times may be selected relative to a time, event and/or the like.

At operation 1210, the selecting operation 1020 may include circuitry for selecting at least one of the two or more pharmaceutical agents 112 in response to two or more times of administration within a time period. In some embodiments, one or more selecting units 110 may include circuitry for selecting at least one of the two or more pharmaceutical agents 112 in response to two or more times of administration within a time period. In some embodiments, a time period is defined as being a discrete amount of time. For example, in some embodiments, a time period may be defined in seconds, minutes, hours, days, months, years and substantially any combination thereof. In some embodiments, a time period may be defined as being an amount of time that is relative to a measurable quantity and/or event. For example, in some embodiments, a time period may be determined based on the concentration of a pharmaceutical agent 112 that was previously administered to an individual 108. Accordingly, in some embodiments, a first pharmaceutical agent 112 may be administered to an individual 108 and a second pharmaceutical agent 112 may be administered to the same individual 108 when the concentration of the first pharmaceutical agent 112 associated with the individual 108 either reaches a certain level or decreases to a certain level. Numerous combinations of discrete and/or relative amounts of time may be used during the selection of at least one of two or more pharmaceutical agents 112. In some embodiments, at least one of the two or more pharmaceutical agents 112 may be selected based on the identity of a second pharmaceutical agent 112 that is to be administered to an individual 108 within a time period in which the first pharmaceutical agent 112 is still present and/or functionally active in association with an individual 108. For example, in some embodiments, a first pharmaceutical agent 112 is selected such that it does not contraindicate a second pharmaceutical agent 112 that is to be administered to the individual 108 within a time period when the first and second pharmaceutical agents 112 are both present and/or functionally active in association with the individual 108. In some embodiments, the second pharmaceutical agent 112 is selected such that it does not contraindicate a first pharmaceutical agent 112 that is present and/or functionally active in association with the individual 108. In some embodiments, a first pharmaceutical agent 112 is selected such that it will act in a synergistic manner with a second pharmaceutical agent 112 that is to be administered to the individual 108 within a time period when the first and second pharmaceutical agents 112 are both present and/or functionally active in association with the individual 108. In some embodiments, the second pharmaceutical agent 112 is selected such that it will act in a synergistic manner with a first pharmaceutical agent 112 that is present and/or functionally active in association with the individual 108.

FIG. 13 illustrates alternative embodiments of the example operational flow 1000 of FIG. 10. FIG. 13 illustrates example embodiments where the circuitry for selecting operation 1020 may include at least one additional operation. Additional operations may include an operation 1302, operation 1304, operation 1306, operation 1308, and/or operation 1310.

At operation 1302, the selecting operation 1020 may include circuitry for selecting at least one of the two or more pharmaceutical agents 112 in response to one or more sites of administration associated with the individual 108. In some embodiments, one or more selecting units 110 may include circuitry for selecting at least one of the two or more pharmaceutical agents 112 in response to one or more sites of administration associated with the individual 108. One or more pharmaceutical agents 112 may be administered at numerous sites associated with an individual 108. Examples of such sites include, but are not limited to, the eyes, ears, nose, skin, mouth, stomach, intestine, rectum, vagina, vascular system, pulmonary system, gastrointestinal system, urinary system and lymphatic system. In some embodiments, one or more pharmaceutical agents 112 may be administered at a first site associated with an individual 108 in preference to a second site associated with an individual 108. For example, in some embodiments, it may be desirable to administer a pharmaceutical agent 112 that is acid labile by injection into the vascular system in preference to oral administration which may expose the pharmaceutical agent 112 to acidic conditions. Accordingly, in some embodiments, one or more pharmaceutical agents 112 may be selected based on the physical and chemical characteristics of the one or more pharmaceutical agents 112 and where the one or more pharmaceutical agents 112 will be administered to an individual 108. In some embodiments, one or more pharmaceutical agents 112 may be selected in response to the site of action of the one or more pharmaceutical agents 112 on an individual 108. For example, in some embodiments, an adhesive patch may be used to administer one or more pharmaceutical agents 112 for the treatment of a malady associated with the skin. In some embodiments, one or more first pharmaceutical agents 112 may be selected for administration to a first site associated with an individual 108 and one or more second pharmaceutical agents 112 may be selected such that the second pharmaceutical agents 112 facilitate administration of the first pharmaceutical agents 112, do not contraindicate the first pharmaceutical agents 112, act synergistically with the first pharmaceutical agents 112, are administered to a second site associated with the individual 108, and/or substantially any combination thereof.

At operation 1304, the selecting operation 1020 may include circuitry for selecting at least one of the two or more pharmaceutical agents 112 in response to one or more sites of release associated with the individual 108. In some embodiments, one or more selecting units 110 may include circuitry for selecting at least one of the two or more pharmaceutical agents 112 in response to one or more sites of release associated with the individual 108. In some embodiments, one or more pharmaceutical agents 112 may be administered to an individual 108 at a first site and then released from the administration form in which the pharmaceutical agents 112 were administered at a second site associated with the individual 108. For example, in some embodiments, one or more pharmaceutical agents 112 may be administered to an individual 108 in an oral administration form which can be released in the small intestine of the individual 108. In examples of other embodiments, one or more pharmaceutical agents 112 may be released into the vascular system of an individual 108 following transdermal administration of the one or more pharmaceutical agents 112 to the individual 108. In some embodiments, two or more pharmaceutical agents 112 may be coadministered to an individual 108 such that they are released from their administration forms at two or more separate sites associated with the individual 108. For example, in some embodiments, a first and second pharmaceutical agent 112 may be coadministered to an individual 108 such that the first pharmaceutical agent 112 is substantially released from the administration form in the upper gastrointestinal tract and the second pharmaceutical agent 112 is substantially released from the administration form in the lower gastrointestinal tract. Accordingly, in some embodiments, two or more pharmaceutical agents 112 that are incompatible or that would contraindicate each may be coadministered to an individual 108 for release at different sites associated with the individual 108 and/or at different times.

At operation 1306, the selecting operation 1020 may include circuitry for selecting at least one of the two or more pharmaceutical agents 112 in response to one or more physiological characteristics associated with the individual 108. In some embodiments, one or more selecting units 110 may include circuitry for selecting at least one of the two or more pharmaceutical agents 112 in response to one or more physiological characteristics associated with the individual 108. Numerous physiological characteristics may be associated with an individual 108. Examples of such characteristics include, but are not limited to, age, gender, disease state, allergic responses, activity-related metabolic rate, resting metabolic rate, liver function, kidney function, weight, body fat percentage, epithelial cell function, lung function, skin function, gastrointestinal tract function, and substantially any combination thereof. Methods to predict drug response and to assess and correlate metabolism to drug dosage are known (i.e., International Publication Numbers: WO 03/084395 and WO 2005/041105; U.S. Pat. Nos. 6,317,719 and 6,087,090, herein incorporated by reference). Numerous assays may be used to assess the ability of an individual 108 to metabolize one or more pharmaceutical agents 112. In some embodiments, enzyme activities may be assessed to determine the ability of an individual 108 to metabolize one or more pharmaceutical agents 112. Examples of such enzyme systems and activities that may be assessed include, but are not limited to, the cytochrome P450 monooxygenase system, the flavin-containing monooxygenase system, alcohol dehydrogenase, aldehyde dehydrogenase, monoamine oxidase, cooxidation by peroxidases, NADPH-cytochrome P450 reductase, the presence of reduced (ferrous) cytochrome P450, esterases, amidases, epoxide hydrolase glutathione S-transferases, mercapturic acid biosynthesis, UDP-Glucoron(os)yltransferases, N-Acetyltransferases, amino acid N-acyl transferases and sulfotransferases. In some embodiments, first and second pharmaceutical agents 112 may be effective to treat the same condition associated with an individual 108. However, an individual 108 may be able to metabolize the first pharmaceutical agent 112 very quickly but metabolize a second pharmaceutical agent 112 more slowly. Accordingly, in some embodiments, the second pharmaceutical agent 112 may be selected for administration to the individual 108 to avoid higher relative metabolism of the first pharmaceutical agent 112 by the individual 108. In some embodiments, an individual 108 may mount an adverse allergic response to one or more pharmaceutical agents 112. Accordingly, one or more pharmaceutical agents 112 may be selected to avoid or minimize allergic response to administration of the one or more pharmaceutical agents 112 to the individual 108. One or more pharmaceutical agents, and combinations of one or more pharmaceutical agents, may be selected in response to numerous physiological characteristics associated with an individual 108.

At operation 1308, the selecting operation 1020 may include circuitry for selecting the two or more pharmaceutical agents 112 in response to cost associated with at least one of the two or more pharmaceutical agents 112. In some embodiments, one or more selecting units 110 may include circuitry for selecting the two or more pharmaceutical agents 112 in response to cost associated with at least one of the two or more pharmaceutical agents 112. In some embodiments, two or more different pharmaceutical agents 112 may be used to treat the same or a similar condition associated with an individual 108. In some embodiments, it may be preferable to select a first pharmaceutical agent 112 having a lower associated cost over a second pharmaceutical agent 112 having a higher associated cost for administration to an individual 108. In other embodiments, it may be preferable to select a first pharmaceutical agent 112 having a higher associated cost over a second pharmaceutical agent 112 having a lower associated cost for administration to an individual 108. In some embodiments, one or more pharmaceutical agents 112 may be selected in response to cost associated with the one or more pharmaceutical agents 112 and numerous additional considerations. Such additional considerations include, but are not limited to, allergic response, dosage, effectiveness, interaction with other pharmaceutical agents 112 and substantially any combination thereof.

At operation 1310, the selecting operation 1020 may include circuitry for selecting at least one of the two or more pharmaceutical agents 112 in response to compatibility of at least one of the pharmaceutical agents 112 with another of the two or more pharmaceutical agents 112. In some embodiments, one or more selecting units 110 may include circuitry for selecting at least one of the two or more pharmaceutical agents 112 in response to compatibility of at least one of the pharmaceutical agents 112 with another of the two or more pharmaceutical agents 112. In some embodiments, at least one of the pharmaceutical agents 112 is selected that does not interact with another of the two or more pharmaceutical agents 112. In some embodiments, at least one of the pharmaceutical agents 112 is selected to act in a synergistic manner with another of the two or more pharmaceutical agents 112. In some embodiments, at least one of the pharmaceutical agents 112 is selected to not contraindicate at least one of the two or more pharmaceutical agents 112.

Figure 14:
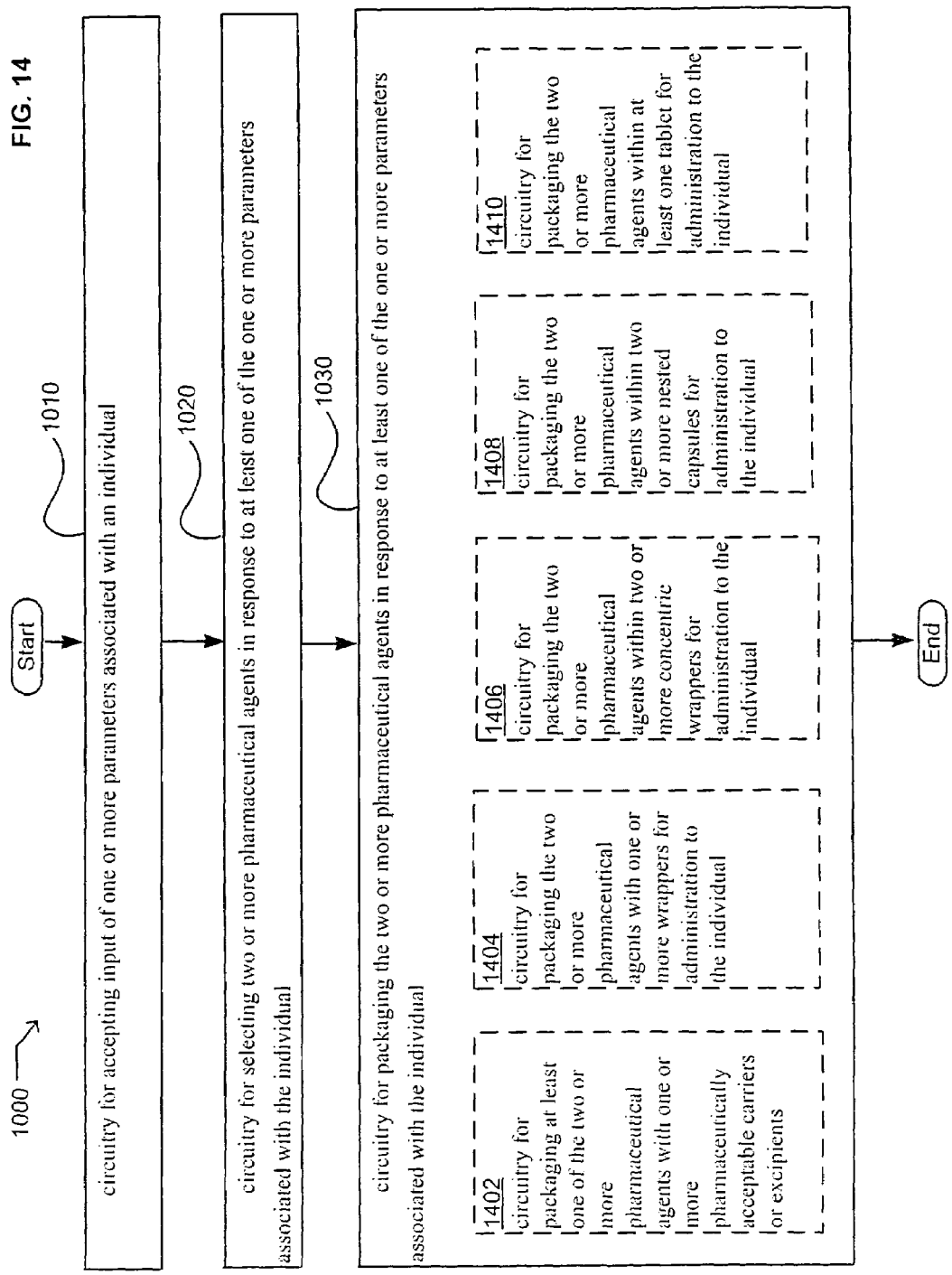
FIG. 14 illustrates alternative embodiments of the example operation flow of FIG. 10.

FIG. 14 illustrates alternative embodiments of the example operational flow 1000 of FIG. 10. FIG. 14 illustrates example embodiments where the circuitry for packaging operation 1030 may include at least one additional operation. Additional operations may include an operation 1402, operation 1404, operation 1406, operation 1408 and/or operation 1410.

At operation 1402, the packaging operation 1030 may include circuitry for packaging at least one of the two or more pharmaceutical agents 112 with one or more pharmaceutically acceptable carriers or excipients. In some embodiments, one or more packaging units 114 may include circuitry for packaging at least one of the two or more pharmaceutical agents 112 with one or more pharmaceutically acceptable carriers or excipients.

Pharmaceutical agents 112 may be packaged through use of numerous known methods, such as conventional mixing, dissolving, granulating, dragee-making, levigating, emulsifying, encapsulating, entrapping or lyophilizing processes. In some embodiments, the pharmaceutical agents 112 may be packaged in a manner that depends on the route that the pharmaceutical agents 112 are to be administered to an individual 108.

In some embodiments, one or more pharmaceutical agents 112 may be packaged with one or more solid or gel phase carriers or excipients. Examples of such carriers or excipients include, but are not limited to, croscarmellose sodium, povidone, microcrystalline cellulose, calcium carbonate, calcium phosphate, various sugars, starches, cellulose derivatives, gelatin, pregelatinized starch, polymers such as polyethylene glycols, lactose, lactose monohydrate, sucrose, talc, gelatin, agar, pectin, acacia, magnesium stearate, stearic acid and substantially any combination thereof. If a solid carrier is used, the one or more pharmaceutical agents 112 may be tableted, placed in a hard gelatin capsule in powder or pellet form, packaged in the form of a troche or lozenge, and the like.

In some embodiments, one or more pharmaceutical agents 112 may be packaged with a liquid carrier or excipient. Examples of such liquid carriers include syrup, peanut oil, olive oil, water, physiologically compatible buffers (i.e., Hanks solution and Ringers solution), physiological saline buffer, and the like. If a liquid carrier is used, the administration form may be in the form of a syrup, emulsion, drop, soft gelatin capsule, sterile injectable solution, suspension in an ampoule or vial, non-aqueous liquid suspension, and the like.

One or more pharmaceutical agents 112 may be packaged in stable water-soluble dosage forms. For example, in some embodiments, a pharmaceutically acceptable salt of one or more pharmaceutical agents 112 may be dissolved in an aqueous solution of an organic or inorganic acid, such as 0.3M solution of succinic acid or citric acid. If a soluble salt form is not available, a pharmaceutical agent 112 may be dissolved in a suitable cosolvent or combination of cosolvents. Examples of suitable cosolvents include, but are not limited to, alcohol, propylene glycol, polyethylene glycol 300, polysorbate 80, glycerin and the like in concentrations ranging from 0-60% of the total volume. In some embodiments, one or more pharmaceutical agents 112 may be dissolved in DMSO and diluted with water. The administration form may also be in the form of a solution of a salt form of one or more pharmaceutical agents 112 in an appropriate aqueous vehicle such as water or isotonic saline or dextrose solution.

In some embodiments, pharmaceutical agents 112 that are hydrophobic may be packaged through use of a cosolvent system comprising benzyl alcohol, a nonpolar surfactant, a water-miscible organic polymer, and an aqueous phase. The cosolvent system may be the VPD co-solvent system. VPD is a solution of 3 percent weight/volume benzyl alcohol, 8 percent weight/volume of the nonpolar surfactant polysorbate 80, and 65 percent weight/volume polyethylene glycol 300, made up to volume in absolute ethanol. The VPD co-solvent system (VPD:5W) consists of VPD diluted 1:1 with a 5 percent dextrose in water solution. This co-solvent system dissolves hydrophobic pharmaceutical agents 112 well, and itself produces low toxicity upon systemic administration. The proportions of a co-solvent system may be varied considerably without destroying its solubility and toxicity characteristics. Furthermore, the identity of the co-solvent components may be varied: for example, other low-toxicity nonpolar surfactants may be used instead of polysorbate 80; the fraction size of polyethylene glycol may be varied; other biocompatible polymers may replace polyethylene glycol (i.e., polyvinyl pyrrolidone; and other sugars or polysaccharides may substitute for dextrose). Many other delivery systems may be used to administer hydrophobic pharmaceutical agents 112 as well. For example, liposomes and emulsions are well known examples of delivery vehicles or carriers for hydrophobic drugs. Certain organic solvents such as dimethysulfoxide also may be employed, although usually at the cost of greater toxicity.

Some pharmaceutical agents 112 may be packaged as salts with pharmaceutically compatible counter ions. Pharmaceutically compatible salts may be formed with many acids, including hydrochloric, sulfuric, acetic, lactic, tartaric, malic, succinic, etc. Salts of pharmaceutical agents 112 tend to be more soluble in aqueous or other protonic solvents than are the corresponding free-base forms.

Numerous carriers and excipients are known and are commercially available (i.e., The Merck Index, 13$^{th}$ Edition, An Encyclopedia of Chemicals, Drugs, and Biologicals, Merck & Co. Inc., Whitehouse Station, N.J. 2001; Mosby's Drug Guide, Mosby, Inc., St. Louis, Mo. 2004; Remington: The Science and Practice of Pharmacy, 20$^{th}$ Edition, Lippincott Williams & Wilkins, Philadelphia, Pa. 2000; Physicians' Desk Reference, 58$^{th}$ Edition, Thompson, PDR, Montvale, N.J. 2004; U.S. Pat. Nos. 6,773,721; 7,053,107; 7,049,312 and Published U.S. Patent Application No. 20040224916; herein incorporated by reference).

At operation 1404, the packaging operation 1030 may include circuitry for packaging the two or more pharmaceutical agents 112 with one or more wrappers for administration to the individual 108. In some embodiments, one or more packaging units 114 may include circuitry for packaging the two or more pharmaceutical agents 112 with one or more wrappers for administration to the individual 108. In some embodiments, two or more pharmaceutical agents 112 may be packaged by wrapping the two or more pharmaceutical agents 112 into a single administration form for administration to an individual 108. In some embodiments, the two or more pharmaceutical agents 112 may be preformulated prior to being wrapped in one or more wrappers. For example, two or more pharmaceutical agents 112 that are in prescription form may be wrapped into a single administration form. In other embodiments, the two or more pharmaceutical agents 112 may be combined together and then wrapped in one or more wrappers. In other embodiments, two or more pharmaceutical agents 112 may be combined together with a suitable carrier and then wrapped in one or more wrappers. Numerous materials may be used to wrap the two or more pharmaceutical agents 112. Examples of such materials include, but are not limited to, polymers that include esters of cellulose and its derivatives (cellulose acetate phthalate, hydroxypropyl methylcellulose phthalate, hydroxypropyl methylcellulose acetate succinate), polyvinyl acetate phthalate, pH-sensitive methacrylic acid-methamethacrylate copolymers, shellac, and the like. Numerous water insoluble polymers may be used that include cellulose derivatives (i.e., ethylcellulose), polyvinyl acetate, neutral copolymers based on ethyl acrylate and methylmethacrylate, copolymers of acrylic and methacrylic acid esters with quaternary ammonium groups, and the like. In some embodiments, polymers used in forming the wrappers may be plasticized. Examples of plasticizers that may be used to plasticize the wrappers include, but are not limited to, triacetin, tributyl citrate, triethyl citrate, acetyl tri-n-butyl citrate diethyl phthalate, castor oil, dibutyl sebacate, acetylated monoglycerides, and the like and/or substantially any combination thereof. In some embodiments, the plasticizer may be present at about 3 to 30 weight percent and more typically about 10 to 25 weight percent based on the polymer to which the plasticizer is added. The type of plasticizer and its content depends on the polymer or polymers, nature of the coating system. In some embodiments, water-soluble nonionic polysaccharide derivatives may be used to wrap one or more pharmaceutical agents 112. For example, hydroxypropylmethylcellulose, hydroxypropylcellulose, and/or sodium carboxymethylcellulose may be used. Such polymers form coatings that quickly dissolve in water and have a high permeability. Accordingly, in some embodiments, such polymers may be used for rapid release of one or more pharmaceutical agents 112 that are wrapped in such a wrapper following administration to an individual 108. In some embodiments, one or more pharmaceutical agents 112 may be wrapped in a wrapper that provides for sustained release of the one or more pharmaceutical agents 112. For example, one or more pharmaceutical agents 112 may be released continuously over twelve hours through use of wrappers constructed from ethyl cellulose and an ethyl acrylate-methyl methacrylate-ethyl trimethylammoniumchloride methacrylate copolymer as the release controlling wrapper. Methods and materials that may be used to prepare wrappers are known in the art and are commercially available (i.e., Rohm Pharma, Piscataway, N.J.; U.S. Pat. Nos. 6,656,507; 7,048,945; 7,056,951; hereby incorporated by reference).

In some embodiments, one wrapper may be used to wrap two or more pharmaceutical agents 112 into an administration form. For example, the two or more pharmaceutical agents 112 may be combined together and then wrapped into an administration form in one wrapper for release at the same time following administration to an individual 108. In other embodiments, one continuous wrapper may be used to wrap the two or more pharmaceutical agents 112 into an administration form in which the two or more pharmaceutical agents 112 are separated from each other. For example, in some embodiments, one of the two or more pharmaceutical agents 112 may be covered with a continuous wrapper to form a core and then a second pharmaceutical agent 112 may be wrapped around the core with the continuous wrapper to form an administration form. This process may be repeated with multiple pharmaceutical agents 112 to form a multilayered administration form in which the multiple pharmaceutical agents 112 are separated from each other. In some embodiments, such a configuration provides for the release of pharmaceutical agents 112 from the administration form at different times and/or at different sites associated with an individual 108 to which the administration form is administered. In some embodiments, two or more pharmaceutical agents 112 are wrapped into an administration form together and additional pharmaceutical agents 112 are wrapped into the administration form in separate layers. Accordingly, pharmaceutical agents 112 may be oriented in the administration form to be released from the administration form at the same time and/or site or such that they are released at different times and/or sites. Examples of such sites include, but are not limited to, the mouth, esophagus, stomach, duodenum, small intestine, large intestine, and the rectum.

At operation 1406, the packaging operation 1030 may include circuitry for packaging the two or more pharmaceutical agents 112 within two or more concentric wrappers for administration to the individual 108. In some embodiments, one or more packaging units 114 may include circuitry for packaging the two or more pharmaceutical agents 112 within two or more concentric wrappers for administration to the individual 108. In some embodiments, two or more pharmaceutical agents 112 may be packaged by wrapping the two or more pharmaceutical agents 112 within two or more wrappers to form an administration form. In some embodiments, the same type of material is used to form the two or more wrappers in the administration form. In some embodiments, different types of material are used as wrappers to form the administration form. For example, an outer wrapper may be selected to dissolve rapidly and release one or more pharmaceutical agents 112 soon after administration of the administration form to the individual 108 while an inner wrapper may be selected to release one or more pharmaceutical agents 112 at a later time and/or at a different site associated with an individual 108. Accordingly, in some embodiments, multiple pharmaceutical agents 112 may be packaged into the same administration form for release at different times and at different sites following administration of the administration form to an individual 108. In some embodiments, the pharmaceutical agents 112 may be the same to provide for continuous dosing of an individual 108. In some embodiments, the pharmaceutical agents 112 may be different to provide for dosing of an individual 108 with different pharmaceutical agents 112. In some embodiments, some of the pharmaceutical agents 112 may be the same to provide for continuous dosing of an individual 108 and others may be different to provide for dosing of an individual 108 with different pharmaceutical agents 112. Accordingly, numerous combinations of pharmaceutical agents 112 and wrappers may be assembled into an administration form.

At operation 1408, the packaging operation 1030 may include circuitry for packaging the two or more pharmaceutical agents 112 within two or more nested capsules for administration to the individual 108. In some embodiments, one or more packaging units 114 may include circuitry for packaging the two or more pharmaceutical agents 112 within two or more nested capsules for administration to the individual 108. In some embodiments, two or more pharmaceutical agents 112 may be packaged into an administration form through use of nested capsules. In some embodiments, a first pharmaceutical agent 112 may be packaged in a first capsule and a second pharmaceutical agent 112 may be packaged in a second capsule in which the first capsule is included to create an administration form having nested capsules. Accordingly, administration forms may be constructed that include two or more nested capsules. In some embodiments, such administration forms may include two or more pharmaceutical agents 112. In other embodiments, such administration forms may include one type of pharmaceutical agent 112 that is contained within multiple capsules of the administration form and one or more types of different pharmaceutical agents 112 that are also contained within the capsules included within the administration form. In some embodiments, the material used to construct the individual capsules of a single administration form is the same. In some embodiments, the material used to construct the individual capsules of a single administration form is different. In some embodiments, the material used to construct some of the individual capsules of a single administration form may be the same while the material used to construct other individual capsules of the single administration form may be different. Accordingly, through selection of materials used to construct the individual capsules contained in an administration form, two or more pharmaceutical agents 112 may be released from one administration form at one or more times and/or at one or more sites associated with the individual 108. For example, as with wrapping materials described herein, materials may be selected for constructing capsules that release one or more pharmaceutical agents 112 at a site associated with an individual 108. Examples of such sites include, but are not limited to, the mouth, esophagus, stomach, duodenum, small intestine, large intestine, and the rectum.

At operation 1410, the packaging operation 1030 may include circuitry for packaging the two or more pharmaceutical agents 112 within at least one tablet for administration to the individual 108. In some embodiments, one or more packaging units 114 may include circuitry for packaging the two or more pharmaceutical agents 112 within at least one tablet for administration to the individual 108. In some embodiments, two or more pharmaceutical agents 112 may be selected in response to one or more parameters 106 associated with an individual 108 and packaged into at least one table. Methods to package two or more pharmaceutical agents 112 into at least one tablet for administration to an individual 108 are known (i.e., Published U.S. Patent Application Nos. 20040224916 and 20050013863; and U.S. Pat. Nos. 5,490, 962; 6,280,771; herein incorporated by reference). Accordingly, in some embodiments, two or more pharmaceutical agents 112 may be packaged into a tablet such that the two or more pharmaceutical agents 112 are released at the same or different times following administration of the tablet to an individual 108. In other embodiments, two or more pharmaceutical agents 112 may be packaged into a tablet such that the two or more pharmaceutical agents 112 are released at the same or different sites associated with an individual 108 following administration of the tablet to an individual 108. In other embodiments, two or more pharmaceutical agents 112 may be packaged into a tablet such that the two or more pharmaceutical agents 112 are released at the same or different times and at the same or different sites associated with an individual 108 following administration of the tablet to the individual 108.

Figure 15:
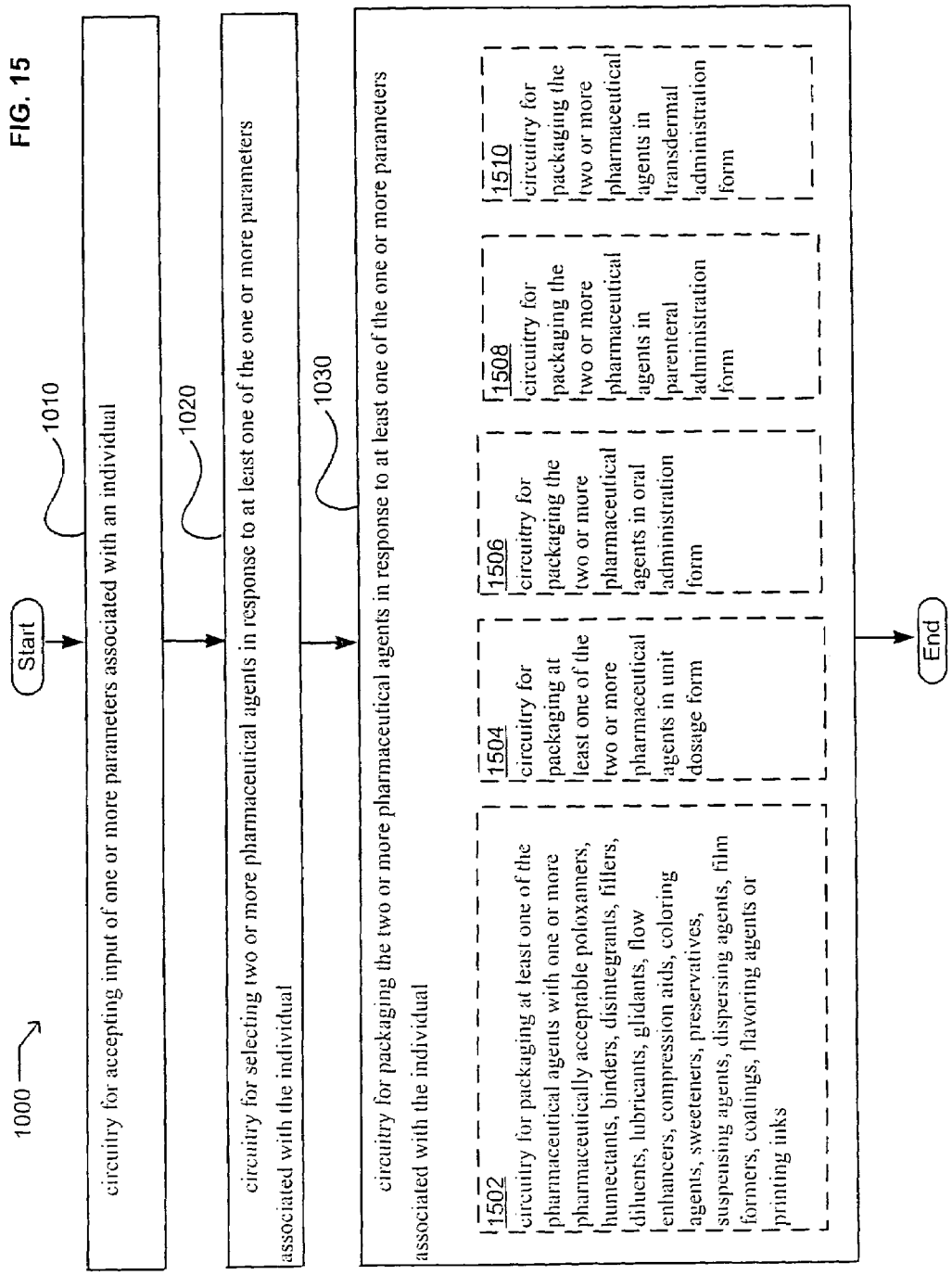
FIG. 15 illustrates alternative embodiments of the example operation flow of FIG. 10.

FIG. 15 illustrates alternative embodiments of the example operational flow 1000 of FIG. 10. FIG. 15 illustrates example embodiments where the circuitry for packaging operation 1030 may include at least one additional operation. Additional operations may include an operation 1502, operation 1504, operation 1506, operation 1508 and/or operation 1510.

At operation 1502, the packaging operation 1030 may include circuitry for packaging at least one of the pharmaceutical agents 112 with one or more pharmaceutically acceptable poloxamers, humectants, binders, disintegrants, fillers, diluents, lubricants, glidants, flow enhancers, compression aids, coloring agents, sweeteners, preservatives, suspending agents, dispersing agents, film formers, coatings, flavoring agents or printing inks. In some embodiments, one or more packaging units 114 may include circuitry for packaging at least one of the pharmaceutical agents 112 with one or more pharmaceutically acceptable poloxamers, humectants, binders, disintegrants, fillers, diluents, lubricants, glidants, flow enhancers, compression aids, coloring agents, sweeteners, preservatives, suspending agents, dispersing agents, film formers, coatings, flavoring agents or printing inks.

At operation 1504, the packaging operation 1030 may include circuitry for packaging at least one of the two or more pharmaceutical agents 112 in unit dosage form. In some embodiments, one or more packaging units 114 may include circuitry for packaging at least one of the two or more pharmaceutical agents 112 in unit dosage form.

The term "unit dosage form" refers to one or more amounts of one or more pharmaceutical agents 112 that are suitable as unitary dosages for individuals, such as human and non-human individuals, with each unit containing a predetermined quantity of at least one pharmaceutical agent 112 calculated to produce a desired effect, such as a therapeutic effect, in association with one or more suitable pharmaceutical carriers. Such unit dosage forms may be packaged in numerous configurations that include, but are not limited to, tablets, capsules, ampoules, and other administration forms known in the art and described herein. In some embodiments, two or more unit dosage forms of one or more pharmaceutical agents 112 may be packaged into an administration form. For example, in some embodiments, two unit dosage forms may be wrapped into an administration form through use of a continuous wrapper such that they are released at different times following administration to an individual 108. In such an example, two unit dosage forms are included within one administration form. Accordingly, numerous combinations of pharmaceutical agents 112 and unit dosage forms may be included within an administration form.

At operation 1506, the packaging operation 1030 may include circuitry for packaging the two or more pharmaceutical agents 112 in oral administration form. In some embodiments, one or more packaging units 114 may include circuitry for packaging the two or more pharmaceutical agents 112 in oral administration form.

For oral administration, one or more pharmaceutical agents 112 may be packaged into an oral administration form by combining the one or more pharmaceutical agents 112 with pharmaceutically acceptable carriers that are well known in the art. Such carriers allow the one or more pharmaceutical agents 112 to be formulated as tablets, pills, dragees, capsules, liquids, gels, syrups, slurries, suspensions and the like, for oral ingestion by an individual 108. Oral administration forms can be obtained by combining the one or more pharmaceutical agents 112 with a solid excipient, optionally grinding the resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethylcellulose, and/or polyvinylpyrrolidone. If desired, disintegrating agents may be added, such as the cross-linked polyvinyl pyrrolidone, agar, or alginic acid or a salt thereof such as sodium alginate.

Dragee cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or dragee coatings for identification or to characterize different combinations of pharmaceutical agents 112.

Oral administration forms may include push-fit capsules made of gelatin, as well as soft, sealed capsules made of gelatin and a plasticizer, such as glycerol or sorbitol. The push-fit capsules can contain one or more pharmaceutical agents 112 in admixture with a filler such as lactose, binders such as starches, and/or lubricants such as talc or magnesium stearate and, optionally, stabilizers. In soft capsules, the pharmaceutical agents 112 may be dissolved or suspended in suitable liquids, such as fatty oils, liquid paraffin, or liquid polyethylene glycols. In addition, stabilizers may be added. All oral dosage forms may be prepared in dosages suitable for such administration. For buccal administration, the pharmaceutical agents 112 may take the form of tablets or lozenges formulated in a conventional manner.

At operation 1508, the packaging operation 1030 may include circuitry for packaging the two or more pharmaceutical agents 112 in parenteral administration form. In some embodiments, one or more packaging units 114 may include circuitry for packaging the two or more pharmaceutical agents 112 in parenteral administration form.

The one or more pharmaceutical agents 112 may be formulated for parenteral administration by injection (i.e., bolus injection or continuous infusion). Formulations for injection may be presented in unit dosage form (i.e., in ampoules or in multi-dose containers) with an added preservative. The administration forms may take such forms as suspensions, solutions or emulsions in oily or aqueous vehicles, and may contain formulatory agents such as suspending, stabilizing and/or dispersing agents. Administration forms for parenteral administration may include aqueous solutions of the one or more pharmaceutical agents 112 in water-soluble form. In some embodiments, the one or more pharmaceutical agents 112 may be formulated in physiologically compatible buffers that include Hanks solution. Ringers solution, physiological saline buffer, and the like. Additionally, suspensions of the one or more pharmaceutical agents 112 may be prepared as appropriate oily injection suspensions. Suitable lipophilic solvents include fatty oils such as sesame oil, or synthetic fatty acid esters, such as ethyl oleate or triglycerides, or liposomes. Aqueous injection suspensions may include substances which increase the viscosity of the suspension, such as sodium carboxymethyl cellulose, sorbitol, or dextran. Optionally, the suspension may also contain suitable stabilizers or agents which increase the solubility of the one or more pharmaceutical agents 112 to allow for the preparation of highly concentrated solutions.

At operation 1510, the packaging operation 1030 may include circuitry for packaging the two or more pharmaceutical agents 112 in transdermal administration form. In some embodiments, one or more packaging units 114 may include circuitry for packaging the two or more pharmaceutical agents 112 in transdermal administration form. For transdermal, including transmucosal, administration of the one or more pharmaceutical agents 112, penetrants appropriate to the barrier or barriers to be permeated may be used in the formulation. Briefly, in some embodiments, a transdermal administration form may include an ethoxylated lipid, an alcohol mixed with the ethoxylated lipid to form a penetration enhancer, an aqueous adjuvant mixed with the penetration enhancer, and a delivered pharmaceutical agent 112 mixed with the aqueous adjuvant and the penetration enhancer. In some embodiments, the aqueous adjuvant is a plant extract from the family of Liliaceae Liliaceae. In some embodiments, the ethoxylated lipid is a vegetable oil or animal oil having at least 20 ethoxylations per molecule. In other embodiments, about 0.1 percent to 40.0 percent by weight or volume is ethoxylated lipid. Other embodiments may include a transdermal delivery system that includes about 0.1 percent to 15 percent by weight or volume of alcohol or where about 0.1 percent to 85 percent by weight or volume is Aloe Vera. Numerous transdermal administration forms are known and have been described (i.e., U.S. Pat. Nos. 5,820,876; 7,045, 145; 6,946,144; incorporated herein by reference).

Figure 16:
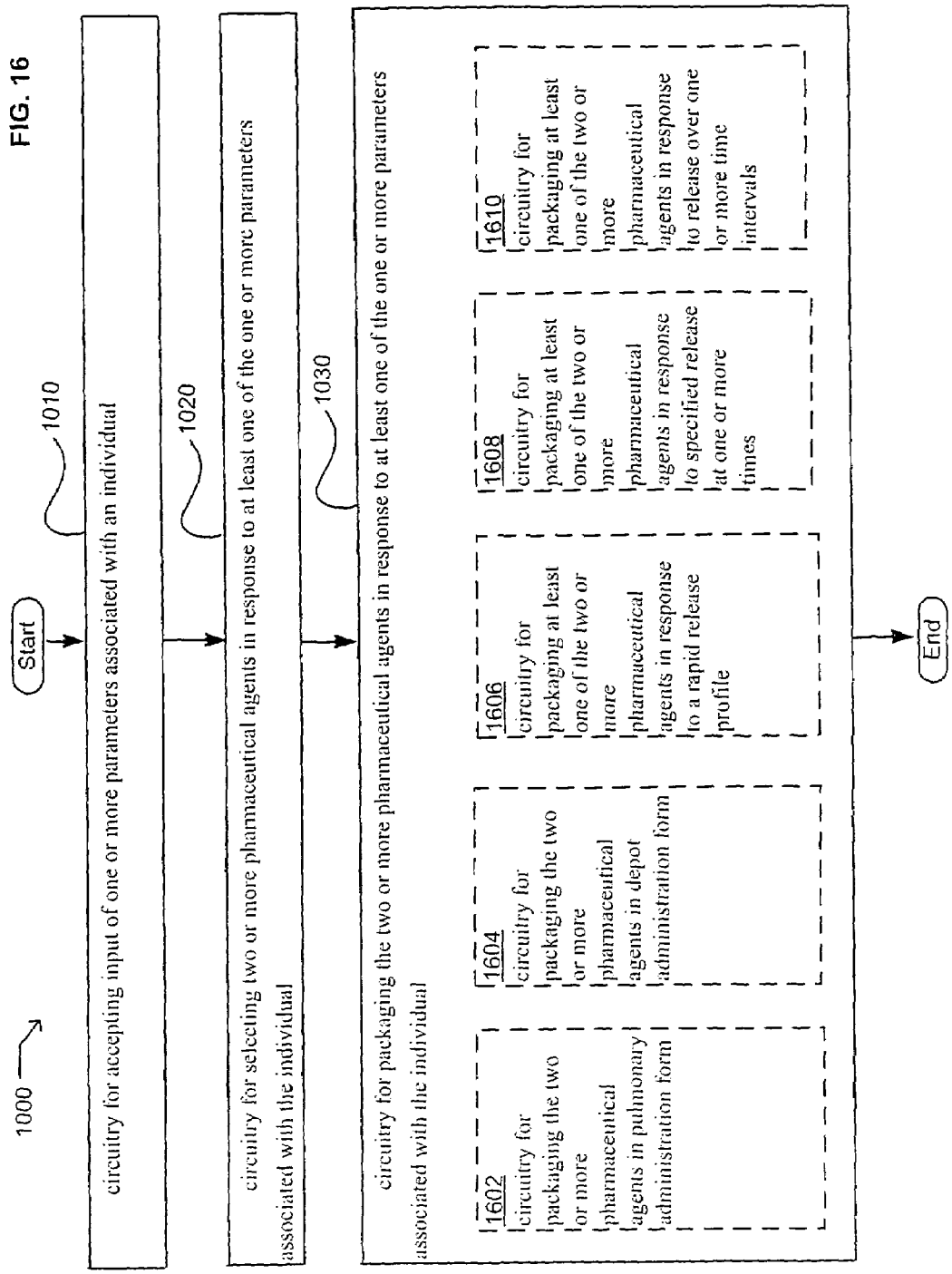
FIG. 16 illustrates alternative embodiments of the example operation flow of FIG. 10.

FIG. 16 illustrates alternative embodiments of the example operational flow 1000 of FIG. 10. FIG. 16 illustrates example embodiments where the circuitry for packaging operation 1030 may include at least one additional operation. Additional operations may include an operation 1602, operation 1604, operation 1606, operation 1608 and/or operation 1610.

At operation 1602, the packaging operation 1030 may include circuitry for packaging the two or more pharmaceutical agents 112 in pulmonary administration form. In some embodiments, one or more packaging units 114 may include circuitry for packaging the two or more pharmaceutical agents 112 in pulmonary administration form. For pulmonary administration, the one or more pharmaceutical agents 112 may be delivered in the form of an aerosol spray from pressurized packs or a nebuliser, with the use of a suitable propellant (i.e., dichlorodifluoromethane, trichlorofluoromethane, dichlorotetrafluoroethane, carbon dioxide or other suitable gas). In the case of a pressurized aerosol, the dosage unit may be determined by providing a valve to deliver a metered amount of the one or more pharmaceutical agents 112. Capsules and cartridges for use in an inhaler or insufflator may be formulated to contain a powder mix of the one or more pharmaceutical agents 112 and a suitable powder base such as lactose or starch. Methods and materials that may be used to package one or more pharmaceutical agents 112 in pulmonary administration form are known and have been described (i.e., U.S. Pat. Nos. 6,921,527; 6,838,0763; 6,565, 841; 6,451,286; 6,169,068; 5,993,783; 5,780,014; 5,719,123; 5,354,934; 5,284,656; 5,006,343; hereby incorporated by reference).

At operation 1604, the packaging operation 1030 may include circuitry for packaging the two or more pharmaceutical agents 112 in depot administration form. In some embodiments, one or more packaging units 114 may include circuitry for packaging the two or more pharmaceutical agents 112 in depot administration form. In some embodiments, depot administration forms may be administered by implantation (i.e., subcutaneously, intramuscularly, intramuscular injection, subtenon, intravitreal injection). Accordingly, for example, the one or more pharmaceutical agents 112 may be packaged with suitable polymeric or hydrophobic materials, ion exchange resins, and the like. Methods and materials that may be used to package pharmaceutical agents 112 in depot administration form are known and are commercially available (i.e., U.S. Pat. Nos. 6,773,714; 6,630,155; 6,565,874; 5,945,115; herein incorporated by reference).

At operation 1606, the packaging operation 1030 may include circuitry for packaging at least one of the two or more pharmaceutical agents 112 in response to a rapid release profile. In some embodiments, one or more packaging units 114 may include circuitry for packaging at least one of the two or more pharmaceutical agents 112 in response to a rapid release profile. In some embodiments, water-soluble non-ionic polysaccharide derivatives may be used to package one or more pharmaceutical agents 112. For example, hydroxypropylmethylcellulose, hydroxypropylcellulose, and/or sodium carboxymethylcellulose may be used. Such polymers form coatings that quickly dissolve in water and have a high permeability. Accordingly, in some embodiments, such polymers may be used for rapid release of one or more pharmaceutical agents 112 that are packaged in such materials following administration to an individual 108. Numerous rapid release formulations are known and have been described (i.e., U.S. Pat. No. 6,979,463; herein incorporated by reference).

At operation 1608, the packaging operation 1030 may include circuitry for packaging at least one of the two or more pharmaceutical agents 112 in response to specified release at one or more times. In some embodiments, one or more packaging units 114 may include circuitry for packaging at least one of the two or more pharmaceutical agents 112 in response to specified release at one or more times. In some embodiments, one or more pharmaceutical agents 112 may be packaged so that they are released from an administration form at one or more times following administration to an individual 108. In some embodiments, one or more pharmaceutical agents 112 may be released at one or more times following administration to maintain the dosage of the one or more pharmaceutical agents 112 at or above a certain concentration. Accordingly, in some embodiments, the concentration of one pharmaceutical agent 12 may be maintained over a period of time in association with an individual 108. In other embodiments, the concentration of more than one pharmaceutical agent 112 may be maintained over a period of time in association with an individual 108. In some embodiments, one or more pharmaceutical agents 112 may be packaged to be released in anticipation of an event, such as a long airplane flight. For example, in some embodiments, one or more pharmaceutical agents 112 that induce sleep may be packaged into an administration form so that an individual 108 to whom the administration form is administered will fall asleep at a pre-calculated time on an airplane during a long flight. In other embodiments, one or more pharmaceutical agents 112 may be packaged into an administration form such that an individual 108 to whom the administration form is administered will not fall asleep during a long meeting or presentation. For example, an administration form may be prepared with non-drowsy versions of one or more pharmaceutical agents 112. Numerous methods may be used to package one or more pharmaceutical agents 112 for release at one or more times. For example, in some embodiments, one or more pharmaceutical agents 112 may be wrapped into an administration form through methods described herein. In such examples, the time of release of the one or more pharmaceutical agents 112 from the administration form may be controlled through selection of wrappers used to formulate the administration form. For example, a thick wrapper may be used to delay release while a thin wrapper may be used to expedite release of the one or more pharmaceutical agents 112 from the administration form. In other embodiments, one or more wrappers may be selected that are made of material that is more or less resistant to degradation when administered to an individual 108. Accordingly, materials having various chemical and physical properties may be selected to produce administration forms that release one or more pharmaceutical agents 112 at one or more times.

At operation 1610, the packaging operation 1030 may include circuitry for packaging at least one of the two or more pharmaceutical agents 112 in response to release over one or more time intervals. In some embodiments, one or more packaging units 114 may include circuitry for packaging at least one of the two or more pharmaceutical agents 112 in response to release over one or more time intervals.

In some embodiments, one or more pharmaceutical agents 112 may be packaged so that they are released from an administration form over one or more time intervals following administration to an individual 108. In some embodiments, one or more pharmaceutical agents 112 may be released over one or more times following administration to maintain the dosage of the one or more pharmaceutical agents 112 at or above a certain concentration. Accordingly, in some embodiments, the concentration of one pharmaceutical agent 112 may be maintained over a period of time in association with an individual 108. In other embodiments, the concentration of more than one pharmaceutical agent 112 may be maintained over a period of time in association with an individual 108. In some embodiments, one or more pharmaceutical agents 112 may be packaged to be released over one or more time intervals in anticipation of an event, such as a long airplane flight, that may occur during the one or more time intervals. For example, in some embodiments, one or more pharmaceutical agents 112 that induce sleep may be packaged into an administration form so that they are released during the time interval in which an individual 108 to whom the administration form is administered is on an airplane. Numerous methods may be used to package one or more pharmaceutical agents 112 for release over one or more time intervals. For example, in some embodiments, one or more pharmaceutical agents 112 may be wrapped into an administration form through methods described herein. In such examples, the time of release of the one or more pharmaceutical agents 112 from the administration form may be controlled through selection of wrappers used to formulate the administration form. For example, a thick wrapper may be used to delay release while a thin wrapper may be used to expedite release of the one or more pharmaceutical agents 112 from the administration form. In other embodiments, one or more wrappers may be selected that are made of material that is more or less resistant to degradation when administered to an individual 108. In other embodiments, controlled-release formulations may be acquired and then packaged for release over one or more time intervals.

FIG. 17 illustrates alternative embodiments of the example operational flow 1000 of FIG. 10. FIG. 17 illustrates example embodiments where the circuitry for packaging operation 1030 may include at least one additional operation. Additional operations may include an operation 1702, operation 1704, operation 1706, operation 1708, and/or operation 1710.

At operation 1702, the packaging operation 1030 may include circuitry for packaging at least one of the two or more pharmaceutical agents 112 in response to release at one or more sites associated with an individual 108. In some embodiments, one or more packaging units 114 may include circuitry for packaging at least one of the two or more pharmaceutical agents 112 in response to release at one or more sites associated with an individual 108. One or more pharmaceutical agents 112 may be packaged for administration to numerous sites that are associated with an individual 108. Examples of such sites include, but are not limited to, the eyes, ears, nose, skin, mouth, stomach, intestine, rectum, vagina, vascular system, pulmonary system, gastrointestinal system, urinary system and lymphatic system. Accordingly, in some embodiments, release of one or more pharmaceutical agents 112 from an administration form at one or more sites associated with an individual 108 may be controlled through selection of materials that degrade under conditions present at the desired site of release. For example, for release in the stomach, one or more pharmaceutical agents 112 may be packaged into an administration form that degrades when exposed to acidic conditions. In other examples, one or more pharmaceutical agents 112 may be released in the gastrointestinal tract by preparing an administration form that is acid resistant but that degrades under basic conditions. Numerous methods are known that may be used to release one or more pharmaceutical agents 112 at one or more sites associated with an individual 108.

At operation 1704, the packaging operation 1030 may include circuitry for packaging at least one of the two or more pharmaceutical agents 112 in response to a sustained release profile. In some embodiments, one or more packaging units 114 may include circuitry for packaging at least one of the two or more pharmaceutical agents 112 in response to a sustained release profile. In some embodiments, one or more pharmaceutical agents 112 may be packaged with a carrier that may include a time-delay or time-release material known in the art, such as glyceryl monostearate or glyceryl distearate alone or with a wax, ethylcellulose, hydroxypropylmethylcellulose, methylmethacrylate and the like. Additionally, in some embodiments, one or more pharmaceutical agents 112 may be administered using a sustained-release system, such as semipermeable matrices of solid hydrophobic polymers containing the one or more pharmaceutical agents 112. Various sustained-release materials are known and have been described. For example, sustained-release capsules may, depending on their chemical composition, release one or more pharmaceutical agents 112 for a few weeks up to over 100 days. Numerous additional sustained-release formulations are known and have been described (i.e., U.S. Pat. Nos. 7,041,670; 7,041,317; 6,709,676; herein incorporated by reference).

At operation 1706, the packaging operation 1030 may include circuitry for packaging the two or more pharmaceutical agents 112 in storage material. In some embodiments, one or more packaging units 114 may include circuitry for packaging the two or more pharmaceutical agents 112 in storage material. Two or more pharmaceutical agents 112 may be packaged in numerous types of storage material. Examples of storage material include, but are not limited to, containers, boxes, ampoules, vials, syringes, and the like. In some embodiments, storage material includes advertising. In some embodiments, storage material includes instructions for administration. Such instructions may include time for administration, route of administration, the name of the individual 108 to whom the two or more pharmaceutical agents 112 are to be administered, the identity of the two or more pharmaceutical agents 112, the dosage of the two or more pharmaceutical agents 112, appropriate buffers for suspension of the two or more pharmaceutical agents 112, the source of the two or more pharmaceutical agents 112, the name of a physician or physicians who prescribed the two or more pharmaceutical agents 112, the date when the two or more pharmaceutical agents 112 were prescribed, the date when the two or more pharmaceutical agents 112 were packaged, the date when the two or more pharmaceutical agents 112 were manufactured, the expiration date of the two or more pharmaceutical agents 112, and the like.

At operation 1708, the packaging operation 1030 may include circuitry for labeling at least one of the two or more pharmaceutical agents 112. In some embodiments, one or more packaging units 114 may include circuitry for labeling at least one of the two or more pharmaceutical agents 112. In some embodiments, one or more packaging units 114 may place a label directly on at least one of the two or more pharmaceutical agents 112. Numerous methods may be used to label at least one of the two or more pharmaceutical agents 112. For example, in some embodiments, one or more packaging units 114 may stamp an indented label into at least one of the two or more pharmaceutical agents 112. In some embodiments, one or more packaging units 114 may stamp a label onto at least one of the two or more pharmaceutical agents 12 through use of one or more edible dyes. Such labels may include numerous types of information. For example, such labels may indicate the manufacturer of at least one of the two or more pharmaceutical agents 112, the date of manufacture, the date of packaging, the dosage, the route of administration, and the like. Such labels may be in any substantially any language. In some embodiments, at least one label may be a bar code.

At operation 1710, the packaging operation 1030 may include circuitry for labeling storage material containing the two or more pharmaceutical agents 112. In some embodiments, one or more packaging units 114 may include circuitry for labeling storage material containing the two or more pharmaceutical agents 112. In some embodiments, storage material may be labeled with advertising. In some embodiments, storage material may be labeled with instructions for administration. Such instructions may include time for administration, route of administration, the name of the individual 108 to whom the two or more pharmaceutical agents 112 are to be administered, the identity of the two or more pharmaceutical agents 112, the dosage of the two or more pharmaceutical agents 112, appropriate buffers for suspension of the two or more pharmaceutical agents 112, the source of the two or more pharmaceutical agents 112, the name of a physician or physicians who prescribed the two or more pharmaceutical agents 112, the date when the two or more pharmaceutical agents 112 were prescribed, the date when the two or more pharmaceutical agents 112 were packaged, the date when the two or more pharmaceutical agents 112 were manufactured, the expiration date of the two or more pharmaceutical agents 112, and the like.

FIG. 18 illustrates a partial view of a system 1800 that includes a computer program 1804 for executing a computer process on a computing device. An embodiment of the system 1800 is provided using a signal-bearing medium 1802 bearing at least one of one or more instructions for accepting input of one or more parameters associated with an individual, one or more instructions for selecting two or more pharmaceutical agents in response to at least one of the one or more parameters associated with the individual; and one or more instructions for packaging the two or more pharmaceutical agents in response to at least one of the one or more parameters associated with the individual. The one or more instructions may be, for example, computer executable and/or logic-implemented instructions. In some embodiments, the signal-bearing medium 1802 may include a computer-readable medium 1806. In some embodiments, the signal bearing medium 1802 may include a recordable medium 1808. In some embodiments, the signal bearing medium 1802 may include a communications medium 1810.

With respect to the use of substantially any plural and/or singular terms herein, those having skill in the an can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a voice-over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

Although user 120 is shown/described herein as a single illustrated figure, those skilled in the art will appreciate that a user 120 may be representative of a human user, a robotic user 120 (e.g., computational entity), and/or substantially any combination thereof (e.g., a user 120 may be assisted by one or more robotic agents). In addition, a user 120 as set forth herein, although shown as a single entity may in fact be composed of two or more entities. Those skilled in the art will appreciate that, in general, the same may be said of "sender" and/or other entity-oriented terms as such terms are used herein.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

All publications, patents and patent applications cited herein are incorporated herein by reference. The foregoing specification has been described in relation to certain embodiments thereof, and many details have been set forth for purposes of illustration, however, it will be apparent to those skilled in the art that the invention is susceptible to additional embodiments and that certain of the details described herein may be varied considerably without departing from the basic principles of the invention.

What is claimed is:

1. A system comprising:
    circuitry for accepting input of one or more parameters associated with an individual;
    circuitry for selecting two or more pharmaceutical agents in response to at least one of the one or more parameters associated with the individual; and
    circuitry for packaging the two or more pharmaceutical agents in response to at least one of the one or more parameters associated with the individual.

2. The system of claim 1, wherein the circuitry for accepting input of one or more parameters associated with an individual comprises:
    circuitry for accepting the one or more parameters associated with a physician input.

3. The system of claim 1, wherein the circuitry for accepting input of one or more parameters associated with an individual comprises:
    circuitry for accepting the one or more parameters associated with a pharmacist input.

4. The system of claim 1, wherein the circuitry for accepting input of one or more parameters associated with an individual comprises:
    circuitry for accepting the one or more parameters associated with a patient input.

5. The system of claim 1, wherein the circuitry for accepting input of one or more parameters associated with an individual comprises:
    circuitry for accepting the one or more parameters associated with a machine input.

6. The system of claim 1, wherein the circuitry for selecting two or more pharmaceutical agents in response to at least one of the one or more parameters associated with the individual comprises:
    circuitry for selecting at least one of the two or more pharmaceutical agents in response to at least one condition specifically associated with the individual.

7. The system of claim 1, wherein the circuitry for selecting two or more pharmaceutical agents in response to at least one of the one or more parameters associated with the individual comprises:
    circuitry for selecting at least one of the two or more pharmaceutical agents in response to at least one dosage specifically associated with the individual.

8. The system of claim 1, wherein the circuitry for selecting two or more pharmaceutical agents in response to at least one of the one or more parameters associated with the individual comprises:
    circuitry for selecting the two or more pharmaceutical agents in response to dosage of at least one of the two or more pharmaceutical agents.

9. The system of claim 1, wherein the circuitry for selecting two or more pharmaceutical agents in response to at least one of the one or more parameters associated with the individual comprises:
    circuitry for selecting at least one of the two or more pharmaceutical agents in response to at least one time of administration.

10. The system of claim 1, wherein the circuitry for selecting two or more pharmaceutical agents in response to at least one of the one or more parameters associated with the individual comprises:
    circuitry for selecting at least one of the two or more pharmaceutical agents in response to one or more sites of administration associated with the individual.

11. The system of claim 1, wherein the circuitry for selecting two or more pharmaceutical agents in response to at least one of the one or more parameters associated with the individual comprises:
    circuitry for selecting at least one of the two or more pharmaceutical agents in response to cost associated with at least one of the two or more pharmaceutical agents.

12. The system of claim 1, wherein the circuitry for selecting two or more pharmaceutical agents in response to at least one of the one or more parameters associated with the individual comprises:
    circuitry for selecting at least one of the two or more pharmaceutical agents in response to compatibility of at least one of the pharmaceutical agents with another of the two or more pharmaceutical agents.

13. The system of claim 1, wherein the circuitry for packaging the two or more pharmaceutical agents in response to at least one of the one or more parameters associated with the individual comprises:
    circuitry for packaging at least one of the two or more pharmaceutical agents with one or more pharmaceutically acceptable carriers or excipients.

14. The system of claim 1, wherein the circuitry for packaging the two or more pharmaceutical agents in response to at least one of the one or more parameters associated with the individual comprises:
    circuitry for packaging the two or more pharmaceutical agents with one or more wrappers for administration to the individual.

15. The system of claim 1, wherein the circuitry for packaging the two or more pharmaceutical agents in response to at least one of the one or more parameters associated with the individual comprises:
circuitry for packaging the two or more pharmaceutical agents within two or more nested capsules for administration to the individual.

16. The system of claim 1, wherein the circuitry for packaging the two or more pharmaceutical agents in response to at least one of the one or more parameters associated with the individual comprises:
circuitry for packaging the two or more pharmaceutical agents within at least one tablet for administration to the individual.

17. The system of claim 1, wherein the circuitry for packaging the two or more pharmaceutical agents in response to at least one of the one or more parameters associated with the individual comprises:
circuitry for packaging at least one of the two or more pharmaceutical agents in unit dosage form.

18. The system of claim 1, wherein the circuitry for packaging the two or more pharmaceutical agents in response to at least one of the one or more parameters associated with the individual comprises:
circuitry for packaging the two or more pharmaceutical agents in oral administration form.

19. The system of claim 1, wherein the circuitry for packaging the two or more pharmaceutical agents in response to at least one of the one or more parameters associated with the individual comprises:
circuitry for packaging at least one of the two or more pharmaceutical agents in response to specified release at one or more times.

20. The system of claim 1, wherein the circuitry for packaging the two or more pharmaceutical agents in response to at least one of the one or more parameters associated with the individual comprises:
circuitry for packaging at least one of the two or more pharmaceutical agents in response to release at one or more sites associated with an individual.

21. A system comprising:
means for accepting input of one or more parameters associated with an individual;
means for selecting two or more pharmaceutical agents in response to at least one of the one or more parameters associated with the individual; and
means for packaging the two or more pharmaceutical agents in response to at least one of the one or more parameters associated with the individual.

22. A system comprising:
a signal-bearing medium bearing:
one or more instructions for accepting input of one or more parameters associated with an individual;
one or more instructions for selecting two or more pharmaceutical agents in response to at least one of the one or more parameters associated with the individual; and
one or more instructions for packaging the two or more pharmaceutical agents in response to at least one of the one or more parameters associated with the individual.

23. The system of claim 22, wherein the signal-bearing medium includes a computer-readable medium.

24. The system of claim 22, wherein the signal-bearing medium includes a recordable medium.

25. The system of claim 22, wherein the signal-bearing medium includes a communications medium.

* * * * *